(12) United States Patent
Takasaka et al.

(10) Patent No.: US 8,874,004 B2
(45) Date of Patent: Oct. 28, 2014

(54) DEVELOPING DEVICE HAVING MOVABLE COUPLING MEMBER FOR ENGAGEMENT TO ELECTROPHOTOGRAPHIC IMAGE FORMING APPARATUS

(75) Inventors: Atsushi Takasaka, Mishima (JP); Shigeo Miyabe, Numazu (JP); Takahito Ueno, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 543 days.

(21) Appl. No.: 12/547,790

(22) Filed: Aug. 26, 2009

(65) Prior Publication Data

US 2010/0054823 A1    Mar. 4, 2010

(30) Foreign Application Priority Data

Aug. 27, 2008 (JP) .................................. 2008-218465
Aug. 20, 2009 (JP) .................................. 2009-191189

(51) Int. Cl.
| | | |
|---|---|---|
| *G03G 15/01* | (2006.01) | |
| *G03G 15/04* | (2006.01) | |
| *F16D 3/205* | (2006.01) | |
| *F16D 1/10* | (2006.01) | |

(52) U.S. Cl.
CPC .... *G03G 15/0152* (2013.01); *G03G 2215/0177* (2013.01); *F16D 3/2052* (2013.01); *F16D 1/10* (2013.01)
USPC .......................................... 399/227; 399/119

(58) Field of Classification Search
USPC .................. 399/227, 167, 119, 117
See application file for complete search history.

(56) References Cited

U.S. PATENT DOCUMENTS

| 4,743,938 | A | 5/1988 | Ohno ................................ 355/3 |
| 5,809,380 | A | 9/1998 | Katakabe et al. ............. 339/227 |
| 6,011,942 | A | 1/2000 | Taniguchi et al. |
| 6,032,002 | A * | 2/2000 | Yokomori et al. .............. 399/12 |
| 6,574,446 | B2 | 6/2003 | Kitayama ..................... 399/111 |

(Continued)

FOREIGN PATENT DOCUMENTS

| DE | 11 2008 000 214 T5 | 12/2009 |
| EP | 2 159 645 A1 | 3/2010 |

(Continued)

OTHER PUBLICATIONS

Machine English Translation of JP2002-341658 published on November 29, 2002.*

(Continued)

*Primary Examiner* — Billy Lactaoen
(74) *Attorney, Agent, or Firm* — Fitzpatrick, Cella, Harper & Scinto

(57) ABSTRACT

A developing device is usable with an electrophotographic image forming apparatus including a shaft and a rotary unit mounting the device. When mounted, the device is movable perpendicular to a shaft axial direction in response to movement of the rotary unit and the shaft is not movable in that direction. The device includes a developing roller that contacts and separates from a drum in response to movement of the rotary unit, and a coupler transmitting a rotating force to the roller. The coupler includes a portion engaging the shaft to receive a rotating force and a portion transmitting the received rotating force to the roller. The coupler takes a first position for transmitting the rotational force to the roller, a position before the coupler engages the shaft and is inclined away from the first position, and a position for the disengagement of the coupler and the shaft.

24 Claims, 44 Drawing Sheets

(56) References Cited

U.S. PATENT DOCUMENTS

| | | | |
|---|---|---|---|
| 6,868,245 | B2 | 3/2005 | Kinouchi ............... 399/227 |
| 7,340,197 | B2 | 3/2008 | Murayama et al. |
| 2002/0025191 | A1 | 2/2002 | Kitayama ............... 399/222 |
| 2004/0184837 | A1 | 9/2004 | Kinouchi ............... 399/227 |
| 2006/0240896 | A1 | 10/2006 | Ohashi et al. |
| 2007/0122188 | A1 | 5/2007 | Igarashi et al. |
| 2008/0152388 | A1* | 6/2008 | Ueno et al. ............... 399/167 |
| 2008/0240796 | A1* | 10/2008 | Morioka et al. ............ 399/279 |

FOREIGN PATENT DOCUMENTS

| | | | |
|---|---|---|---|
| JP | 61-99169 | | 5/1986 |
| JP | 10-171304 | | 6/1998 |
| JP | 11-015265 | | 1/1999 |
| JP | 2002341658 A | * 11/2002 | ............ G03G 15/08 |
| JP | 2003-202727 | | 7/2003 |
| JP | 2004-353807 | | 12/2004 |
| JP | 2006-139230 | | 6/2006 |
| JP | 2008-002671 | | 1/2008 |
| JP | 2008-268927 A | | 11/2008 |
| KR | 10-0418163 | | 2/2004 |
| RU | 2289835 C2 | | 12/2006 |
| WO | 2008/078836 | | 7/2008 |
| WO | 2008/081966 | | 7/2008 |
| WO | 2008/117878 | | 10/2008 |

OTHER PUBLICATIONS

PCT International Search Report and Written Opinion of International Search Authority in PCT/JP2009/065375 issued Nov. 30, 2009.
Office Action in Australian Patent Application No. 2009284873, dated Jun. 29, 2011.
Supplementary Search Report in Singapore Patent Application No. 201009730-1, dated Mar. 19, 2012.
Search and Examination Report in Singapore Patent Application No. 201009730-1, mailed May 15, 2012.
Office Action in Korean Patent Application No. 10-2011-7003785, mailed Jun. 29, 2012.
English translation of Jun. 29 ,2012 Office Action in Korean Patent Application No. 10-2011-7003785.
Office Action in Canadian Patent Application No. 2,728,942, mailed Jul. 10, 2012.
Office Action in Taiwanse Patent Application No. 098128857, mailed Jul. 15, 2013 (with English translation).
Office Action in Australian Patent Application No. 2009284873, mailed Feb. 18, 2013.
Decision on Grant in Russian Patent Application No. 2011111541/28, issued Apr. 8, 2013 (with English Translation).
Office Action in Korean Patent Application No. 10-2011-7003785, issued May 22, 2013.
Office Action in Chinese Patent Application No. 200980132510.1, issued May 30, 2013 (with English Translation).
English translation of Office Action in Korean Patent Application No. 10-2011-7003785, issued May 22, 2013.
Patent Examination Report in Australian Patent Application No. 2013202125, dated Feb. 17, 2014.
English translation of Office Action in German Patent Application No. 11 2009 001 827.0, mailed Apr. 9, 2014.
Notice of Allowance in Korean Patent Application No. 10-2011-7003785, mailed Mar. 28, 2014.
Office Action in Chinese Patent Application No. 200980132510.1, mailed Mar. 14, 2014 (with English translation).
Office Action in German Patent Application No. 11 2009 001 827.0, mailed Apr. 7, 2014.
Office Action in Malaysian Patent Application No. PI 2011000813, dated Apr. 15, 2014.
Decision on Grant in Russian Patent Application No. 2013129844, mailed Aug. 25, 2014 (with English translation).

* cited by examiner

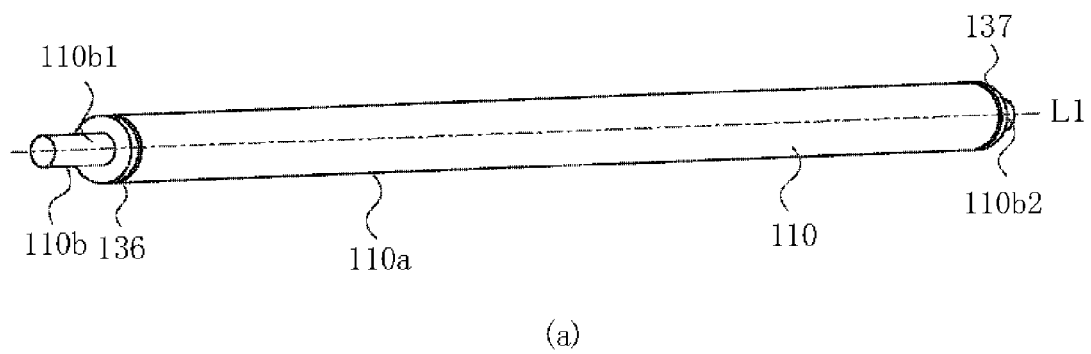
(a)
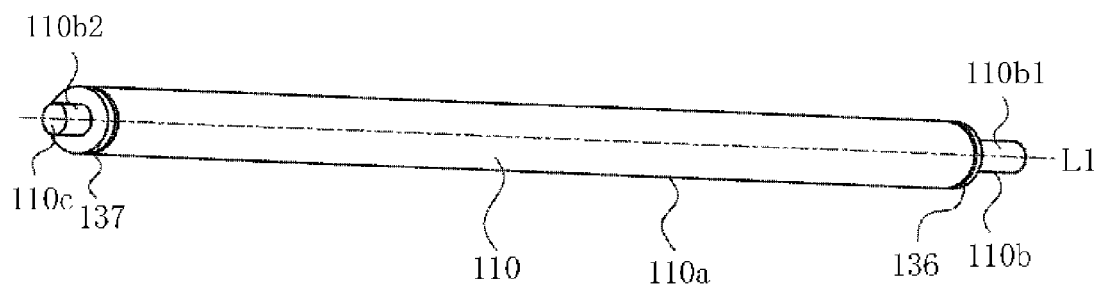
(b)
Fig. 5

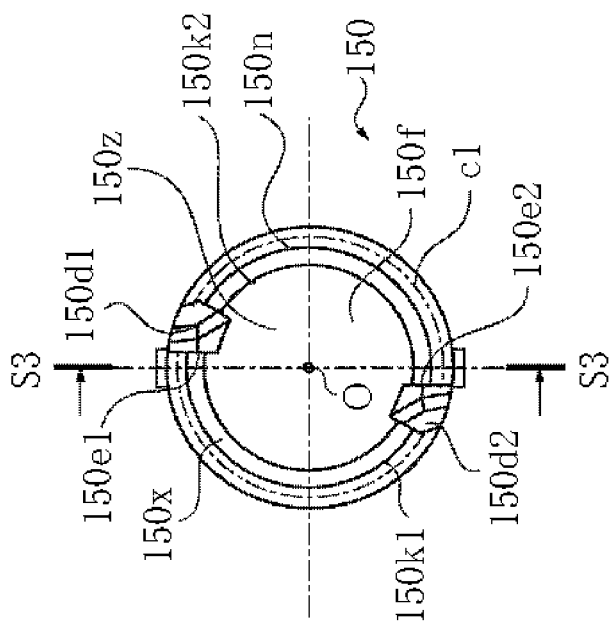
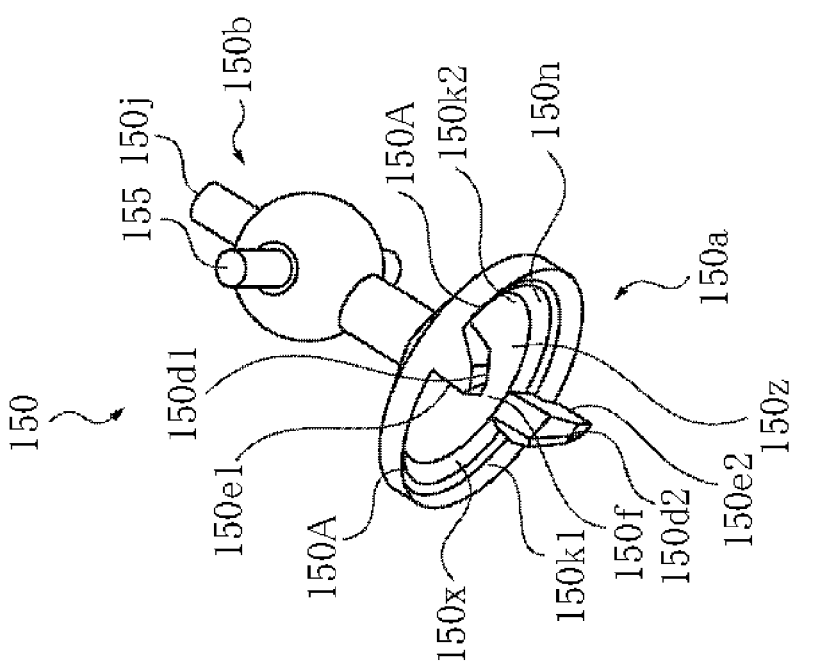

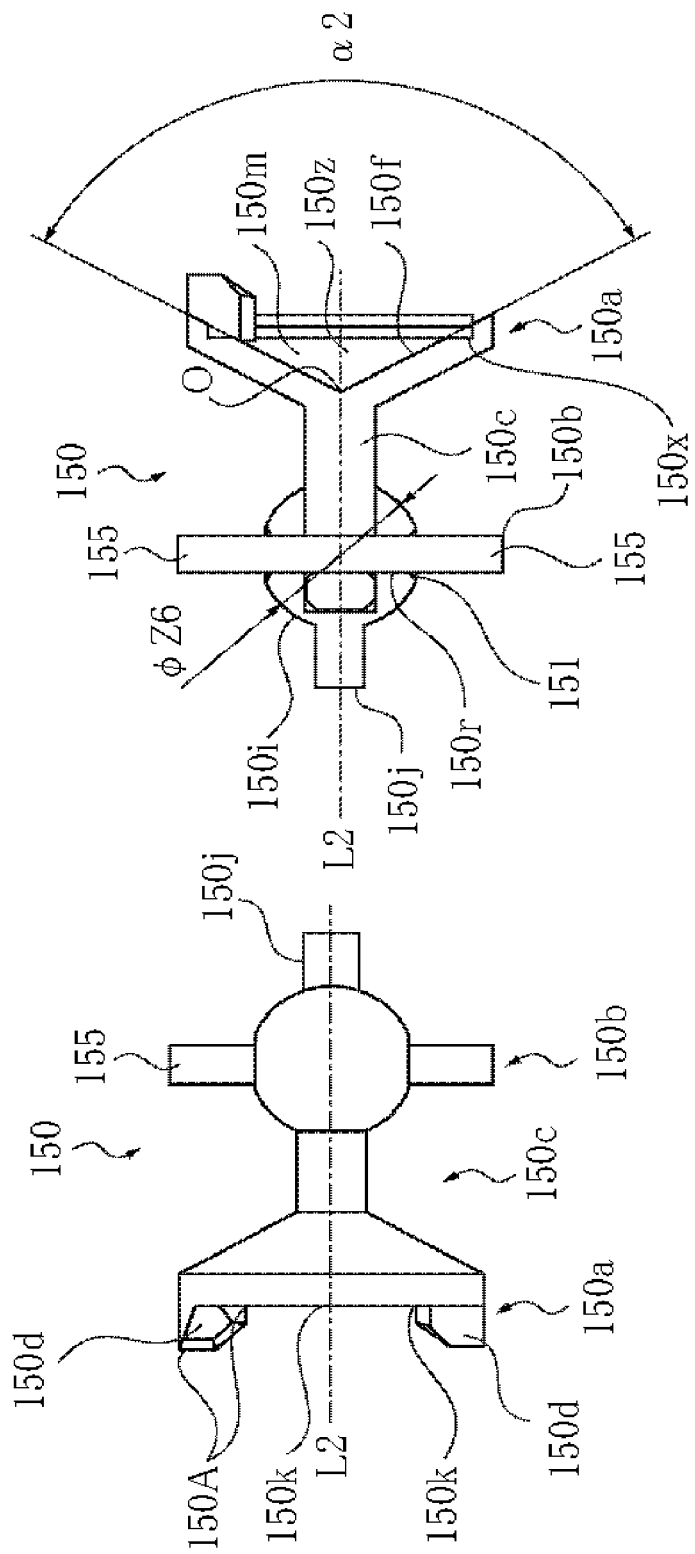

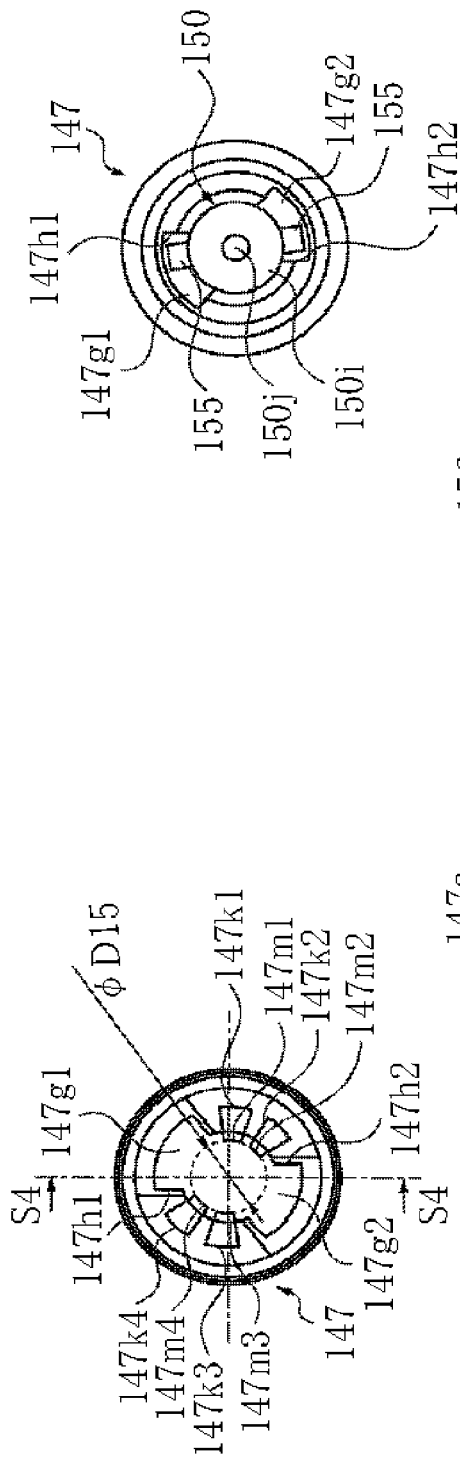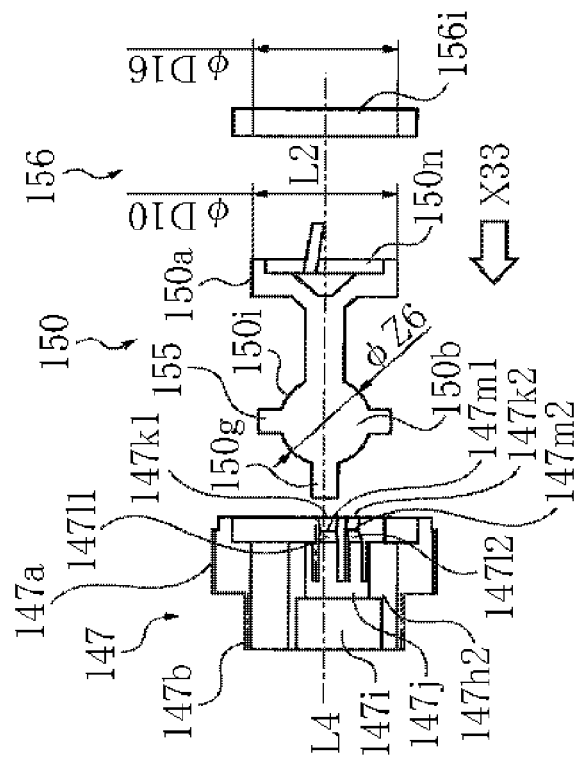

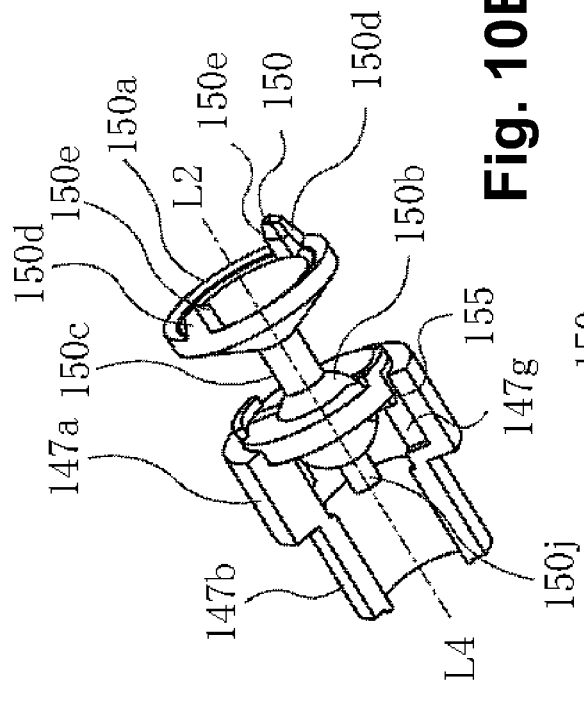
Fig. 10B1
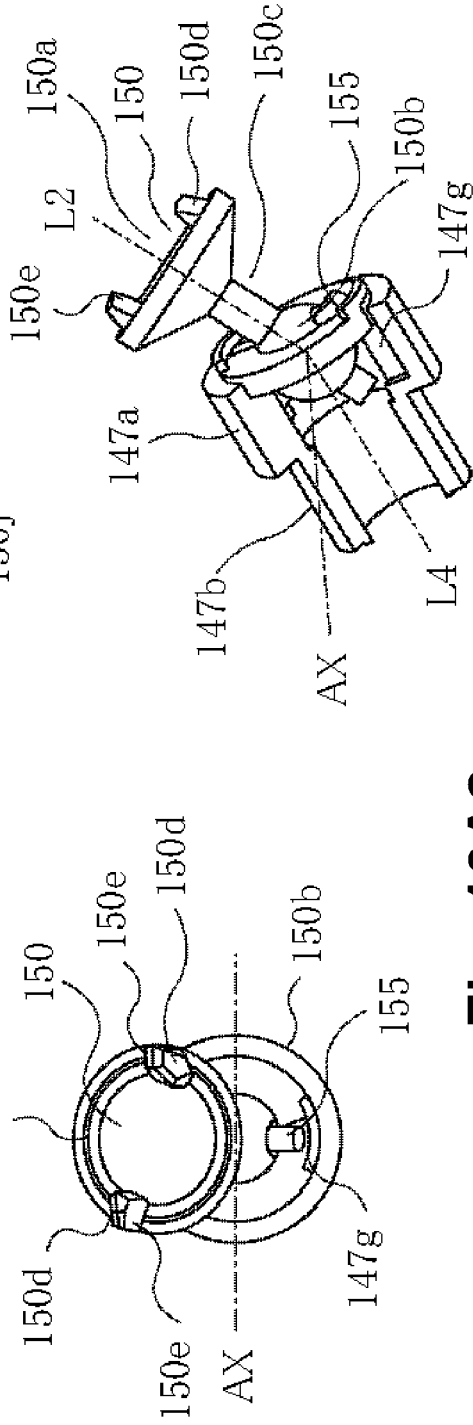
Fig. 10B2
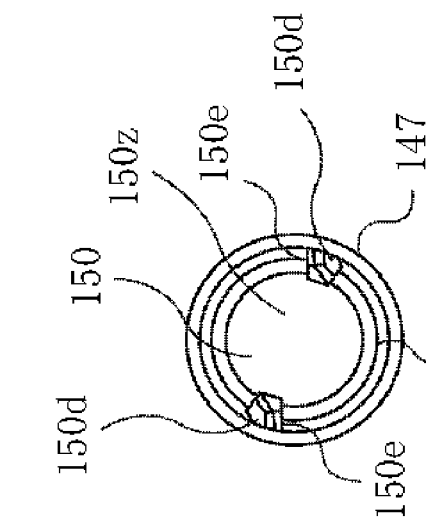
Fig. 10A1
Fig. 10A2

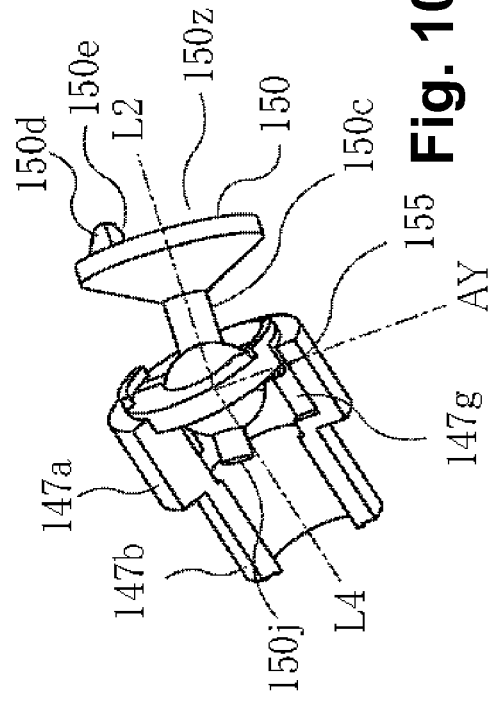
Fig. 10B3
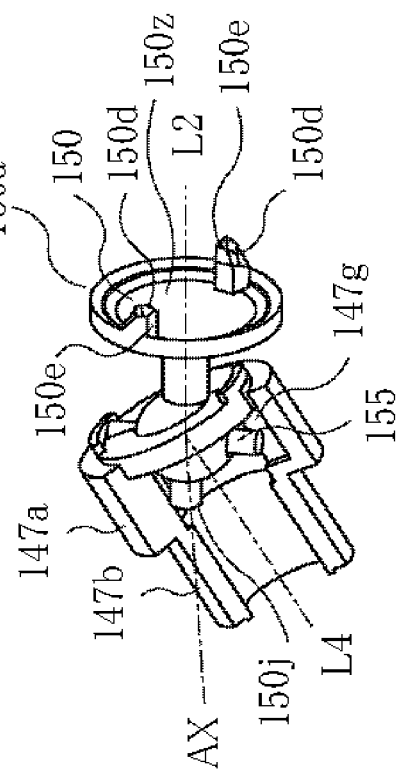
Fig. 10B4
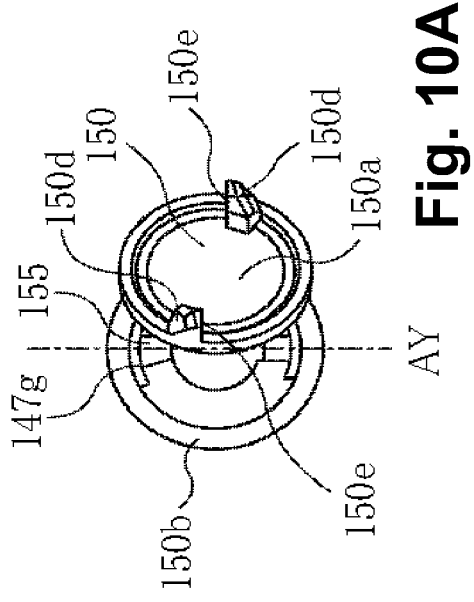
Fig. 10A3
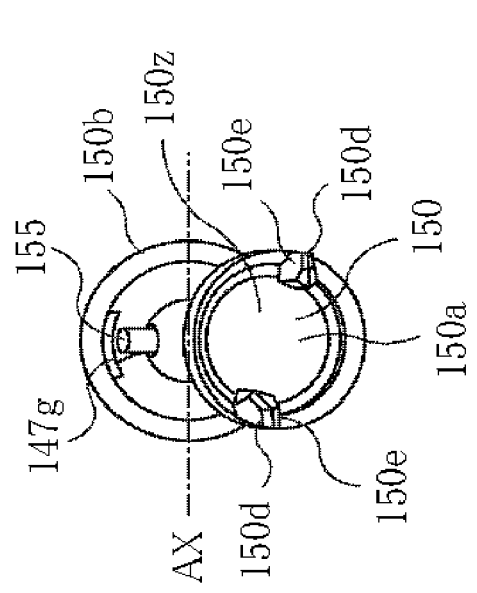
Fig. 10A4

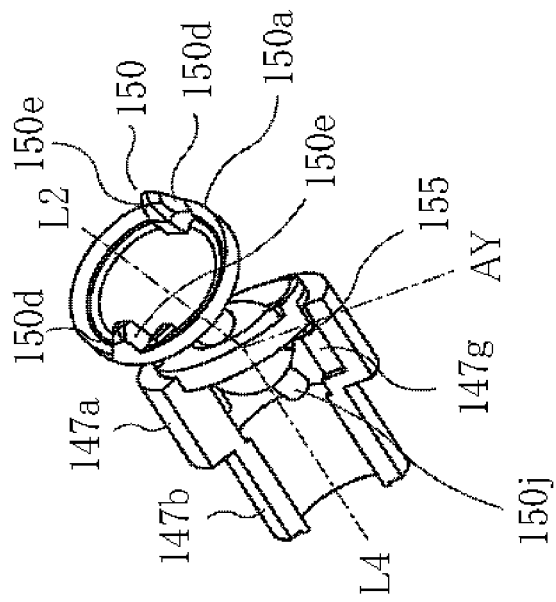
Fig. 10B5
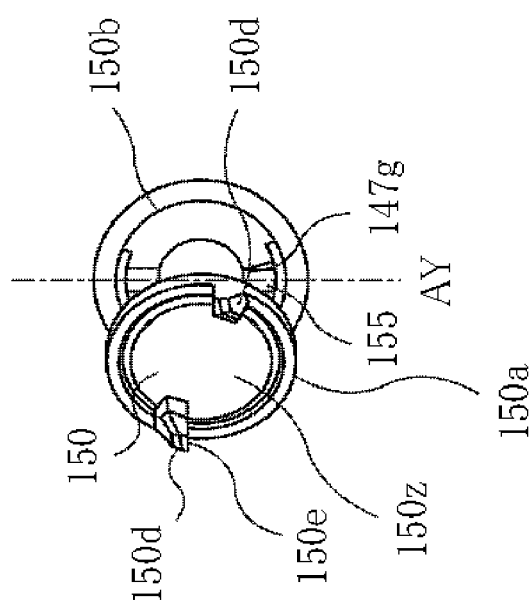
Fig. 10A5

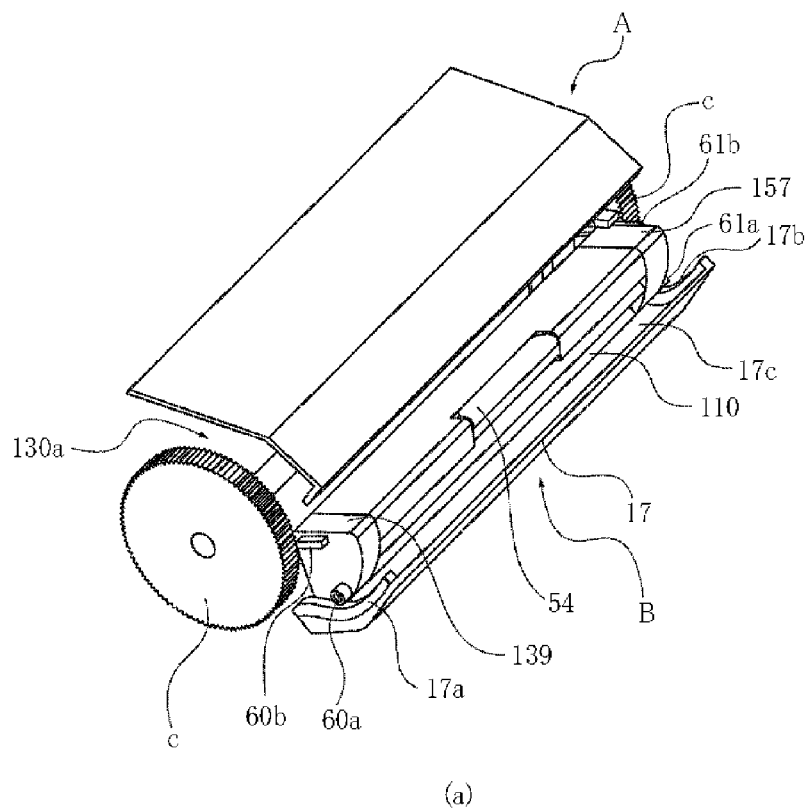
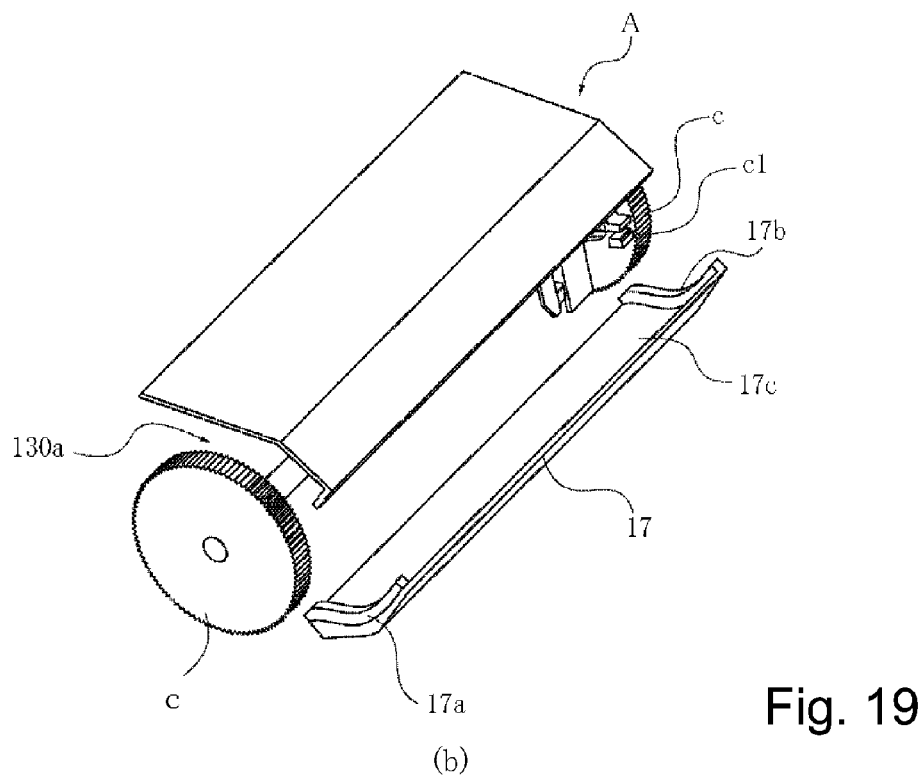
Fig. 19

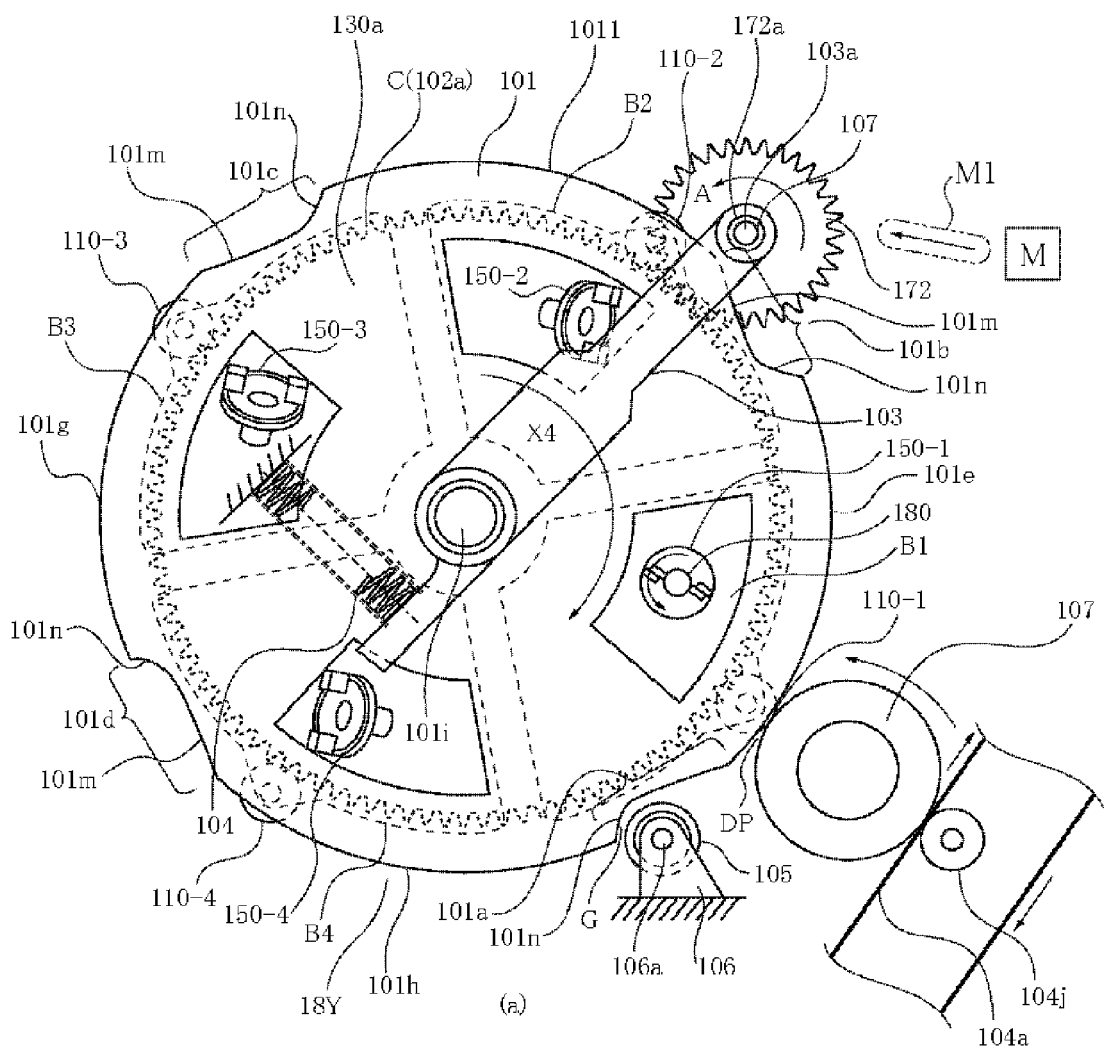
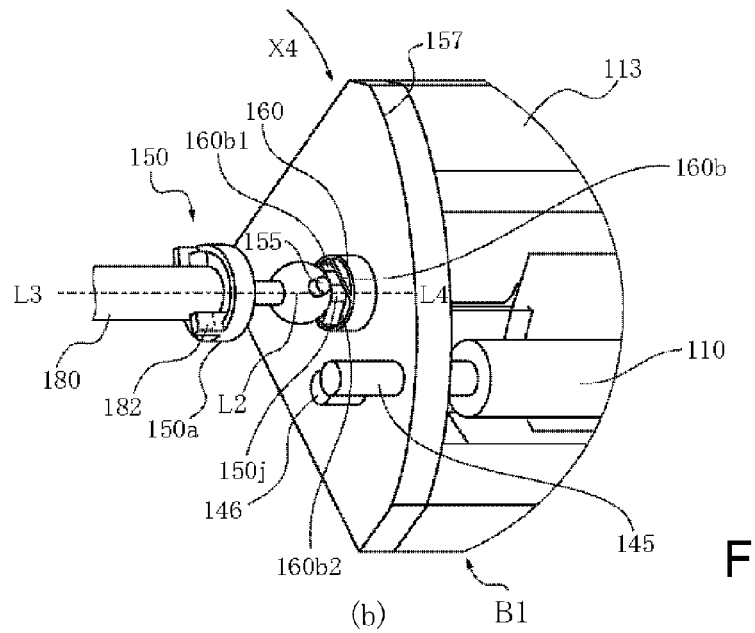
Fig. 20

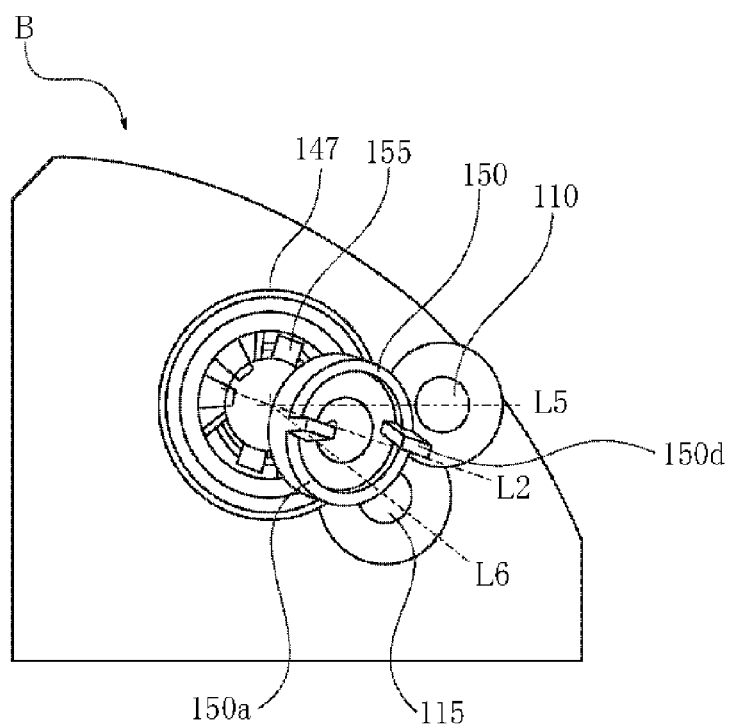
(a)
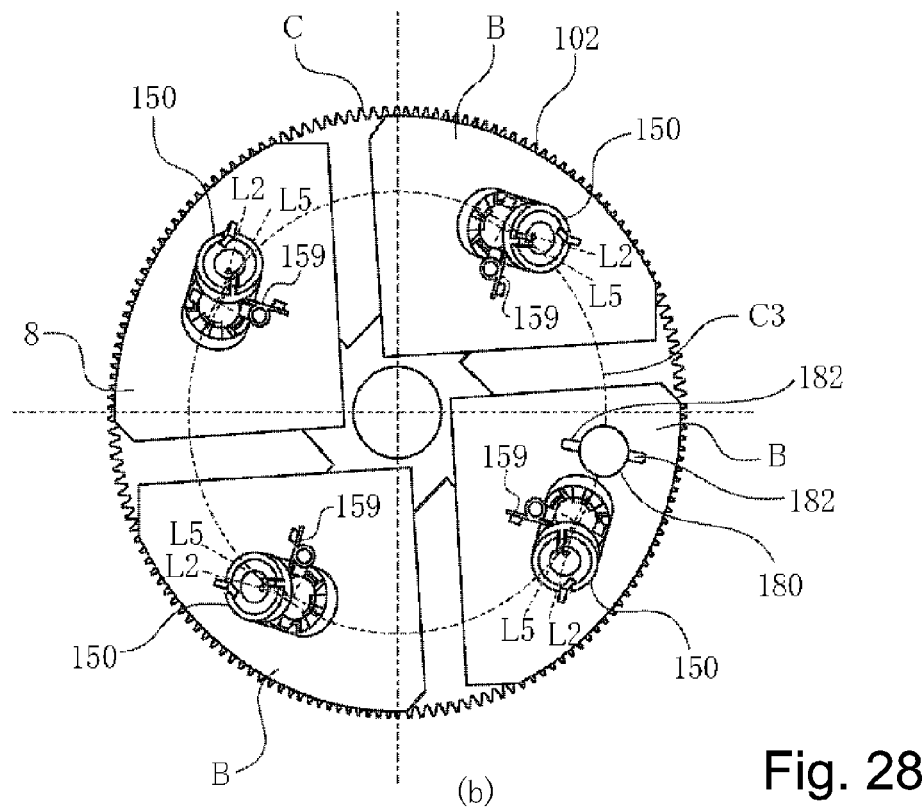
(b)
Fig. 28

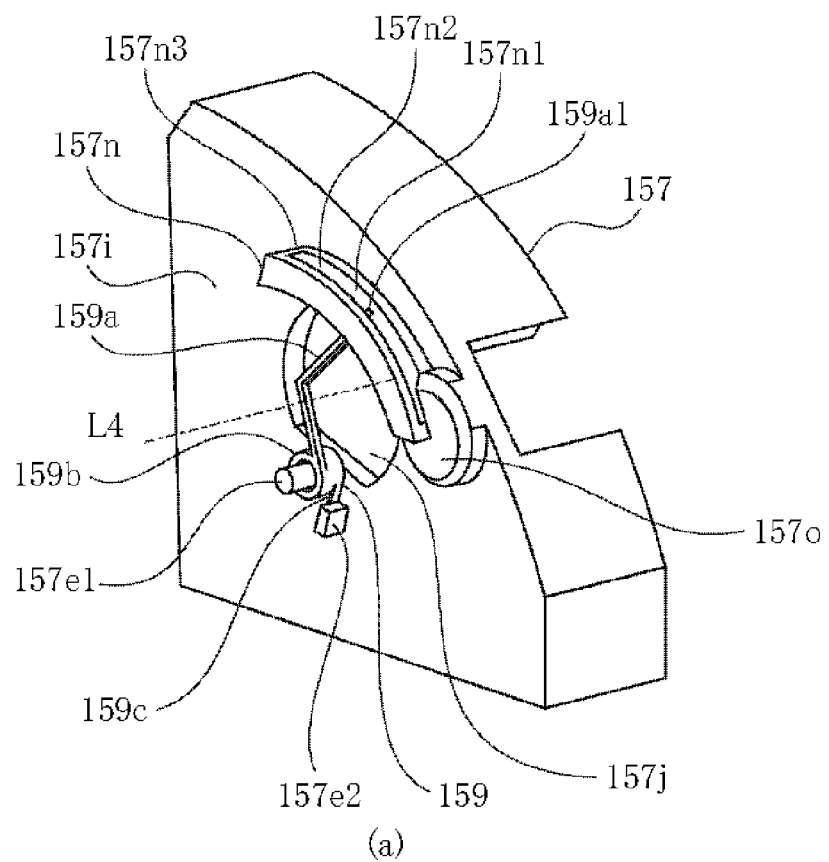
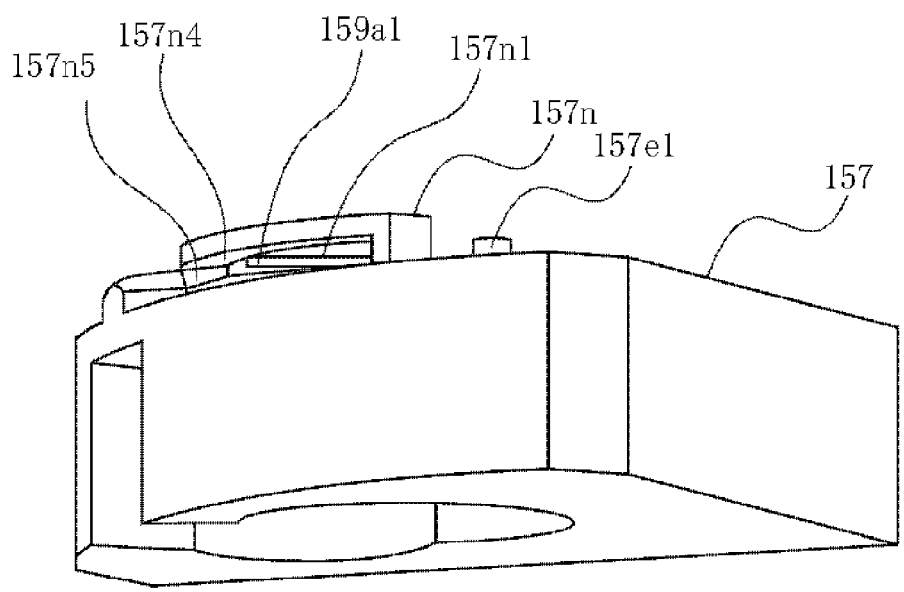
Fig. 29

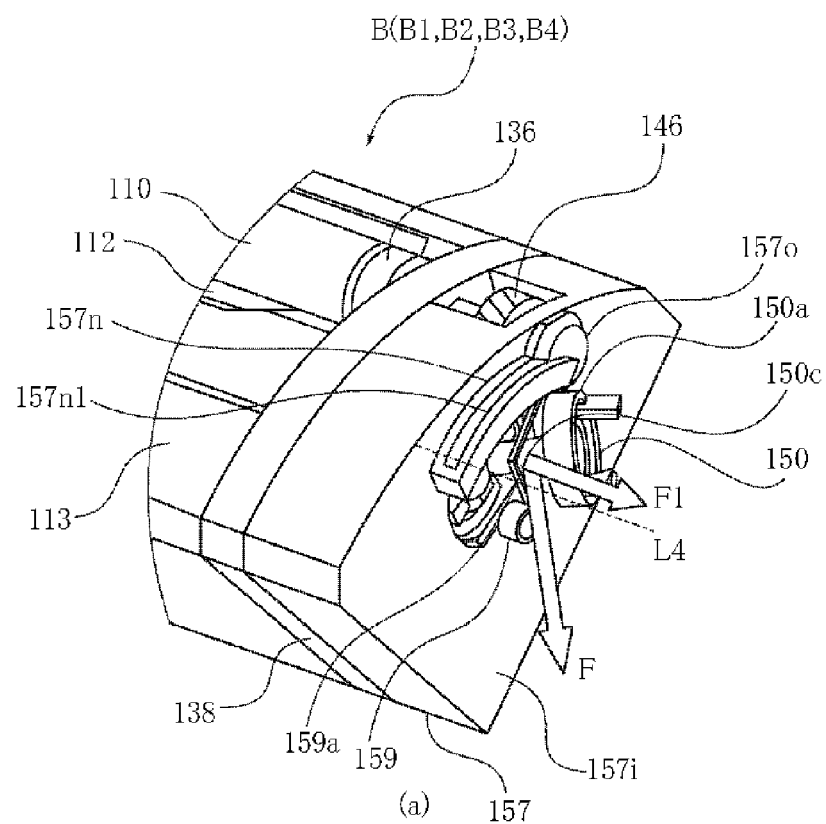
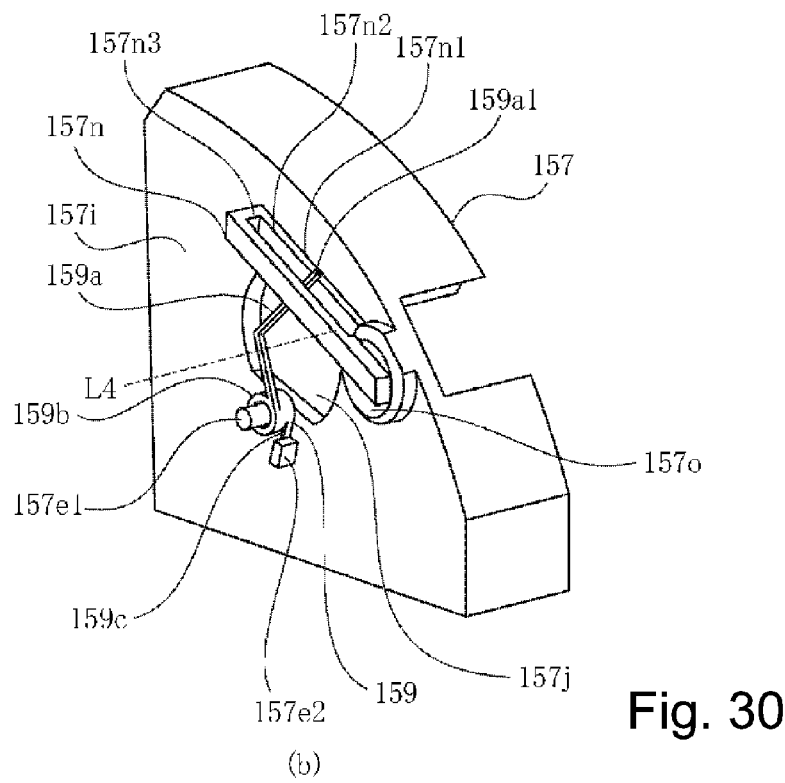
Fig. 30

DEVELOPING DEVICE HAVING MOVABLE COUPLING MEMBER FOR ENGAGEMENT TO ELECTROPHOTOGRAPHIC IMAGE FORMING APPARATUS

FIELD OF THE INVENTION AND RELATED ART

The present invention relates to a developing device, a developing cartridge, a rotational force transmitting part, and an electrophotographic image forming apparatus with which the developing cartridge is used.

The electrophotographic image forming apparatus forms an image on a recording material using an electrophotographic image forming process. The electrophotographic image forming apparatus includes an electrophotographic copying machine, an electrophotographic printer (a laser beam printer, an LED printer), and so on.

In addition, the developing cartridge is dismountably mounted to a main assembly of the electrophotographic image forming apparatus, and develops an electrostatic latent image formed on the electrophotographic photosensitive member. By a user exchanging the developing cartridge, a maintenance operation of the image forming apparatus is carried out in effect.

Conventionally, in the electrophotographic image forming apparatus, when the electrostatic latent image formed on the electrophotographic photosensitive member (photosensitive drum) of a drum configuration is developed using the developing cartridge, the operation is carried out as follows.

The developing cartridge is provided with a gear, and is engaged with a gear provided in the main assembly of the electrophotographic image forming apparatus. A rotational force of a motor provided in the main assembly is transmitted to a developing roller through the gear provided in the main assembly, and the gear provided in the developing cartridge side. By this, such a type of rotating the developing roller is known (Japanese Laid-open Patent Application 2003-202727).

In a known color electrophotographic image forming apparatus, a developing rotary member rotated in the state that a plurality of developing devices are mounted is provided in a main assembly. In this device, in order to transmit the rotational force from the main assembly to the developing cartridge the following structures are known. The a main assembly side coupling provided in the main assembly, and a developing device side coupling of the developing device mounted to the developing rotary member are connected with each other. By this, the rotational force is transmitted from the main assembly to the developing device. And, in connecting the main assembly side coupling, and the developing device side coupling with each other, the main assembly side coupling is once retracted in the device so that it does not interfere with the movement of the developing rotary member. Then, the developing rotary member is moved to move a predetermined developing device toward the main assembly side coupling. Thereafter, the main assembly side coupling retracted using a moving mechanism such as a solenoid is moved toward the developing device side coupling. By this, both of the couplings are connected with each other. And, the rotational force of the motor provided in the main assembly is transmitted to the developing roller through the main assembly side coupling, and the developing device side coupling. By this, the developing roller is rotated. Such a type is known (Japanese Laid-open Patent Application common 11-015265).

However, according to the conventional structure described in the Japanese Laid-open Patent Application 2003-202727, a drive connecting portion of the main assembly, and the developing device is a gear-to-gear type. For this reason, it is difficult to prevent a rotation unevenness of the developing roller.

On the other hand, in the structure described in Japanese Laid-open Patent Application Hei 11-015265, as has been described hereinbefore, the main assembly side coupling is once retracted. In transmitting the rotational force, it is necessary that the retracted main assembly side coupling is moved toward the developing device side coupling.

Then, it is necessary that a mechanism for moving the main assembly side coupling toward the developing device side coupling is provided in the main assembly.

SUMMARY OF THE INVENTION

The principal object of the present invention is to provide a developing device, a developing cartridge, and an electrophotographic image forming apparatus usable with the developing device or the developing cartridge, which are improved to avoid the problem of the prior art.

Another object of the present invention is to provide a rotational force transmitting part usable with such a developing cartridge.

A further object of the present invention is to maintain a coupling member at a pre-engagement angular position (second angular position) even in the case where the developing cartridge is in a free state. Therefore, the coupling member is prevented from unintentional movement in transporting the developing cartridge, for example.

A further object of the present invention is to provide a rotational force transmitting part usable with such a developing cartridge. A further object of the present invention is to provide a usable electrophotographic image forming apparatus with such a developing cartridge.

A further object of the present invention is to provide a developing device (developing cartridge) which is usable with the main assembly which not provided with the mechanism for moving the main assembly side coupling member in the axial direction thereof by a solenoid mechanism.

A further object of the present invention is to provide a developing device (developing cartridge), wherein the coupling member provided on the developing device (developing cartridge) is engaged with the drive shaft by moving the developing device (developing cartridge) in the direction substantially perpendicular to the axial direction of the drive shaft relative to the main assembly.

A further object of the present invention is to provide an electrophotographic image forming apparatus usable with such a developing device (developing cartridge).

A further object of the present invention is to provide a developing device (developing cartridge), wherein the engagement with the drive shaft is carried out by the movement in the direction substantially perpendicular to the axial direction of the drive shaft provided in the main assembly of the electrophotographic image forming apparatus.

A further object of the present invention is to provide a rotational force transmitting part usable with such a developing device (developing cartridge).

A further object of the present invention is to provide an electrophotographic image forming apparatus usable with such a developing device (developing cartridge).

A further object of the present invention is to provide a developing device (developing cartridge), wherein the developing roller is rotated smoothly as compared with the case in which a driving connection between the main assembly, and the developing device (developing cartridge) is carried out by the gear-to-gear transmission.

A further object of the present invention is to provide a rotational force transmitting part usable with such a developing cartridge.

A further object of the present invention is to provide an electrophotographic image forming apparatus usable with such a developing device (developing cartridge).

A further object of the present invention is to provide a developing device (developing cartridge), wherein the developing roller which can be engaged with the drive shaft in the direction substantially perpendicular to the axial direction of the drive shaft provided in the main assembly is rotated smoothly.

A further object of the present invention is to provide a rotational force transmitting part usable with such a developing device (developing cartridge).

A further object of the present invention is to provide an electrophotographic image forming apparatus usable with such a developing device (developing cartridge).

A further object of the present invention is to provide a developing device (developing cartridge) which is engaged and disengaged in the direction substantially perpendicular to the axial direction relative to the drive shaft provided in the main assembly of the electrophotographic image forming apparatus by rotation of a rotary member.

A further object of the present invention is to provide a rotational force transmitting part usable with such a developing device (developing cartridge).

A further object of the present invention is to provide an electrophotographic image forming apparatus usable with such a developing device (developing cartridge).

A further object of the present invention is to provide the developing device (developing cartridge) which is engaged and disengaged in the direction substantially perpendicular to the axial direction of the drive shaft relative to the drive shaft provided in the main assembly by the movement (rotation) of a movable member (rotary member) and which rotates the developing roller smoothly.

A further object of the present invention is to provide a rotational force transmitting part usable with such a developing device (developing cartridge).

A further object of the present invention provides an electrophotographic image forming apparatus usable with such a developing device (developing cartridge).

A further object of the present invention is to provide a developing device (developing cartridge), wherein the coupling member is maintained in the pre-engagement angular position in the state that it is stabilized.

A further object of the present invention is to provide a rotational force transmitting part usable with such a developing device (developing cartridge).

A further object of the present invention is to provide an electrophotographic image forming apparatus usable with such a developing device (developing cartridge).

A further object of the present invention is to provide a developing device (developing cartridge), wherein the coupling member is assuredly maintained in the pre-engagement angular position.

A further object of the present invention is to provide a rotational force transmitting part usable with such a developing device (developing cartridge).

A further object of the present invention is to provide an electrophotographic image forming apparatus usable with such a developing device (developing cartridge).

A further object of the present invention is to provide a developing device (developing cartridge) which is applicable to the case where the developing device (developing cartridge) moves in the direction perpendicular to the axial direction of the drive shaft provided in the main assembly in response to the movement (rotation) of the movable member (developing rotary member) which has a swinging rotation axis.

A further object of the present invention is to provide a developing device (developing cartridge), wherein even in such a case, the engagement and disengagement relative to the drive shaft are assured, and the developing roller is rotated smoothly.

A further object of the present invention is to provide a rotational force transmitting part usable with such a developing device (developing cartridge).

A further object of the present invention is to provide an electrophotographic image forming apparatus usable with such a developing device (developing cartridge).

A further object of the present invention provides a developing device to which a developing roller which is rotating can be contacted to the electrophotographic photosensitive member.

A further object of the present invention is to provide an electrophotographic image forming apparatus usable with such a developing device.

A further object of the present invention is to provide a rotational force transmitting part usable with such a developing device.

In addition, a further object of the present invention is to provide a developing device, wherein even if the drive shaft fixed so as not to move in the direction substantially perpendicular to the direction of the axis of the drive shaft is used, the developing roller in the rotating state and the electrophotographic photosensitive member can be contacted to each other.

A further object of the present invention is to provide an electrophotographic image forming apparatus usable with such a developing device.

A further object of the present invention is to provide a rotational force transmitting part usable with such a developing device.

According to an aspect of the present invention, there is provided a developing device usable with an electrophotographic image forming apparatus, said apparatus including a driving shaft rotatable by a motor and having a rotating force applying portion, and a movable member, said developing device being mountable to the movable member, and said developing device being movable in a direction substantially perpendicular to an axial direction of the driving shaft in response to movement of the movable member in one direction with said developing device mounted to the movable member, wherein said driving shaft is not movable in a direction perpendicular to an axix thereof, said developing device comprising i) a developing roller for developing an electrostatic latent image formed on an electrophotographic photosensitive drum, said developing roller being rotatable about an axis, wherein said developing roller is contacted to and separated from said electrophotographic photosensitive member drum in response to movement of said movable member; and ii) a coupling member for transmitting a rotating force to said developing roller, said coupling member including, a rotating force receiving portion engageable with the rotating force applying portion to receive a rotating force from the driving shaft, and a rotating force transmitting portion for transmitting the rotating force received through said rotating force receiving portion to said developing roller, said coupling member being capable of taking a rotational force transmitting angular position for transmitting the rotational force for rotating said developing roller to said developing roller, a pre-engagement angular position which is taken before said coupling member is engaged with the rotating force applying portion and in which said coupling member is inclined away from said rotational force transmitting angular position, and a disengaging angular position which is taken for said coupling member to disengage from the driving shaft and in which said coupling member is inclined away from the rotational force transmitting angular position in a direction opposite to said pre-engagement angular position, wherein in response to a movement of said developing device when the movable member moves in said one direction, said coupling member moves from the pre-engagement angular position to the rotational force transmitting angular position, and wherein when the movable member makes a further movement in said one direction, in response to the further movement, said coupling member is moved from said rotational force transmitting angular position to said disengaging angular position to disengage said coupling member from said driving shaft, and wherein said developing roller is contacted to said electrophotographic photosensitive member in response to the movement of said developing device in a state that developing roller is being rotated through engagement between said coupling member and said rotating force applying portion.

According to another aspect of the present invention, there is provided an electrophotographic image forming apparatus for forming an image on a recording material, said electrophotographic image forming apparatus comprising i) a driving shaft rotatable by a motor and having a rotating force applying portion, wherein said driving shaft is not movable in a direction perpendicular to an axix thereof; ii) a movable member; iii) a developing device which is movable in a direction substantially perpendicular to an axial direction of the driving shaft in response to movement of the movable member in a state that developing device is mounted to said movable member, in response to the moment of said movable member, said developing roller including a developing roller for developing an electrostatic latent image formed on an electrophotographic photosensitive drum, said developing roller being rotatable about an axis, wherein said developing roller is contacted to and separated from said electrophotographic photosensitive member drum in response to movement of said movable member; iv) a coupling member for transmitting a rotating force to said developing roller, said coupling member including, a rotating force receiving portion engageable with the rotating force applying portion to receive a rotating force from the driving shaft, and a rotating force transmitting portion for transmitting the rotating force received through said rotating force receiving portion to said developing roller, said coupling member being capable of taking a rotational force transmitting angular position for transmitting the rotational force for rotating said developing roller to said developing roller, a pre-engagement angular position which is taken before said coupling member is engaged with the rotating force applying portion and in which said coupling member is inclined away from said rotational force transmitting angular position, and a disengaging angular position which is taken for said coupling member to disengage from the driving shaft and in which said coupling member is inclined away from the rotational force transmitting angular position in a direction opposite to said pre-engagement angular position to disengage from the driving shaft, wherein in response to a movement of said developing device when the movable member moves in said one direction, said coupling member moves from the pre-engagement angular position to the rotational force transmitting angular position, and wherein when the movable member makes a further movement in said one direction, in response to the further movement, said coupling member is moved from said rotational force transmitting angular position to said disengaging angular position to disengage said coupling member from said driving shaft, and wherein said developing roller is contacted to said electrophotographic photosensitive member in response to the movement of said developing device in a state that developing roller is being rotated through engagement between said coupling member and said rotating force applying portion.

According to a further aspect of the present invention, there is provided a developing device usable with an electrophotographic image forming apparatus, said apparatus including a driving shaft rotatable having a rotating force applying portion, and a rotatable rotary, said developing device being movable in a direction substantially perpendicular to an axial direction of the driving shaft in response to rotation of said rotary with said developing device mounted to said rotary, said developing device comprising i) a developing roller for developing an electrostatic latent image formed on an electrophotographic photosensitive member drum; ii) a developer accommodating portion for accommodating a developer for use by said developing roller to developing the electrostatic latent image; iii) a coupling member for transmitting a rotating force to said developing roller in a state that developing cartridge is mounted to said rotary, said coupling member including a rotating force receiving portion for engaging with the rotating force applying portion to receive said driving shaft the rotating force from the driving shaft, wherein the driving shaft is not movable in a direction substantially perpendicular to an axial direction of said driving shaft; iv) a regulating member including a regulating portion for regulating said coupling member at a pre-engagement angular position before engagement with the driving shaft, and including a permitting portion for permitting said coupling member to revolve substantially; v) an elastic member for elastically urging said coupling member to position said coupling member at the regulating portion, wherein when said rotary rotates, said coupling member moves from the pre-engagement angular position to a rotational force transmitting angular position the response to movement of said coupling member from the regulating portion To the permitting portion against an elastic force of said elastic member by said coupling member contacting said driving shaft member with movement of said developing cartridge, and when said rotary further rotates, said coupling member moves from the rotational force transmitting angular position to a disengaging angular position to disengage said coupling member from the driving shaft against an elastic force of said elastic member.

According to a further aspect of the present invention, there is provided an electrophotographic image forming apparatus for forming an image on a recording material, said apparatus comprising i) a driving shaft including a rotating force applying portion; ii) a rotatable rotary; a developing cartridge movable in a direction substantially perpendicular to an axial direction of the driving shaft in response to rotation of said rotary with said developing device mounted to said rotary; a developing roller for developing an electrostatic latent image formed on an electrophotographic photosensitive member drum; a developer accommodating portion for accommodating a developer for use by said developing roller to developing the electrostatic latent image; iii) a coupling member for transmitting a rotating force to said developing roller in a state that developing cartridge is mounted to said rotary, said coupling member including a rotating force receiving portion for engaging with the rotating force applying portion to receive said driving shaft the rotating force from the driving shaft, wherein the driving shaft is not movable in a direction substantially perpendicular to an axial direction of said driving shaft; iv) a regulating member including a regulating portion for regulating said coupling member at a pre-engagement angular position before engagement with the driving shaft, and including a permitting portion for permitting said coupling member to revolve substantially; and v) an elastic member for elastically urging said coupling member to position said coupling member at the regulating portion, wherein when said rotary rotates, said coupling member moves from the pre-engagement angular position to a rotational force transmitting angular position the response to movement of said coupling member from the regulating portion To the permitting portion against an elastic force of said elastic member by said coupling member contacting said driving shaft member with movement of said developing cartridge, and when said rotary further rotates, said coupling member moves from the rotational force transmitting angular position to a disengaging angular position to disengage said coupling member from the driving shaft against an elastic force of said elastic member.

According to a further aspect of the present invention, there is provided a rotating force transmitting part usable with a developing cartridge, said developing cartridge being mountable to a main assembly of an electrophotographic image forming apparatus including a driving shaft, and movable in a direction substantially perpendicular to an axial direction of the driving shaft, developing cartridge being provided with a regulating member including a permitting portion and a regulating portion, said rotating force transmitting part comprising a recess provided at one longitudinal end of said rotating force transmitting part and engageable with the driving shaft when said developing cartridge is mounted to the main assembly of the apparatus; a spherical portion provided at the other end; a plurality of projections interposing a center of said recess and projected away from said spherical portion in a longitudinal direction of said rotating force transmitting part for receiving the rotational force from the driving shaft which is provided in the main assembly of the apparatus such that it does not move in a direction substantially perpendicular to the axial direction of said driving shaft in a state that developing cartridge is mounted to the main assembly of the apparatus; a first projected portion projected from said spherical portion away from said one end, said projected portion being revolvable between said permitting portion for permitting substantial revolution of said rotating force transmitting part and said regulating portion for regulating an inclination angle position of said rotating force transmitting part in a state that rotating force transmitting part is mounted to said developing cartridge; and a plurality of second projected portions provided between said projections and said first projected portion and interposing said spherical portion, said second projected portions being projected outwardly from spherical portion, said second projected portions are effective to transmit the rotational force received from the driving shaft by the projections to the developing roller.

These and other objects, features, and advantages of the present invention will become more apparent upon consideration of the following description of the preferred embodiments of the present invention, taken in conjunction with the accompanying drawings.

BRIEF DESCRIPTION OF THE DRAWINGS

FIG. 5 is a perspective view of a developing roller according to an embodiment of the present invention.

FIGS. 7A, 7B, 7C, 7D, 7E and 7F are perspective views of a coupling according to an embodiment of the present invention.

FIGS. 8A, 8B, 8C, 8D, 8E and 8F are front views, and side sectional views of a driving input gear according to an embodiment of the present invention.

FIGS. 10A1, 10A2, 10A3, 10A4, 10A5, 10B1, 10B2, 10B3, 10B4 and 10B5 are perspective views of a coupling according to an embodiment of the present invention.

FIG. 19 is a perspective view illustrating a process in which the developing cartridge according to an embodiment of the present invention is mounted to the rotary member.

FIG. 20 is a longitudinal sectional view of a rotary member according to an embodiment of the present invention.

FIG. 28 is a longitudinal sectional view illustrating the process in which the drive shaft, and the coupling disengage from each other according to an embodiment of the present invention.

FIG. 29 is a perspective view of an elastic material, and a supporting member according to another embodiment of the present invention.

FIG. 30 is a perspective view of an elastic material, and a supporting member according to a further embodiment of the present invention.

DESCRIPTION OF THE PREFERRED EMBODIMENTS

The preferred embodiments of the present invention will be described in conjunction with the accompanying drawings First a coupling member (rotational force transmitting part) according to an embodiment of the present invention will be described.

The present invention relates to a developing cartridge (FIG. 2, for example), and an electrophotographic image forming apparatus (FIG. 4, for example) itself. In addition, the present invention is applicable to a coupling member (rotational force transmitting part) (FIG. 7A-7F, for example, FIG. 31) itself.

(1) Developing Cartridge

Figure 1:
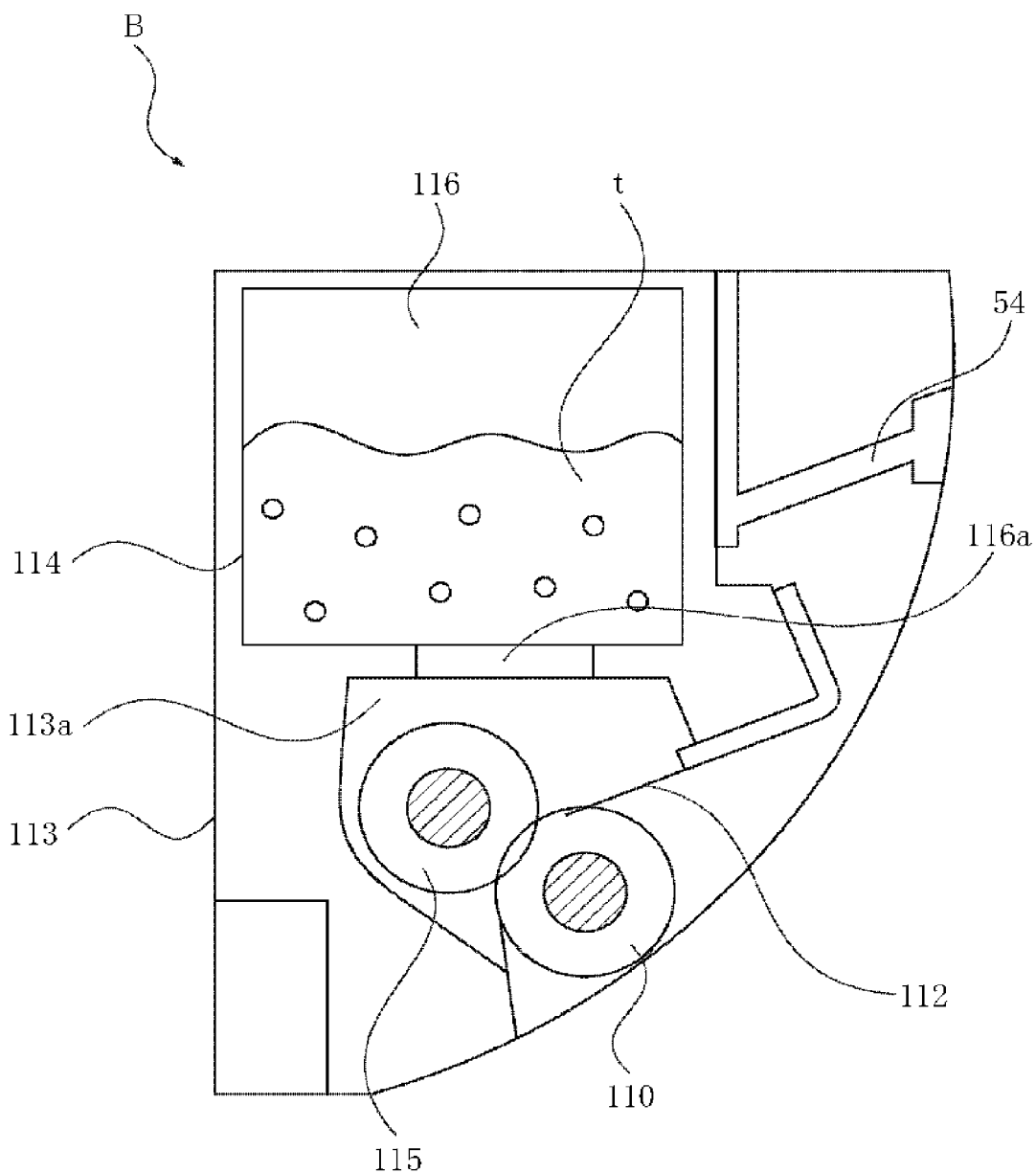
FIG. 1 is a side sectional view of a developing cartridge according to an embodiment of the present invention.
Figure 2:
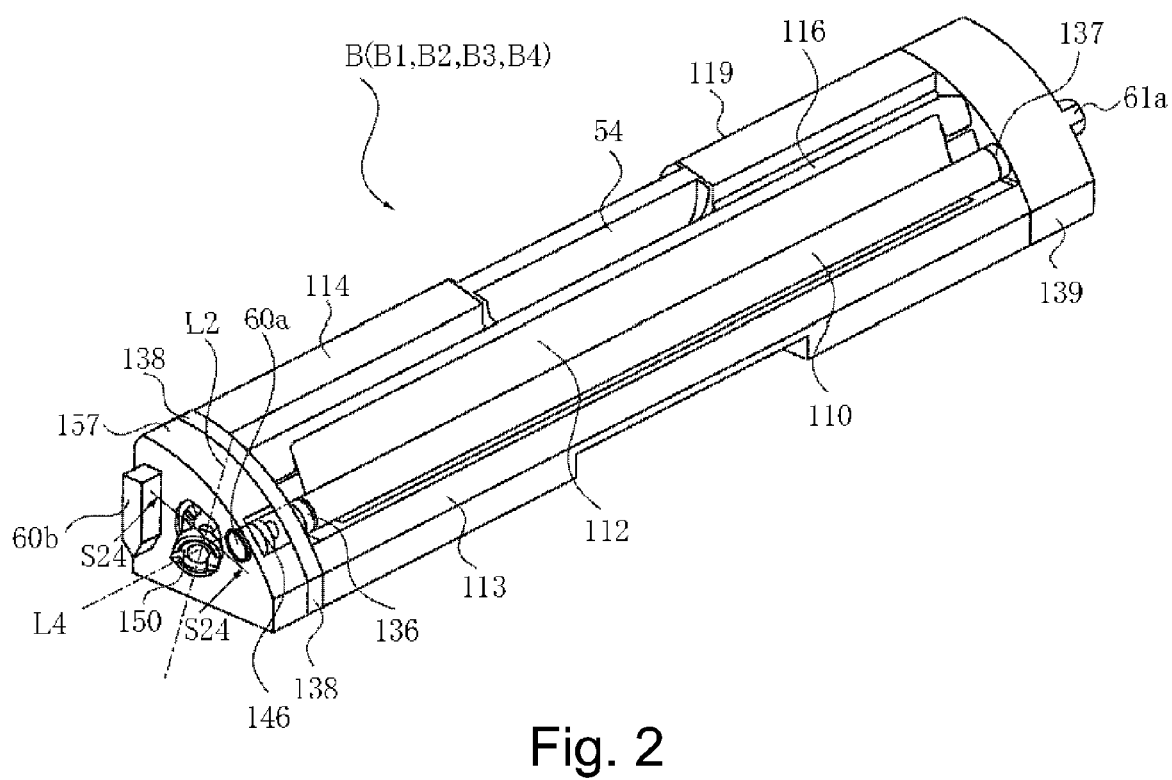
FIG. 2 is a perspective view of the developing cartridge according to an embodiment of the present invention.
Figure 3:
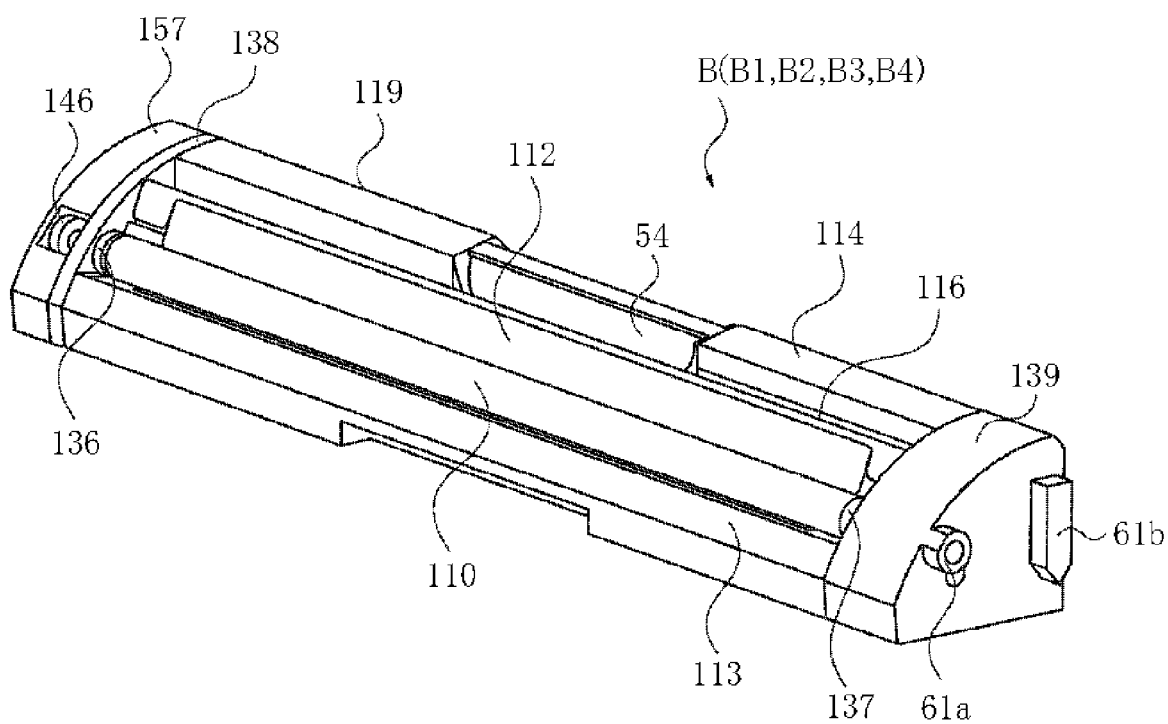
FIG. 3 is a perspective view of the developing cartridge according to an embodiment of the present invention.
Figure 4:
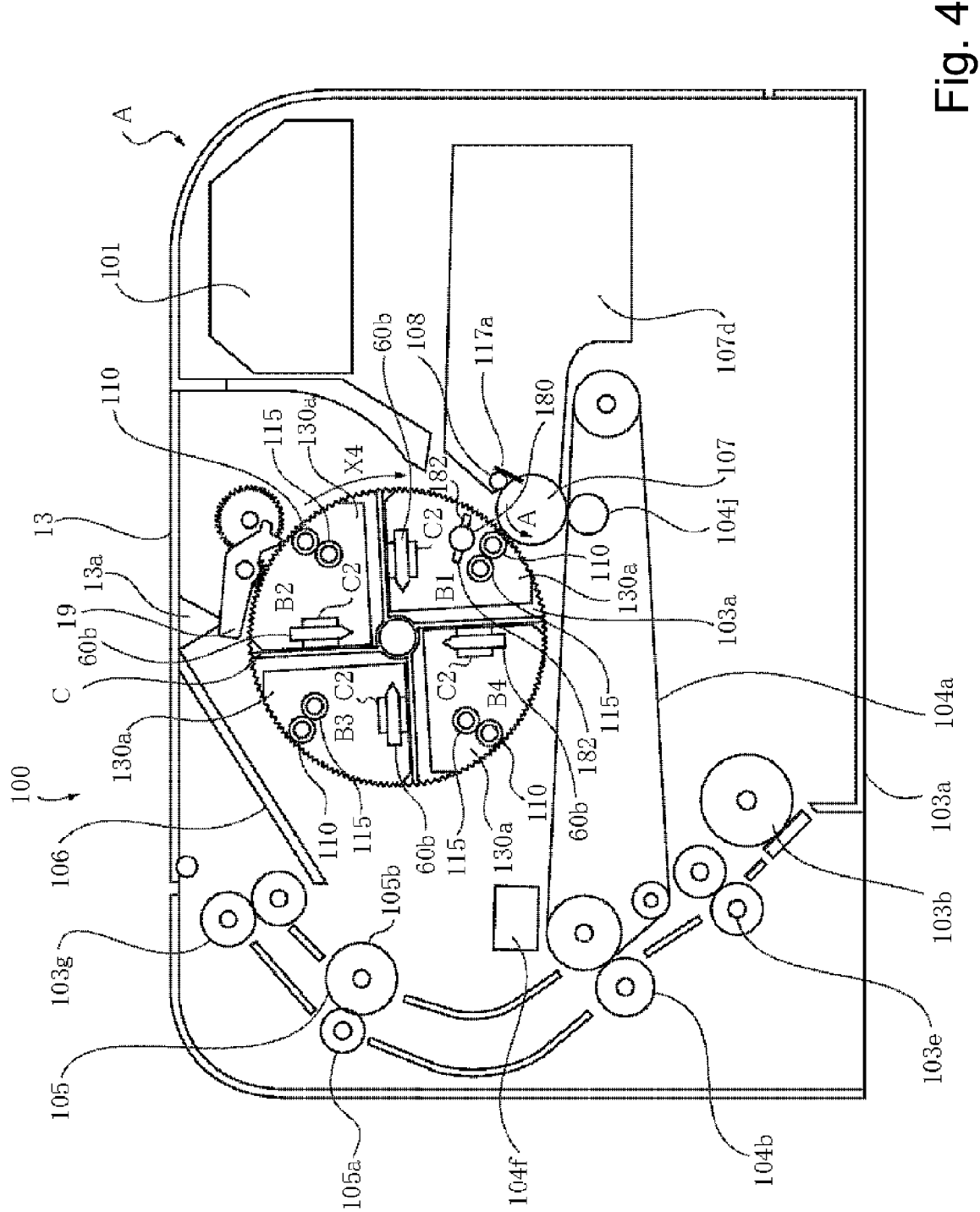
FIG. 4 is a side sectional view of an electrophotographic image forming apparatus main assembly according to an embodiment of the present invention.

Referring to FIG. 1-FIG. 4, a developing cartridge B as the developing device (cartridge) according to an embodiment of the present invention will be described. FIG. 1 is a sectional view of a cartridge B. The FIGS. 2 and 3 are perspective views of the cartridge B. FIG. 4 is a sectional view of color electrophotographic image forming apparatus main assembly A (main assembly).

The cartridge B is mounted to a rotary member C provided in a main assembly A, and is dismounted from the rotary member C by the user.

The main assembly A is the structure of the electrophotographic image forming apparatus 100 other than the cartridge B.

In FIG. 1-FIG. 3, the cartridge B has a developing roller 110. The developing roller 110 receives the rotational force through the coupling mechanism as will be described hereinafter from the main assembly A at the time of a developing action to rotate.

A developer t of a predetermined color is accommodated in a developer containing frame 114. More particularly, the frame 114 is provided with a developer accommodating portion 116 which accommodates a developer t. The developer t is supplied to the surface of the developing roller 110 by the rotation of the developer supply roller 115 in the form of a sponge in a developer chamber 113a. And, by the friction between the thin-plate-like developing blade 112, and the developing roller 110, the developer t is triboelectrically charged, and is formed into a thin layer. The developer t of the thin layer on a peripheral surface of the developing roller 110 is fed to a developing position by the rotation. The predetermined developing bias is applied to the developing roller 110.

By this, the developing roller 110 develops an electrostatic latent image formed on the electrophotographic photosensitive drum (photosensitive drum) 107. In other words the electrostatic latent image is developed with the developer t by the developing roller 110. The developer t used for the development of the electrostatic latent image by the developing roller 110 is accommodated in the accommodating portion 116. The developer t accommodated in the accommodating portion 116 is supplied to a developer chamber 113a through a feed opening 116a. An opening 116a is sealed by a sealing member (unshown) which unsealably seals the opening 116a. A user pulls out the sealing member prior to using the cartridge B to unseal the opening 116a. By this, the developer t in the accommodating portion 116 is supplied to the developer chamber 113a.

The developer which has not contributed to the development of the electrostatic latent image, that is, the developer which remains on the surface of the developing roller 110 is scraped off by a roller 115. Simultaneously therewith, the new developer is supplied to the surface of the developing roller 110 by the roller 115. In this manner, the developing operation is carried out continuously.

The developing cartridge B is in the form of a developing unit 119. The developing unit 119 includes a developing device frame 113, and a developer containing frame 114. The developing unit 119 is provided with the developing roller 110, the developing blade 112, the developer supply roller 115, the developer chamber 113a, and the developer containing frame 114.

The developing roller 110 is rotatable about a rotation axis L1 (FIG. 5).

The developing cartridge B is mounted to a developing cartridge accommodating portion 130a of a developing rotary member C provided in the main assembly A by the user (FIG. 4). In this case, as will be described hereinafter, the a drive shaft 180 provided in the main assembly A, and a coupling member 150 of the cartridge B connect with each other in interrelation with the positioning operation of the cartridge B to the predetermined position (photosensitive drum opposing portion) by the developing rotary member C. And, the developing roller 110 receives the rotational force from the main assembly A to rotate. The coupling member is a rotational force transmitting part.

The developing device frame 113 and the developer containing frame 114 constitute a cartridge frame.

(2) Electrophotographic Image Forming Apparatus

Referring to FIG. 4, a color electrophotographic image forming apparatus 100 used with the developing cartridge B will be described. Here, the color electrophotographic image forming apparatus 100 is a color laser beam printer as an exemplary image forming apparatus.

As shown in FIG. 4, a plurality of the cartridges B (B1, B2, B3 and B4) which accommodate different color developers (toner) is mounted on the rotary member C. The mounting and demounting of the cartridge B relative to the rotary member C is carried out by the user. By the rotation of the rotary member C by the rotational force from the motor (unshown), the cartridge B containing the predetermined color developer opposes to the photosensitive drum 107. The electrostatic latent image formed on the photosensitive drum 107 is developed by the developing roller 110 of the cartridge B. A developed image is transferred onto the transfer belt 104a. This development and transfer operation is carried out for each color. By this, a color image is provided. The detailed description will be made. A recording material S is for the formation of an image, and it is paper, an OHP sheet or the like.

As shown in FIG. 4, the light based on the image information is projected from optical means 101 to the photosensitive drum 107. By this, the electrostatic latent image is formed on the photosensitive drum 107. And, the latent image is developed by the developing roller 110 using the developer. By this, the developer image is formed on the photosensitive drum 107. The developer image formed on the photosensitive drum 107 is transferred onto the intermediary transfer member.

Then, the developer image transferred onto the intermediary transfer belt 104a which is a intermediary transfer member is transferred onto the recording material S by a secondary transfer roller 104b as second transferring means. The recording material S onto which the developer image has been transferred is fed to the fixing means 105 which has a pressing roller 105a, and a heating roller 105b. The developer image transferred onto the recording material S is fixed on the recording material S. After the fixing, the recording material S is discharged to a tray 106.

Furthermore, an image formation step will be described.

The photosensitive drum 107 is rotated counterclockwisely (FIG. 4) in synchronism with the rotation of the transfer belt (intermediary transfer member) 104a. The surface of the photosensitive drum 107 is uniformly charged by a charging roller 108. Thereafter, by the optical means 101, the photoirradiation of a yellow image is carried out to the photosensitive drum 107 in response to the image information. By this, an electrostatic latent image corresponding to the yellow color is formed on the photosensitive drum 107.

The exposure means has the following structures The exposure means 101 carries out photoirradiation to the photosensitive drum 107 on the basis of the image information (image signal including color information) read from an external device (unshown). By this, the electrostatic latent image is formed on the photosensitive drum 107. The exposure means includes a laser diode, a polygonal mirror, a scanner motor, an image formation lens, and a reflection mirror (unshown).

In more detail, the laser diode emits light in accordance with the image information, and is directed by the polygonal mirror as the image light. The polygonal mirror is rotated at a high speed by the scanner motor, and the image light reflected by the polygonal mirror is selectively projected to the surface of the photosensitive drum 107 by way of the image formation lens, and the reflection mirror. By this, the electrostatic latent image corresponding to the image information is formed on the photosensitive drum 107.

Simultaneously with a formation of this latent image, the rotary member C is rotated. By this, a yellow cartridge B1 is moved to a developing position. The predetermined bias voltage is applied to the developing roller 110 of a cartridge B1. By this, a yellow developer is deposited to the latent image. By this, the latent image is developed with the yellow developer. Thereafter, a bias voltage of the polarity opposite to the developer is applied to the confining roller (primary transfer roller) 104j of the transfer belt 104a. By this, the developer image of the yellow color formed on the photosensitive drum 107 is transferred primarily onto the intermediary transfer belt 104a.

As has been described hereinbefore, when the primary transfer of the yellow developer image finishes, the rotary member C rotates again. A next cartridge B-2 is moved, and it is positioned to the position which opposes to the photosensitive drum 107. These steps are carried out for a magenta cartridge B-2, a cyan cartridge B3, and a black cartridge B4. By this, the four-color developer image is overlaid on the transfer belt 104a.

The yellow cartridge B1 accommodates the developer of the yellow color, and forms a yellow developer image. The magenta cartridge B-2 accommodates the developer of a magenta color, and forms a magenta developer image. The cyan cartridge B3 accommodates the developer of a cyan color, and forms a cyan developer image. The black cartridge B4 accommodates the developer of a black color, and forms a black developer image. The cartridges B differ in the color of the accommodated developer, but they have the same structures.

During this period, the secondary transfer roller 104b is not in contact with the transfer belt 104a. At this time, a cleaning charging roller 104f is not in contact with the transfer belt 104a, either.

And, after the four color developer image is formed on the transfer belt 104a, the transfer roller 104b is press-contacted to the transfer belt 104a (FIG. 4). Furthermore, in synchronism with a press-contact of the transfer roller 104b, the recording material S which has waited adjacent to a registration roller couple 103e is fed to a nip between the transfer belt 104a, and the transfer roller 104b. Simultaneously, the next recording material S is fed from the cassette 103a by a feeding roller 103b, and the feeding roller pair 103c as the feeding means 103.

Here, a sensor 99 is provided immediately before a registration roller couple 103e. The sensor 99 detects a free end of the recording material S, and in response thereto, the rotation of the registration roller couple 103e is stopped, to make the recording material S wait at the predetermined position.

In addition, the bias voltage of the polarity opposite to the developer is applied to the transfer roller 104b. By this, the developer images on the transfer belt 104a are transferred secondarily onto the recording material S all together.

The recording material S onto which the developer image has been transferred is fed to the fixing means 105 by way of the transportation belt unit 103f. By this, the developer image is fixed on the recording material S. And, the recording material S having been subjected to the fixing is discharged to the discharging tray 106 of the upper portion of the main assembly by the discharging roller pair 103g. By this, the formation of the image on the recording material S is completed.

On the other hand, after the end of the secondary transfer, a charging roller 104f is press-contacted to the transfer belt 104a. By this, the predetermined bias voltage is applied to the developer which remained on the surface of a belt 104a. And, the residual charge is removed.

The discharged residual developer is electrostatically re-transferred onto the photosensitive drum 107 from the belt 104a through the primary transfer nip. By this, the cleaning of the surface of the belt 104a is carried out. The residual developer after the secondary transfer re-transferred onto the photosensitive drum 107 is removed by a cleaning blade 117a which is in contact with the photosensitive drum 107.

The removed developer is collected into a removed developer box 107d along the feeding path (unshown).

An accommodating portion 130a is a chamber which accommodates the cartridge B, and a plurality of such accommodating portions are provided. In the state that the cartridge B is mounted to this chamber, the rotary member C unidirectionally rotates. By this, the coupling member, which will be described hereinafter, of the cartridge B engages and disengages relative to the drive shaft 180 provided in the main assembly A. Cartridge B (developing roller 110) is mounted to the accommodating portion 130a, and therefore, in response to the movement in one direction of the rotary member C, it moves in the direction substantially perpendicular to a direction of the rotation axis L3 of the drive shaft 180.

(3) Structure of Developing Roller

Then, referring to FIG. 5, the structure of the developing roller will be described. In FIG. 5, (a) is a perspective view of the developing roller 110, as seen from main assembly A (driving side). In FIG. 5, (b) is a perspective view, as seen from the non-driving side.

The developing roller 110 includes a shaft portion 110b, and a rubber portion (elastic material) 110a.

The shaft portion 110b is made of electroconductive material such as iron, and has an elongated configuration, and is covered by a rubber portion 110a. The opposite ends 110b1, 110b2 of the shaft portion 110b are supported rotatably through a bearing (unshown) by the developing device frame 113. The developing roller 110 is mounted rotatably to the developing device frame 113.

The rubber portion 110a coats the shaft portion 110b coaxially The rubber portion 110a carries the developer t, and develops the electrostatic latent image by a bias voltage applied to the shaft portion 110b.

A nip width regulation member 136, 137 maintains a uniform width of a nip between the photosensitive drum 107, and the rubber portion 110a in the state that the developing roller 110 contacts to the photosensitive drum 107.

The bearing (unshown) is disposed on each end 110b1, 110b2 of the developing roller 110, to support the developing roller 110 rotatably.

A regulation member 136 is provided at a one end of the developing roller 110, and a regulation member 137 is provided at the other end of the developing roller 110.

In the state of contacting with the photosensitive drum 107 the developing roller 110 of the present embodiment develops the latent image (so-called contact type developing system).

(4) Drive Transmission Mechanism (Rotational-Driving-Force-Transmitting Mechanism)

A development gear 145 is provided at the end of the developing roller 110, and a supplying roller gear 146 is provided at the end of a supplying roller 115 (FIG. 1). And, the gears 145, 146 are fixed to the shaft. By this, the rotational force which the coupling member (coupling) 150 receives from the main assembly A is transmitted to the developing roller 110 through the gear 145, and is transmitted to the supplying roller 115 through a gear 146. The rotational force received by the coupling 150 from the main assembly A may be transmitted to a rotatable member other than the developing roller 110 and the supplying roller 115.

The main assembly A is the portion of the electrophotographic image forming apparatus 100 other than the cartridge B.

Then, a driving input gear (rotatable member) 147 which supports the coupling 150 will be described.

Figure 6:
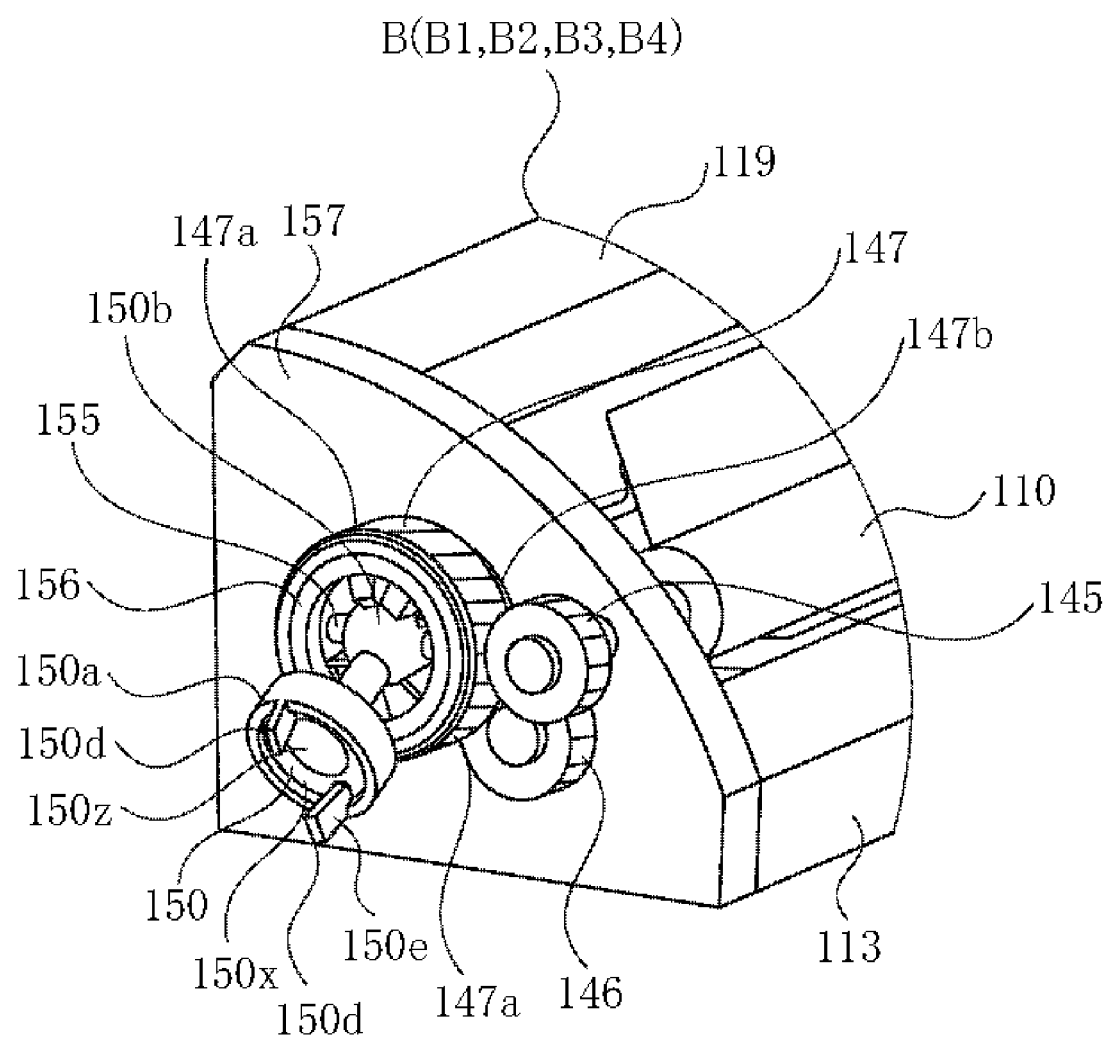
FIG. 6 is a perspective view of a coupling according to an embodiment of the present invention.
Figure 16A:
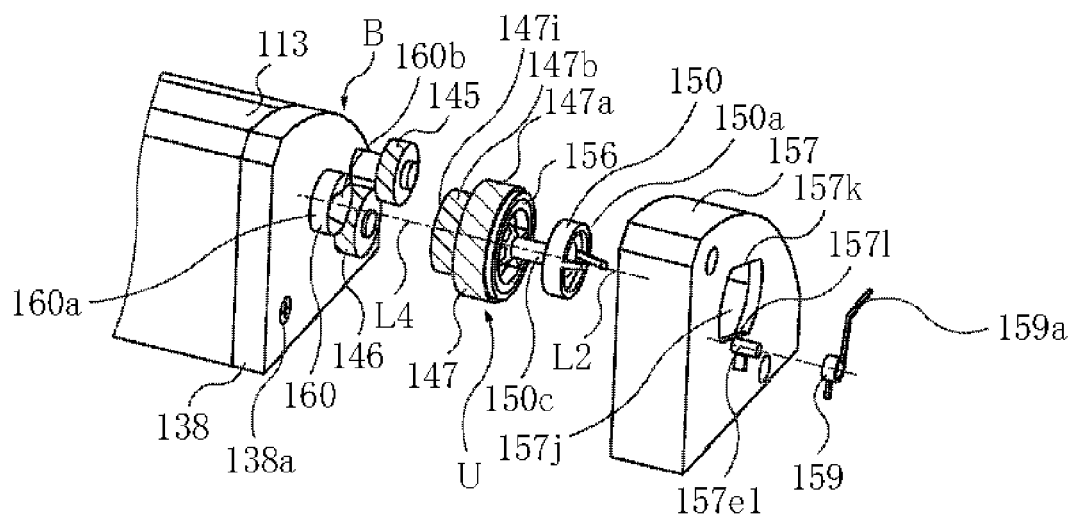
FIGS. 16A, 16B, 16C, 16D and 16E are perspective views illustrating an assembling method of the cartridge drive portion according to an embodiment of the present invention.
Figure 16B:
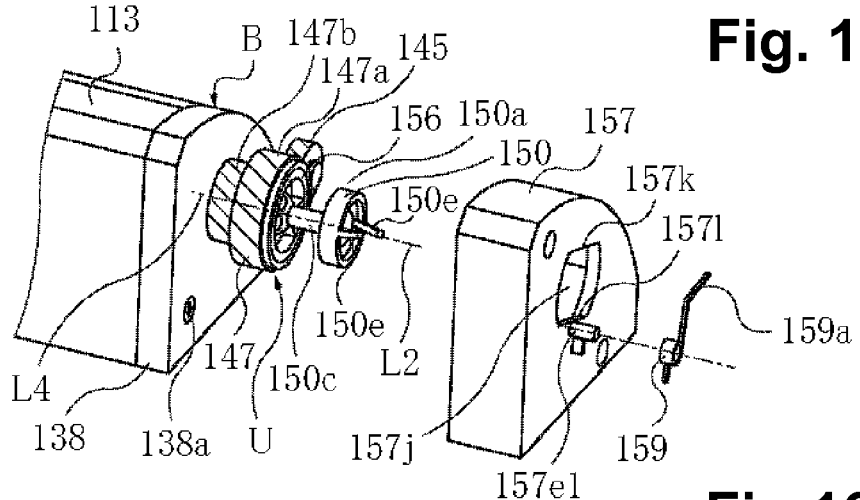

As shown in FIG. 6, a gear 147 is mounted to the developing unit 119 rotatably at the position for meshing engagement with the development gear 145 and the supplying roller gear 146. The gear 147 includes a development gear portion (first gear portion) 147a and a supplying roller gear portion (second gear portion) 147b. A gear portion 147a engages with the development gear 145 to transmit the rotational force received from the main assembly A to the developing roller 110. A gear portion 147b engages with the supplying roller gear 146 to transmit the rotational force received from the main assembly A to the supplying roller 115. The gear 145 is mounted to the end of the developing roller 110. The gear 146 is mounted to the end of the supplying roller 115. The gear 147 is provided with a coupling mounting portion (coupling accommodating portion) 147j (FIGS. 8A-8F) therein. A mounting portion 147j accommodates a driving portion 150b of the coupling 150. The coupling 150 is restricted in the movement in the direction of the arrow X34 relative to the gear 147 by the retaining portion 147k (147k1, 147k2, 147k3, 147k4) provided inside of the gear 147. The coupling 150 is inclinable relative to the mounting portion 147j and relative to a rotation axis L4 of the gear 147 (FIGS. 16A and 16B). More particularly, the coupling 150 is inclinable relative to the axis L4 in the state of being restricted in the movement toward the driven portion 150a of the driving portion 150b relative to the mounting portion 147j by the retaining portion 147k.

The axis L4 is parallel to the rotation axis L1 of the developing roller 110.

The cartridge B has the developing device frame 113 and a supporting member 157, and the supporting member 157 is mounted to the developing device frame 113 (FIG. 2).

Figure 16C:
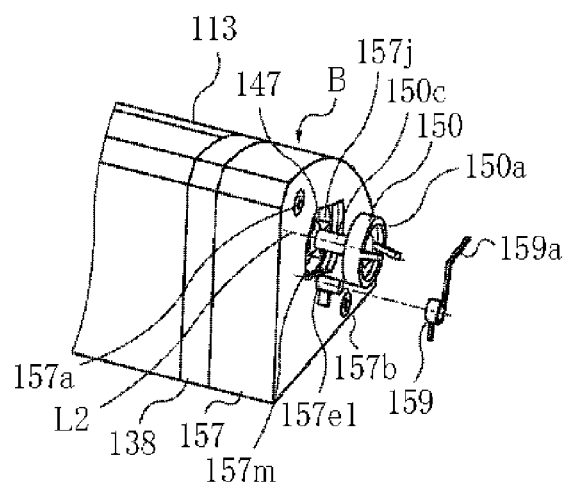
Figure 16D:
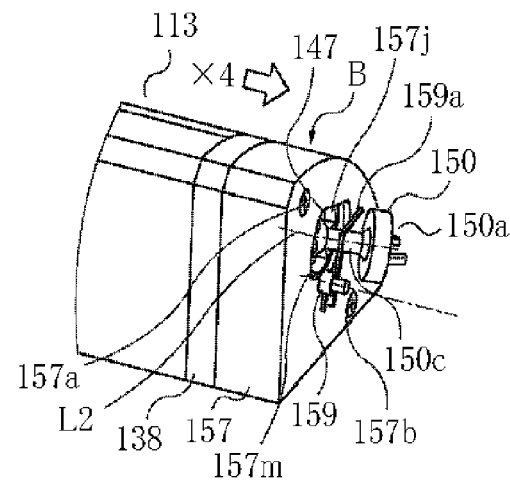
Figure 16E:
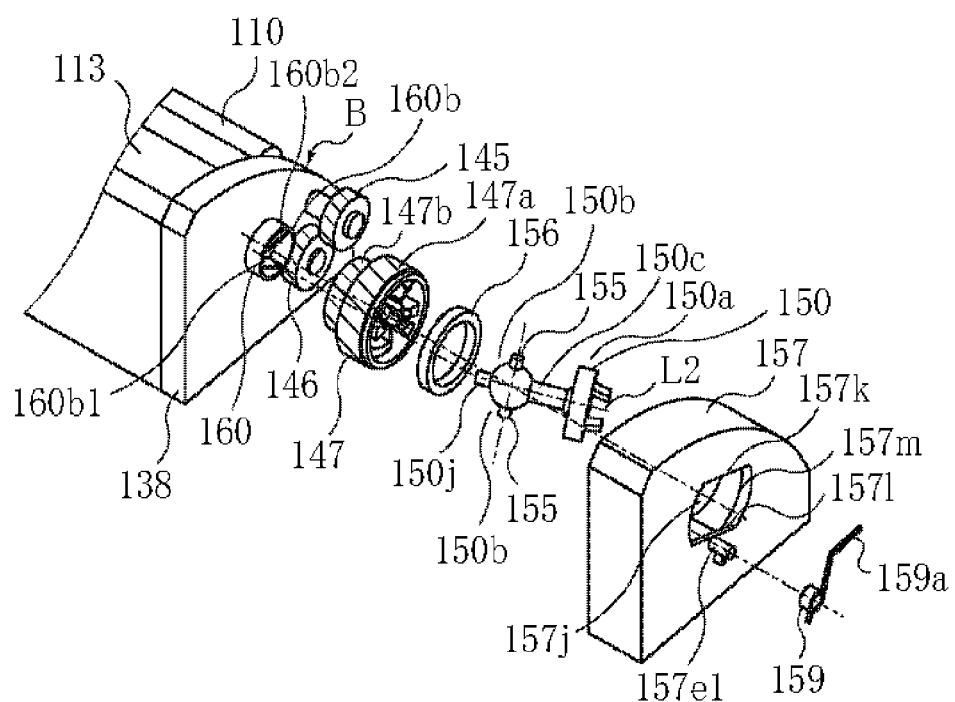

The supporting member 157 is provided with a hole 157j, and the inner surface 157m thereof is in engagement with the gear 147 (FIGS. 16C, 16D and 16E).

(5) Rotational Force Transmitting Part (Coupling, and Coupling Member)

Figure 7E:
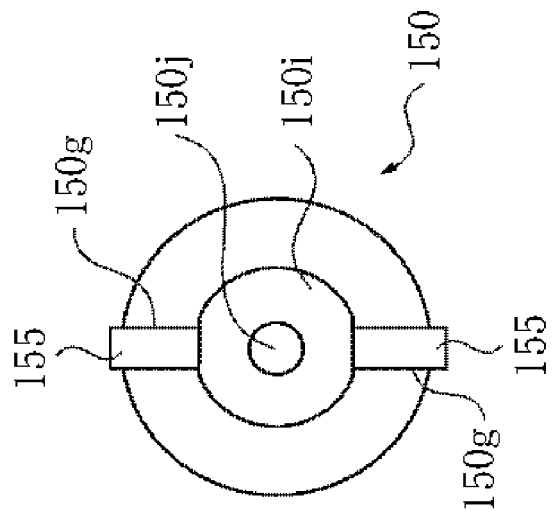
Figure 7B:
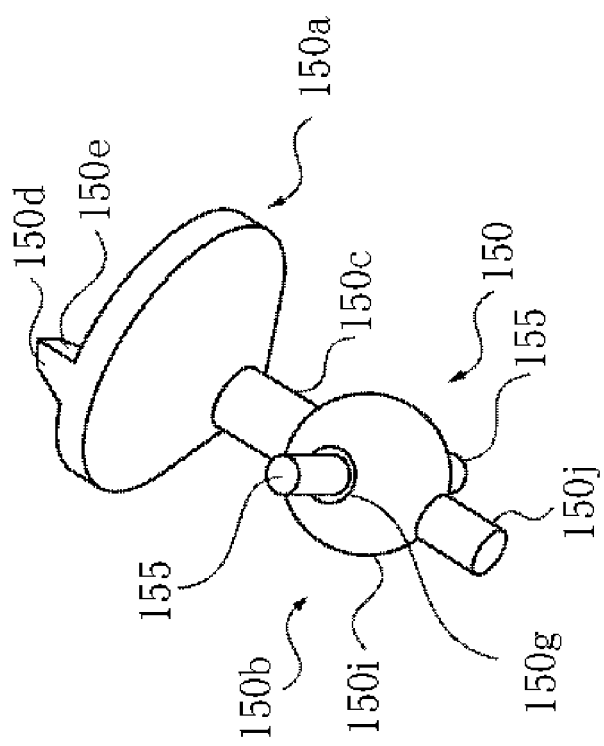
Figure 31:
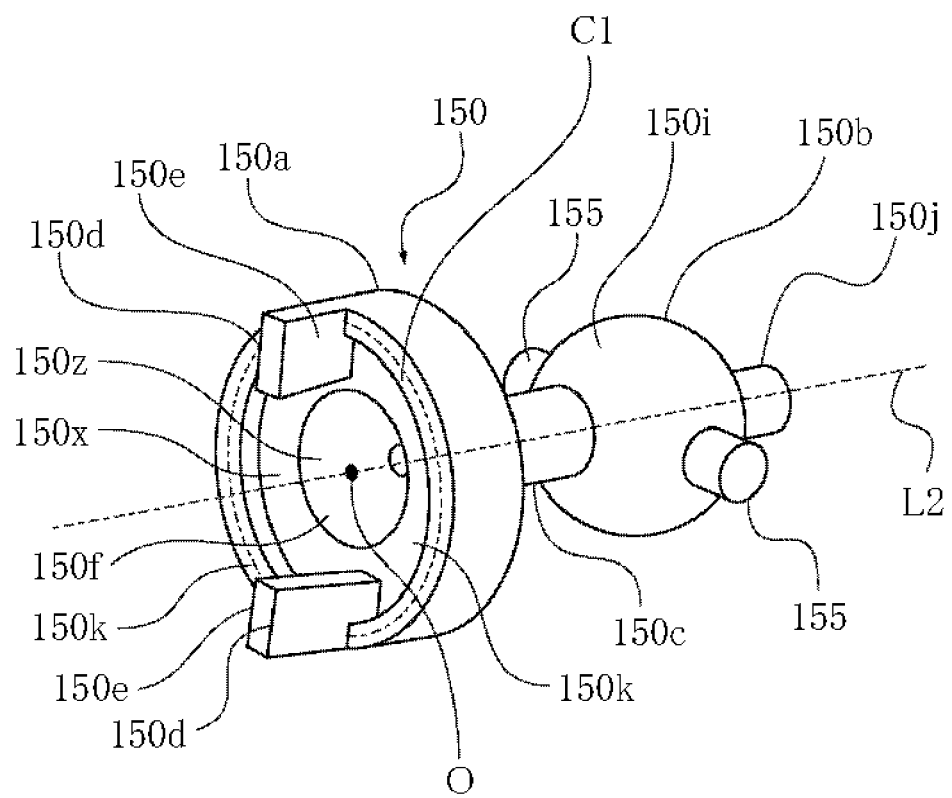
FIG. 31 is a perspective view of the coupling (rotational force transmitting part) according to an embodiment of the present invention.

Referring to FIG. 7A-7F, the description will be made as to an example of a coupling (coupling member) as a rotational force transmitting part according to an embodiment of the present invention. In FIG. 7A is a perspective view of the coupling, as seen from a main assembly side, and FIG. 7B is a perspective view of the coupling, as seen from a developing roller side. In FIG. 7C shows a view of the coupling, as seen in the direction perpendicular to a direction of the rotation axis L2. In FIG. 7D, is a side view of the coupling, as seen from the main assembly side, and FIG. 7E shows a view, as seen from the developing roller side. In FIG. 7E is a sectional view taken along S3 in FIG. 7D. FIG. 31 is a perspective view which illustrates only the coupling illustrated in FIGS. 13A-13G.

The cartridge B is dismountably mounted to a cartridge accommodating portion 130a of the rotary member C provided in the main assembly A. This is carried out by the user. In the state that the cartridge B is mounted to the accommodating portion 130a, the rotary member C is rotated by the rotational force of the motor (unshown). When the cartridge B reaches a predetermined position (the position which opposes to the photosensitive drum 107, that is, the developing position), the rotation of the rotary member C is stopped. By this, the coupling (coupling member) 150 is engaged with the drive shaft 180 provided in the main assembly A. By unidirectionally rotating the rotary member C further, the cartridge B is moved from the predetermined position (developing position). In other words, it is retracted from the predetermined position. By this, the coupling 150 is disengaged from the drive shaft 180. It receives the rotational force from the motor (unshown) provided in the main assembly A in the state that the coupling 150 is in engagement with the drive shaft 180. The rotational force is transmitted to the developing roller 110. By this, the developing roller 110 is rotated by the rotational force received from the main assembly A.

In this embodiment, the coupling 150 receives an external force for rotating the developing roller 110. The coupling 150 rotates the developing roller 110 by transmitting the external force to the developing roller 110. Here, according to this embodiment, the external force is the rotational force transmitted to the coupling 150 by the drive shaft 180. Thus, the coupling 150 receives the external force transmitted from the drive shaft 180 to the coupling 150 to rotate.

In the state that the cartridge B is mounted to the accommodating portion 130a, it is moved in the direction substantially perpendicular to the direction of the rotation axis L3 of the drive shaft 180 in accordance with the rotation of the rotary member C. In response to the rotation in one direction of the rotary member C, the coupling 150 engages with the drive shaft 180, and is disengaged from the drive shaft 180.

As has been described hereinbefore, the drive shaft 180 is provided with a pin 182 (rotational force applying portion), and is rotated by the motor (unshown).

The material of the coupling 150 is desirably a resin material, and is the polyacetal, for example. This is because the balance in the rigidity, the toughness, and the processability thereof is suitable for the present embodiment. However, in order to raise the rigidity of the coupling 150, in consideration of a load torque, the rigidity may be raised by adding the glass fibers in the resin material. In addition, a metallic material may be used. The material can be properly selected by the person skilled in the art. Since the resin material is easy in the processing, the couplings in the present embodiment are made of the resin material.

The coupling 150 mainly has the three portions. The first portion is a driven portion 150a. As shown in FIG. 7C, the driven portion 150a is engaged with the drive shaft 180 (as will be described hereinafter) The driven portion 150a engages with a rotational force transmitting pin 182 as the rotational force applying portion (main assembly side rotational force transmitting part) provided on the drive shaft 180 to receive the rotational force from the pin 182. The second portion is a driving portion 150b. In the driving portion 150b, a pin (rotational force transmitting part) 155 engages with the driving input gear (rotational force receiving portion, and rotational force transmitted portion) 147, and transmits the rotational force to the gear 147. More specifically, the driving portion 150b transmits the rotational force to a mounting portion 147j. The third portion is the intermediate portion 150c connected between the driven portion 150a, and the driving portion 150b.

The pin 182 projects in the each of the two positions opposed to each other in the direction perpendicular to a rotation axis L3 of the drive shaft 180 (182a1, 182a2).

As shown in FIG. 7F, the driven portion 150a has a drive shaft insertion opening 150m which expands from a rotation axis L2 of the coupling 150. The driving portion 150b has a spherical portion 150i, a drive transmission pin 155, and a portion-to-be-regulated-of-the-coupling 150j. Here, the regulating portion 150j is substantially co-axial with an axis L2, and engages with a regulating portion accommodating portion 160b as will be described hereinafter (FIGS. 12A-12D). By this, the regulating portion 150j can regulate an inclining direction of the axis L2. The detail thereof will be described hereinafter.

An opening 150m is provided with a driving shaft receiving surface 150f which has the configuration of a circular cone expanded toward the drive shaft (180) side. As shown in FIG. 7F, a receiving surface 150f constitutes a recess 150z. The recess 150z is provided with an opening 150m (opening) in an opposite side from a driving input gear 147 with respect to a direction of the axis L2.

By this, the coupling 150 can move relative to the rotation axis L3 of the drive shaft 180 (pivoting) without being prevented by a free end portion 180b of the drive shaft 180, irrespective of a rotational phase of the developing roller 110 in the cartridge B. More particularly, the coupling 150 can be moved (pivoted) between the rotational force transmitting angular position (the position shown in (d) of FIG. 24), and the disengaging angular position (the position shown in (c) and (d) of FIG. 27), and between the pre-engagement angular position (the position shown in (a) of FIG. 24), and a rotational force transmitting angular position (the position shown in (d) of FIG. 24).

The detail thereof will be described hereinafter.

The two projections (projections) 150d (engaging portions) are provided at equal intervals along the phantom circle periphery about the axis L2 in the end surface of the circular recess 150z (150d1 or 150d2). The portions between the projection 150d constitute the entrance portions 150k (150k1, 150k2). An interval between the projections 150d1 or 150d2 is larger than an outer diameter of the pin 182 so that the intervals can receive the pin 182 provided in the drive shaft 180. The pin 182 is the rotational force transmitting part. The spaces between the projection are the entrance portions 150k1, 150k2. When the rotational force is transmitted from the drive shaft 180 to the coupling 150, the pins 182 are positioned in the entrance portions 150k1, 150k2, respectively. Furthermore, in FIG. 7D, a upstream side of the projections of each 150d with respect to the clockwise direction is provided with a rotational force reception surface (rotational force receiving portion) 150e (150e1, 150e2). This rotational force reception surface 150e is faced against a rotational direction of the coupling 150. More particularly, the projection 150d1 is provided with the receiving surface 150e1, and the projection 150d2 is provided with the receiving surface 150e2. In the state that the drive shaft 180 rotates, the pins 182a1, 182a2 abut to either of the receiving surfaces 150e. By this, the pins 182a1, 182a2 push the contacted receiving surfaces 150e. By this, the coupling 150 is rotated about the axis L2.

More particularly, the coupling 150 receives the external force for rotating the developing roller 110. The coupling 150 rotates the developing roller 110 by transmitting the external force to the developing roller. Here, according to this embodiment, the external force is a rotational force transmitted to the coupling 150 by the drive shaft 180. More particularly, the coupling 150 receives the external force transmitted to the coupling 150 by the drive shaft 180 to rotate.

In this embodiment, the projections 150d (rotational force receiving surfaces 150e) are disposed on the phantom circle periphery about the axis L2, and they oppose with each other interposing the center. Therefore, to the coupling 150, the force is uniformly transmitted from the drive shaft 180. By this, the coupling 150 can stably be rotated with high degree of accuracy. In this embodiment, only two projections 150d (rotational force reception surfaces) are employed 150e, and therefore, the sizes of the entrance portions 150k are large. By this, the pin 182 enters easily into the entrance portion 150k. Therefore, the contact between the rotational force reception surface 150e, and the pin 182 is assured.

As shown in FIG. 7F, the receiving surface 150f has the conical shape, the center thereof is on the axis L2, and the apex angle thereof is α2. By this, in the case where the coupling 150 is in the rotational force transmitting angular position in the state that the coupling 150 and the drive shaft 180 are in engagement with each other, the free end 180b of the drive shaft (FIG. 24) abuts to the receiving surface 150f. The axis of the conical shape 1, i.e., the axis L2 of the coupling 150, and an axis L3 (FIG. 26) of the drive shaft 180 are substantially co-axial with each other. By this, the coupling 150, and the drive shaft 180 align with each other, and a torque transmitted to the coupling 150 is stabilized. In this embodiment, α2 is 60 degrees-150 degrees. Depending on the angle of α2, the non-conical portions 150n of the opening 150m (FIG. 7A, and FIG. 7D) may be wide, or it may not be provided (FIG. 8B).

It is desirable that the rotational force reception surface 150e is provided on a phantom circle (common circle) C1 which has the center O on the axis L2 (FIG. 7D). By this, the radius of rotational force transmission is constant, and therefore, the torque transmitted is stabilized. In addition, as for the projection 150d, the position of the coupling 150 is preferably stabilized by the balance of the forces received by the coupling 150, by. For this reason, in the present embodiment, the receiving surfaces 150e are spaced by 180 degrees. In other words, in this embodiment, the receiving surface 150e1, and the receiving surface 150e2 diametrically oppose with respect to the axis L2. By this, the forces which the coupling 150 receives form a force couple. For this reason, rotation of the coupling 150 can be continued only by receiving the force couple. In other words, the coupling 150 can be rotated without the regulation of the position of the axis L2.

Here, in the case of the present embodiment, a diameter of the pin 182 is approx. 2 mm. And, a circumferential length of the entrance portion 150k is approx. 8 mm. Here, the circumferential length of the entrance portion 150k is the interval between the adjacent projections 150d on the phantom circle. However, the present invention is not limited to these values. In this manner, the pins 182 enter easily the entrance portions 150k.

In addition, the projection 150d is provided at a free end portion of the recess 150z. In other words, it is provided at the free end portion of the coupling 150. And, the projection (projection) 150d projects in a crossing direction crossing with the rotational direction of the coupling 150, and it is provided at the two places with the intervals along the rotational direction. By using the two projections 150d, more assured engagement is possible in engaging with the rotating drive shaft 180.

Rotary member C (accommodating portion 130a) rotates in the state that the cartridge B is mounted. In the state that the developing roller 110 of a desired developing cartridge B is placed in the developing position with the rotary member C which is not rotated, the coupling 150 is engaged with the drive shaft 180. The receiving surface 150e is in the state engageable with the pin 182. Or, the receiving surface 150e engages with the pin 182. The receiving surface 150e is pushed by the pin 182 for receiving the force from the rotated drive shaft 180. By this, the receiving surface 150e receives the rotational force from the drive shaft 180. In addition, the receiving surfaces 150e are equidistant from the axis L2, it is the surfaces of the projections 150d which diametrically oppose to each other, and face in the circumferential direction.

An entrance portion (recess) 150k is recessed in the direction of the axis L2. The entrance portion 150k is formed as the space between the projection 150d, and the projection 150d. In the case where the drive shaft 180 is at rest, and when the coupling 150 engages with the drive shaft 180, in the state that the cartridge B is mounted to the rotary member C, the pin 182 enters the entrance portion 150k. And, the receiving surface 150e is pushed by the pin 182 of the drive shaft 180. Or, when the coupling 150 engages with the drive shaft 180, in the case where the drive shaft 180 already rotates, the pin 182 enters the entrance portion 150k to push the receiving surface 150e. By this, the coupling 150 is rotated. The rotational force reception surface (rotational force receiving portion) 150e may be inside of the driving shaft receiving surface 150f. Or, the receiving surface 150e may be disposed at the portion which outwardly projected from the receiving surface 150f in the direction of the axis L2. In the case where the receiving surface 150e is disposed inside of the receiving surface 150f, the entrance portion 150k is also disposed inside of the receiving surface 150f. In other words, the entrance portion 150k is the recess, and is disposed inside of the arc portion of the receiving surface 150f, and between the projections 150d. In the case where the receiving surface 150e is disposed at the portion which outwardly projects, the entrance portion 150k is the recess, and is disposed between the projections 150d. Here, the recess may be the hole penetrated in the direction of the axis L2 or may have the bottom portion. It is satisfactory if the recess is a space region which is between the projections 150d. And, it will be satisfactory if the pin 182 can be entered into the region in the state that the cartridge B is mounted to the rotary member C.

The free end of the driving portion 150b is a spherical surface, so that irrespective of the rotational phase in the cartridge B of the gear 147, it can move between the rotational force transmitting angular position and the pre-engagement angular position (or the disengaging angular position) relative to an axis L1 (FIG. 10) of the gear 147. Here, the rotational force transmitting angular position is a first angular position. The pre-engagement angular position is a second angular position. The disengaging angular position is a third angular position. In the illustrated example, the driving portion 150b is provided with a spherical retaining portion 150i which has the axis L2 as its axis. A fixing hole 150g co-axial with the centerline of the driving portion 150b is provided, and the fixing hole is penetrated by the transmission pin 155. Furthermore, the driving portion 150b is provided with a cylindrical regulating portion 150j co-axial with the axis L2 at the position which opposes to the intermediate portion 150c. The regulating portion 150j is engaged with the regulating portion accommodating portion 160b as will be described hereinafter (FIGS. 12A-12D). By this, the inclining direction of the axis L2 of the coupling is regulated. The detail thereof will be described hereinafter.

The coupling 150 has an integral structure in this embodiment however separate driven portion 150a, intermediate portion 150c, and driving portion 150b may be connected. Other various structures are usable, but it is satisfactory if the integral operation is possible as the coupling.

In addition, the coupling 150 is provided with a circular flat portion 150x and a circular recess 150z at the center O of the flat portion 150x at the free end portion. A rotational force receiving portion 150e projects from the edge of the flat portion 150x, and they oppose to each other interposing the center of the flat portion 150x (FIG. 6 and so on). In other words, the free end portion which is provided with the rotational force reception surface (rotational force receiving portion) 150e is provided with the circular flat portion 150x, and the circular recess 150z provided at the center of the flat portion 150x.

Here, the flat portion 150x may not be employed. However, in the case where the rotation axis of the rotary member C swings as shown in the present embodiment, it is preferable to provide the flat portion 150x because when the coupling 150 is engaged with the drive shaft 180, the engagement is still more assured.

As has been described hereinbefore, the coupling 150 as the rotational force transmitting part is used for the developing cartridge B. The cartridge B is mounted, and dismounted with the movement in the direction substantially perpendicular to a direction of the axis L3 of the drive shaft 180 relative to the main assembly A of the electrophotographic image forming apparatus. In other words, the cartridge B is moved in the direction substantially perpendicular to the direction of the axis L3 of the drive shaft 180. The drive shaft 180 is provided in the main assembly A. The cartridge B is provided with a regulation member 160 which includes a permitting portion 160b2, and a regulating or confining portion 160b1. The permitting portion 160b2 permits the revolution of the coupling 150 substantially. The regulating portion 160b1 restricts an inclination angle position of the coupling 150. In the state that the regulating portion 150j as the projection is positioned in the permitting portion 160b2, the regulating portion 150j is not engaged or contacted relative to the regulation member 160.

The coupling 150 has a spherical portion (retaining portion) 150*i*, and the recess 150*z* at the one-end portion of the spherical portion 150*i* with respect to the longitudinal direction of the coupling 150. The recess 150*z* is provided at the one-end portion in the longitudinal direction. The spherical portion 150*i* is provided at the other end portion opposite from the one-end portion. The recess 150*z* is engaged with the drive shaft 180 in the state that the cartridge B is mounted to the main assembly A. The coupling 150 has the projection 150*d*. The projections 150*d* oppose to each other interposing center of the recess 150*z* O (rotation axis), and they project in the direction away from the spherical portion 150*i* in the longitudinal direction L1. In other words, the projections project in the longitudinal direction at the free end of one-end portion in the longitudinal direction 150*d*. The projections 150*d* receive the rotational force from the drive shaft 180 in the state that the cartridge B is mounted to the main assembly A. The projection 150*d* is provided in each of the positions. The coupling 150 has the regulating portion 150*j* as the projection which projects at the other end portion of the spherical portion 150*i* in the longitudinal direction. The regulating portion 150*j* is movable between the permitting portion 160*b*2 for permitting the substantial revolution of the coupling 150, and the regulating portion 160*b*1 for regulating the inclination angle position of the coupling 150 in the state that the coupling 150 is mounted to the cartridge B.

The coupling 150 includes the a plurality of pins (rotational force transmitting part, and projection) 155 which outwardly project from the spherical portion 150*i* interposing the spherical portion 150*i* between the projection 150*d*, and the regulating portion 150*j* with respect to the longitudinal direction of the coupling 150. A pin 155 transmits the rotational force received by the projection 150*d* from the drive shaft 180 to the developing roller 110 in the state that the cartridge B is mounted to the main assembly A. In other words, the pin 155 is engaged with the rotational force reception surface (rotational force transmitted portion) 147*h* to transmit the rotational force to a receiving surface 147*h*. By this, the gear 147 rotates, to transmit the rotational force to the developing roller 110 through the first gear portion 147*a* of the gear 147. In addition, the rotational force is transmitted to the supplying roller 115 through the second gear portion 147*b* of the gear 147.

Here, the longitudinal direction of the coupling 150 is directed by the free end of the projection 150*d* from the free end of the regulating portion 150*j*.

Furthermore, the coupling 150 includes the circular flat portion 150*x* at the free end portion which is provided with the projection 150*d*. The recess 150*z* is provided at the center O of the flat portion 150*x*. The projection 150*d* projects from the edge of the flat portion 150*x*, and it opposes relative to each other interposing the center O of the flat portion 150*x*.

Here, the projection 150*d* is disposed on the phantom circle C1 about the center O. In addition, the regulating portion 150*j* has a cylindrical shape.

Referring to FIGS. 8A-8F, a development input gear 147 which supports the coupling 150 will be described.

An opening 147*g*1 or 147*g*2 shown in FIG. 8A are the groove extended in a rotational axis direction of the driving input gear 147. In mounting the coupling 150 a rotational force transmitting pin (rotational force transmitting part, and projection) 155 enters the openings 147*g*1 or 147*g*2.

The transmission pin 155 moves in the opening 147*g*1 or 147*g*2. By this, the coupling 150 is movable between the rotational force transmitting angular position, and the pre-engagement angular position (or disengaging angular position) irrespective of the rotational phase of the driving input gear 147 in the cartridge B.

Figure 8C:
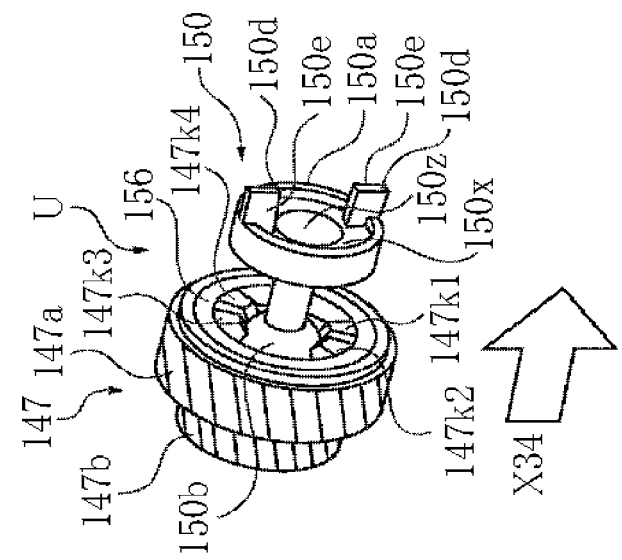
Figure 8E:
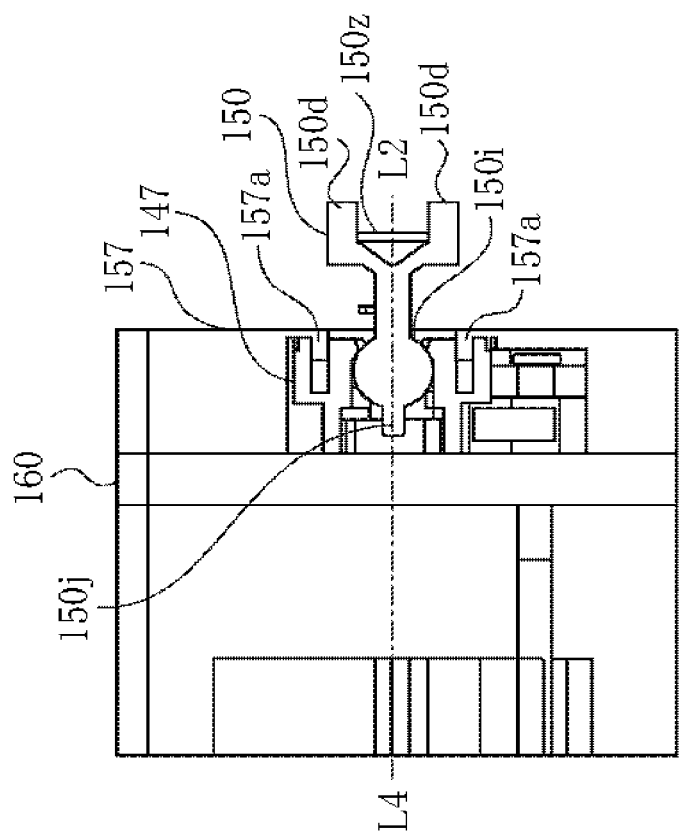
Figure 8D:
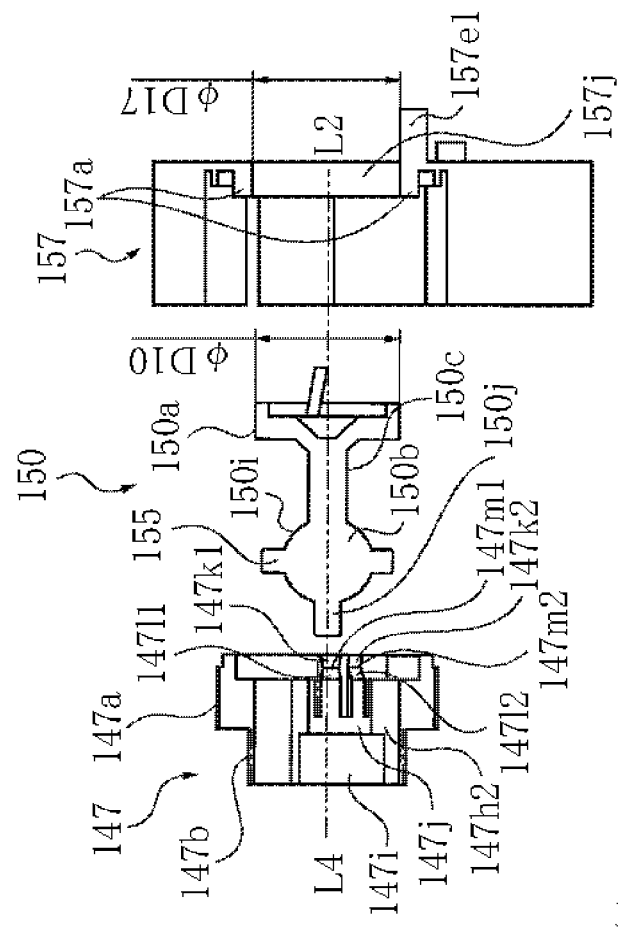

In FIGS. 8A, and 8D, the clockwisely upstream side of the opening 147 (147*g*1 or 147*g*2) is provided with the rotational force reception surface (rotational force transmitted portion) 147*h* (147*h*1 or 147*h*2). A side of the transmission pin (rotational force transmitting part) 155 of the coupling 150 contacts to the receiving surface 147*h*. By this, the rotational force is transmitted to the developing roller 110. In other words, the transmitting surfaces 147*h*1-147*h*2 are the surfaces crossed to the rotational direction of the driving input gear 147. By this, the transmitting surface 147*h* (147*h*1 or 147*h*2) is pushed by the side of the transmission pin 155 to rotate about rotation axis L1 (FIG. 8B). Here, the axis L4 is the rotation axis of the gear 147.

As will be described hereinafter, the coupling 150 is provided with a gap between the pin (rotational force transmitting part) 155, and the rotational force reception surface (rotational force transmitted portion) 147*h* engaged with it (FIG. 8D) so that it can incline in the substantially all directions relative to the axis L4.

In this manner, the coupling 150 is mounted to the longitudinal end portion of the cartridge B. Therefore, the coupling 150 is inclinable in the substantially all directions relative to the rotation axis L4. As has been described hereinbefore, in the state that the cartridge B is mounted to a rotary member C the coupling 150 receives the rotational force from the drive shaft 180, and transmits the rotational force to the developing roller 110 (and supplying roller 115). The coupling 150 has the rotational force reception surface 150*e* for receiving the rotational force from the drive shaft 180 by engaging with the pin 182, and the pin (projection) 155 for transmitting the rotational force received through the receiving surface 150*e* to the developing roller 110. The pin 182 is the rotational force applying portion. The rotational force reception surface 150*e* is the rotational force receiving portion. The pin 155 is the rotational force transmitting part. The pin 155 is engaged with the rotational force reception surface (rotational force transmitted portion) 147*h* to transmit the rotational force to the receiving surface 147*h*. By this, the gear 147 rotates, to transmit the rotational force to the developing roller 110 through the first gear portion 147*a* of the gear 147. The rotational force is transmitted to the supplying roller 115 through the second gear portion 147*b* of the gear 147.

When the rotary member C rotates, the coupling 150 contacts to the drive shaft 180 in accordance with the movement of the cartridge B. By this, the coupling 150 moves from the pre-engagement angular position to the rotational force transmitting angular position with the movement of the coupling 150 to the permitting portion 160*b*2 from the regulating portion 160*b*1. By this, the coupling 150 opposes to the drive shaft 180 to receive the rotational force from the drive shaft 180. And, when the rotary member C further rotates from the position in which the coupling 150 opposes to the drive shaft 180, the coupling 150 moves from the rotational force transmitting angular position to the disengaging angular position in accordance with the movement of the cartridge B. By this, the coupling 150 disengages from the drive shaft 180.

As shown in FIG. 8B), the gear 147 is provided with a coupling mounting portion 147*j* which accommodates the drive transmitting portion 150*b* of the coupling 150.

The mounting portion 147*j* is provided with the retaining portion (spherical portion) 147*k* (147*k*1-147*k*4) for preventing the disengagement, from the gear 147, of the accommodated transmitting portion 150*b*.

FIG. 8B is a sectional view illustrating the step of fixing the coupling 150 to the gear 147.

First, the coupling 150 is moved in an X33 direction. Then, the transmitting portion 150b is inserted into the mounting portion 147j. Before the insertion, the diameter φZ6 of retaining portion (spherical portion) 150i is larger than diameter D15 (FIG. 8A) of the circle constituted by the inside edge lines 147m (147m1-147m4) of the retaining portion 147k. In other words, a relation of Z6>D15 is satisfied.

In accordance with the insertion of the transmitting portion 150b, retaining portion 147k (147k1-147k4) is temporarily retracted radially outwardly of the gear 147 by the elastic deformation thereof. By this, the transmitting portion 150b can be inserted into the mounting portion 147j. In other words temporarily, the relation of D15>Z6 is satisfied. When the insertion of the transmitting portion 150b to the mounting portion 147j is completed, the retaining portion 147k (147k1-147k4) elastically deformed is restored. In other words the relation of Z6>D15 is satisfied.

Then, the retaining member 156 is inserted in the direction of the arrow X33, and is fixed to the gear 147. Here, the outer diameter D10 of the driven portion 150a is smaller than the diameter D16 of an opening 156i of the retaining member 156. In other words the relation of D16>D10 is satisfied. By satisfying this relation, in the state that the coupling 150 is inserted into the gear 147, the retaining member 156 can be inserted into the gear 147. As shown in FIG. 8C, by the insertion of the retaining member, the elastical deformation of retaining portion 147k (147k1-147k4) radially outward of the gear 147 is prevented. By this, the relation of Z6>D15 is maintained. In this state, even in the case where the force in the direction opposite from the inserting direction is applied to the coupling 150, the disengagement of the coupling 150 from the gear 147 can be prevented. In addition, the force in the direction opposite an inserting direction is the force in X34 direction when the coupling 150 (transmitting portion 150b) disengages from the mounting portion 147j. This is because, the transmitting portion 150b is contacted to the retention surface 147l (147l1-147l4 (147l3 and 147l4 are unshown), FIG. 8B)) of the retaining portion 147k (147k1-147k4), and the further movement is restricted. The mounting portion 147j is provided inside of the gear 147.

By this, the coupling 150, the gear 147 and the retaining member 156 are unified to provide a drive unit U (FIG. 8C, 8A and FIG. 16B)).

As shown in FIG. 8E, the retaining member 156 as will be described hereinafter which functions as a coupling retaining portion 157a of the supporting member 157 can be unified with the supporting member 157. In this case, the step of fixing the retaining member 156 to the gear 147 in the step described above is omitted. In mounting the coupling 150 as will be described hereinafter to a developing device frame (cartridge frame) 113, the coupling retaining portion 157a of the supporting member 157 is inserted into the gear 147 (FIG. 8F). In the state shown in FIG. 8F, the retaining portion 157a prevents the radially outward elastical deformation of the retaining portion 147k (147k1-147k4) of the gear 147. By this, the retaining portion 157a prevents the disengagement of the coupling 150 from the gear 147. A function of the retaining portion 157a described above is the same as the function of the retaining member 156.

The coupling 150 is movable (pivotable) between the rotational force transmitting angular position, and the disengaging angular position, and between the rotational force transmitting angular position, and the pre-engagement angular position in the gear 147. Retaining portion 147k (147k1-147k4) restricts the movement of the coupling 150 in the direction of X34 relative to the gear 147. In other words, the inside edge line 147m (147m1-147m4) of an opening has a diameter φD15 smaller than a diameter Z6 of the retaining portion 150i.

As has been described hereinbefore, a bearing portion 160a engages rotatably with the gear 147 (rotatable member) which has the development gear portion (first gear portion) 147a, and the supplying roller gear portion (second gear portion) 147b. The coupling 150 is mounted to the inside of the gear 147. The coupling 150 is mounted. By such a structure, a coupling mounting structure is a compact. Similarly to the projection 150d, it is desirable that a rotational force transmitting surface (rotational force transmitting part) 150h1 or 150h2 diametrically opposes on the same circumference.

By the unification as described above, the coupling 150, and the gear 147 can be treated as a unit. By this, a handling at the time of assembling the coupling 150 to the cartridge B is easy. Therefore, the improvement of the assembling property can be accomplished. If strength of the retaining portion 147k is sufficient, the retaining member may be omitted.

As has been described hereinbefore, the coupling 150 is mounted to the gear 147, so that a rear end portion thereof is revolvable inside of the gear (rotatable member) 147, and the coupling 150 does not disengage from the gear 147. In other words the coupling 150 has the retaining portion (spherical portion) 150i so that the movement toward the free end portion in the longitudinal direction (direction of the axis L2) of the coupling 150 is regulated. The pin (rotational force transmitting part) 155 projects in the direction perpendicular to the longitudinal direction from the retaining portion 150i. The movement of the retaining portion 150i toward the free end portion is regulated by the retaining portion 147k. By such the structure, the coupling mounting structure is compact.

The free end portion of the coupling 150 is the side which opposes to the drive shaft 180 (side engaged with the drive shaft 180) in the state that the cartridge B is mounted to the rotary member C. The rear end portion is the side opposite from the free end portion, and is the side at which the rotational force is transmitted to the developing roller 110 (side mounted to the gear 147).

Referring to FIGS. 10A1-10A5 and 10B1-10B5, the description will be made as to a range of the movement of the coupling 150 relative to the gear 147.

FIG. 10 is a view showing a connection state between the gear 147 and the coupling 150. (a1)-(a5) of FIG. 10 is a view, as seen in the direction of the drive shaft 180, and (b1)-(b5) of FIG. 10 is a perspective view thereof.

As shown in FIG. 10, the coupling 150 is mounted so that the rotation axis L2 thereof can incline in all directions relative to the axis L4. The drive shaft 180 is provided in the main assembly A at the one longitudinal end portion of the rotary member C. The drive shaft 180 is provided at the predetermined position in the main assembly A so that it is rotatable. The drive shaft 180 is fixed to the main assembly A so that it does not move in the direction substantially perpendicular to the rotation axis thereof. In other words a rotation axis of the drive shaft 180 per se does not shift in the direction substantially perpendicular to the rotation axis thereof. The drive shaft 180 is not mounted to a member which swings in the direction substantially perpendicular to the rotation axis thereof with the rotary member C. The axis L2 is co-axial with the axis L4 in (a1), and (b1) of FIG. 10. FIGS. 10A2 and 10B2 show the state when the coupling 150 inclines upward from this state. The coupling 150 inclines toward an opening 147g. In this state, the transmission pin 155 is moved along the opening 147g ((FIGS. 10A2 and B2). As a result, the coupling 150 inclines about an axis AX perpendicular to the opening 147g.

In FIGS. 10A3 and 10B3, the coupling 150 inclines rightward. When the coupling 150 this inclines in the orthogonal direction perpendicular to the opening 147g, the pin 155 is rotated in the opening 147g. The axis of the pin 155 at the time of the pin 155 rotating is the central axis AY of the pin 155.

In FIGS. 10A4 and 10B4, and FIGS. 10A5 and 10B5, the state that the coupling 150 is inclined downward, and the state of being inclined leftward are shown. The coupling 150 inclines about the rotation axes AX and AY.

Here, the inclination of the coupling 150 is a combined inclination of the rotation around the axis AX, and the rotation around the axis AY. In addition, this direction is the direction shown in FIGS. 10A2 and 10A3; 10A3 and 10A4; 10A4 and 10A5; and 10A5 and 10A2. In this manner, the axis L2 can incline in all directions relative to the axis L1.

It has been described that the axis L2 is inclinable in all directions relative to the axis L4. However, it is not necessary that the axis L2 is inclinable to the predetermined angle in any direction over 360 degrees to the axis L4. For example, the opening 147g is made relatively wide in the circumferential direction, for example. With such a setting, when the axis L2 inclines relative to the axis L4, the coupling 150 rotates slightly about the axis L2 even in the case where the coupling cannot incline up to the predetermined angle linearly. By this, the axis L2 can incline to the predetermined angle relative to the axis L4. In other words a play in the rotational direction of the opening 147g can be selected properly, as needed.

As has been described hereinbefore referring to FIG. 8A-8F, a spherical surface 150i contacts to the retention surface 147l. For this reason, the coupling 150 is mounted rotatably about the center P2 of the spherical surface 150i. In other words, the axis L2 is inclinable irrespective of a phase of the gear 147. In further words the coupling 150 is revolvable relative to the axis L4. As will be described hereinafter, in order to engage the coupling 150 with the drive shaft 180, it is necessary that the axis L2 inclines toward the downstream side with respect to a rotational direction X4, relative to the axis L4, immediately before the engagement. As shown in FIGS. 11A-11D, in other words, it is necessary that the axis, l2 of the coupling 150 inclines relative to the axis L4, so that the position of the driven portion 150a is the downstream with respect to the rotational direction X4 of the rotary member C.

Figure 9:
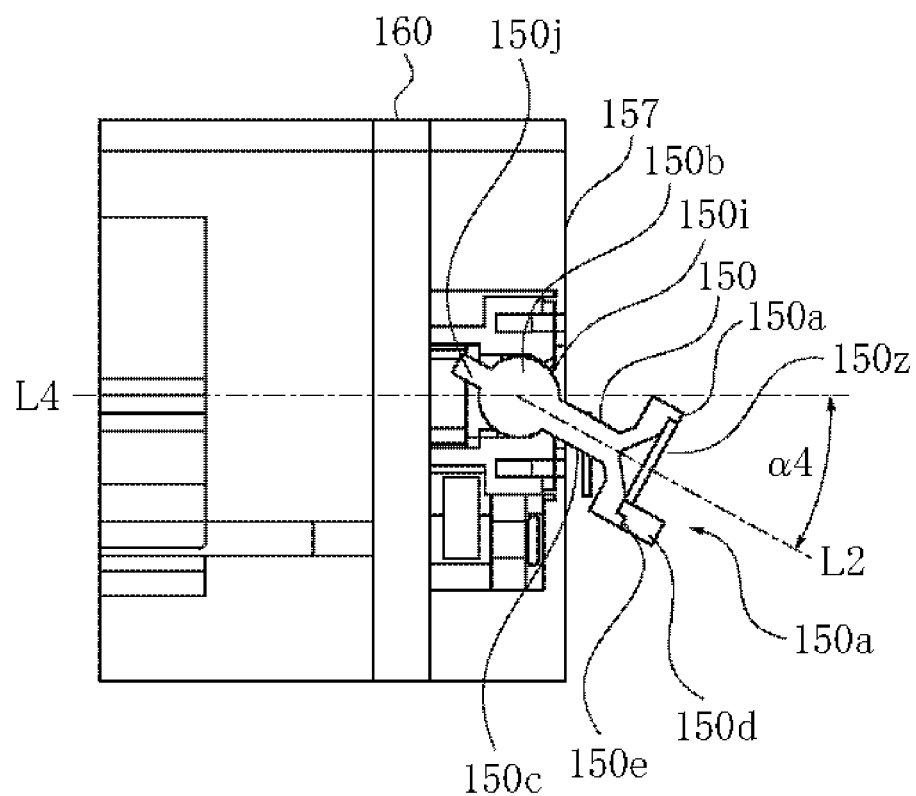
FIG. 9 is a sectional view of a developing cartridge according to an embodiment of the present invention.
Figure 11A:
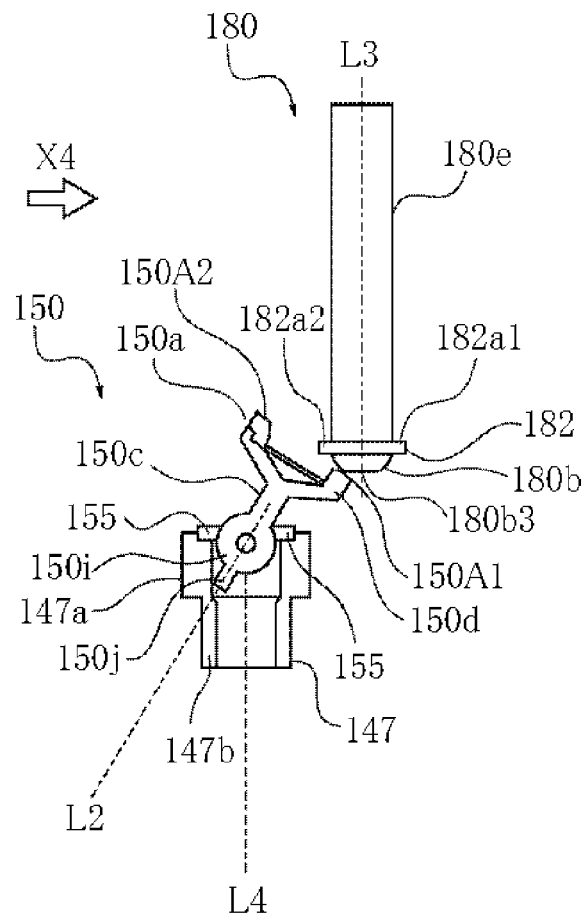
FIGS. 11A, 11B, 11C and 11D are longitudinal sectional views of a coupling according to an embodiment of the present invention.
Figure 11B:
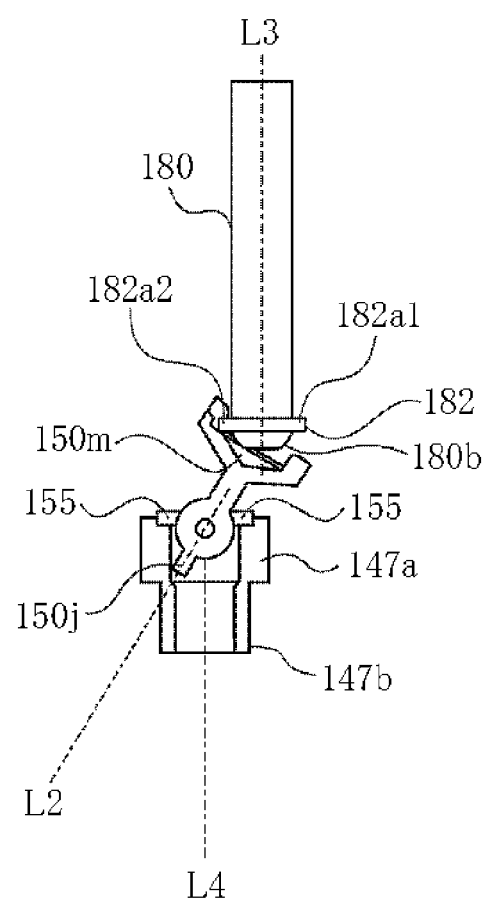
Figure 11C:
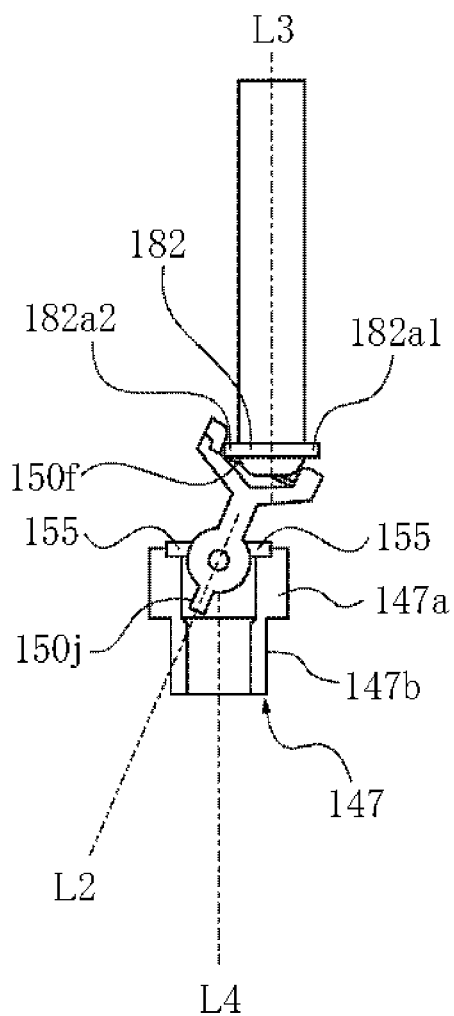
Figure 11D:
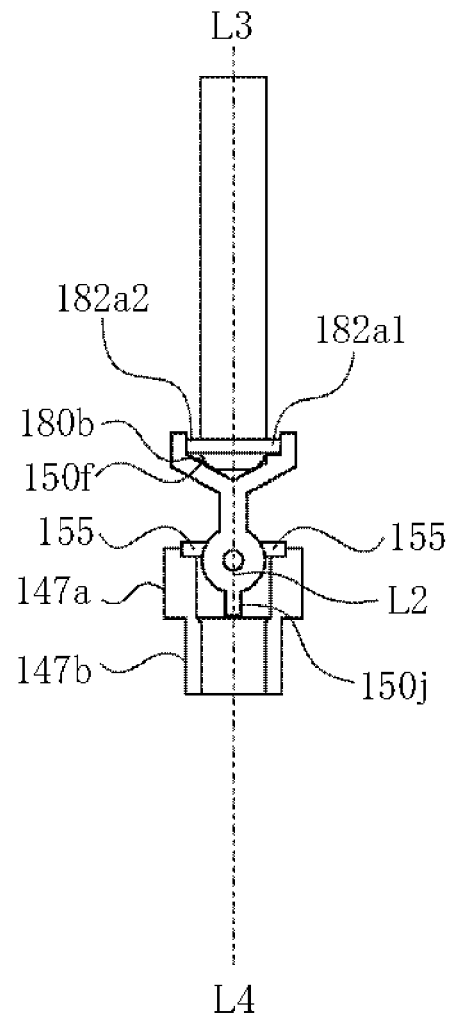

FIG. 2 illustrates the state that the axis L2 inclines relative to the axis L4. FIG. 9 is a sectional view taken along S24-S24 of FIG. 2.

By the structure described in the foregoing, the coupling can also be shifted to the state that the axis L2 is substantially parallel with the axis L4 from the state that the axis L2 inclines as shown in FIG. 9. The maximum possible inclination angle α4 (FIG. 9) of the axis L4 and the axis L2 is the angle that a driving portion 150a and intermediate portion 150c contacts to the end member 151, and the supporting member 157. The angle α4 may be set to the angle required when mounting and demounting on the main assembly.

Here, the maximum possible inclination angle α4 is 20 degrees-80 degrees in the case of the present embodiment. In the foregoing, it has been described hereinbefore that it is necessary that the axis L2 inclines downstream in the rotational direction X4 relative to the axis L4 immediately before the coupling 150 engages with the drive shaft 180. The regulating or confining method will be described.

(6) Angular Position Regulating Member

Referring to FIGS. 12A-12D and FIGS. 13A-13G, the description will be made as to the angular position regulation member (regulation member) for regulating the inclining direction of the coupling 150.

The rotational force transmitting angular position is the first angular position. The pre-engagement angular position is the second angular position. The disengaging angular position is the third angular position.

According to the regulation member 160 of the present embodiment, the coupling 150 can be maintained in the pre-engagement angular position (second angular position) even if it is before the cartridge B is mounted to the rotary member C. The coupling 150 can be maintained in the pre-engagement angular position (second angular position) also in the free state of the cartridge B. Therefore, when the cartridge B is transported, for example an unintended movement of the coupling 150 is prevented.

This is one of the remarkable effects according to an embodiment of the present invention.

Figure 12A:
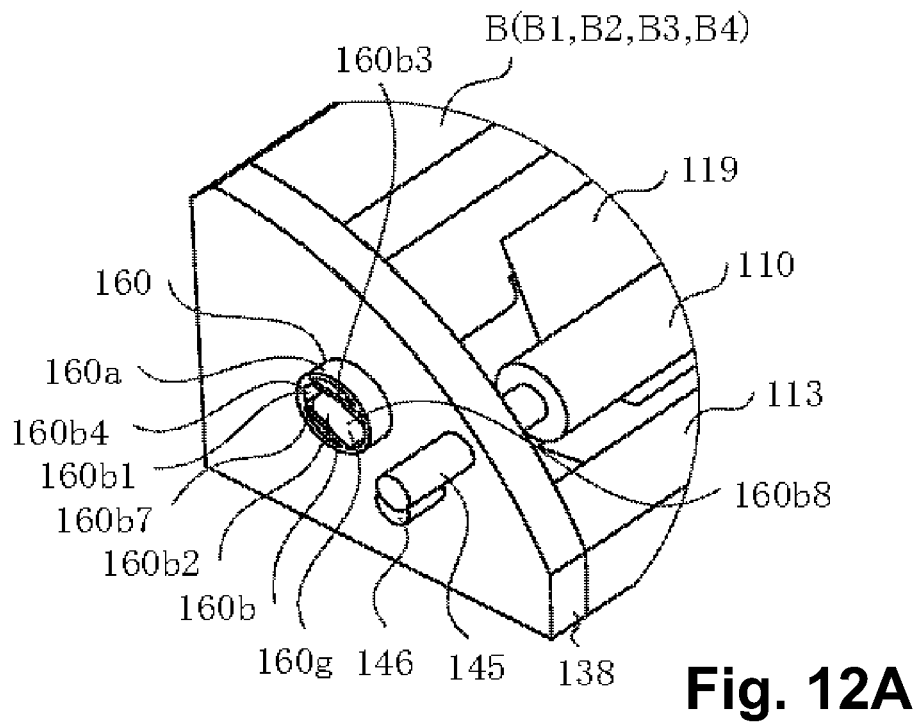
FIGS. 12A, 12B, 12C and 12D are perspective views of a regulating portion according to an embodiment of the present invention.
Figure 12B:
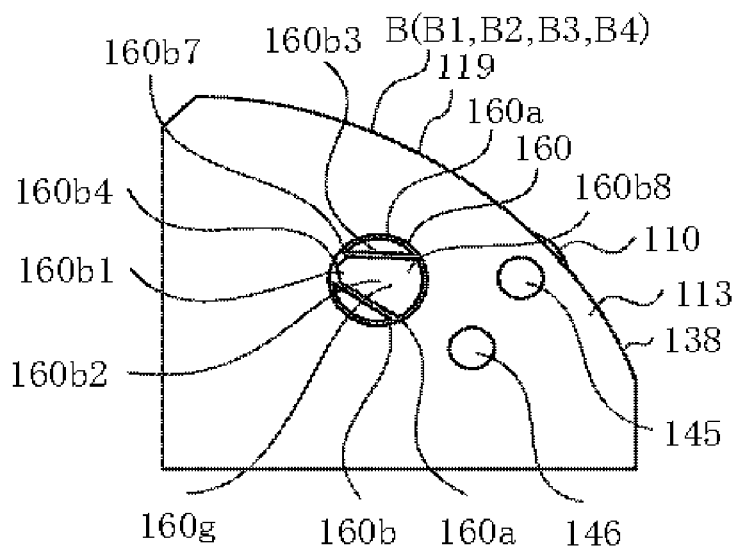
Figure 12C:
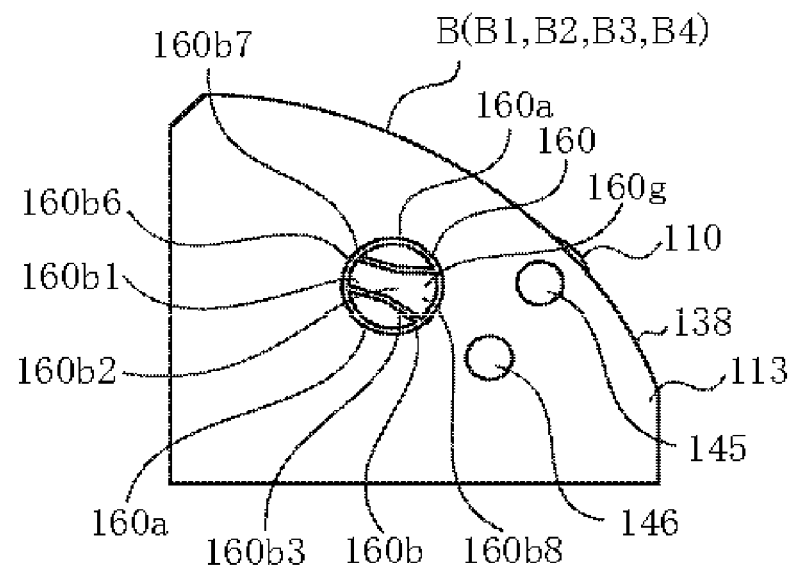
Figure 12D:
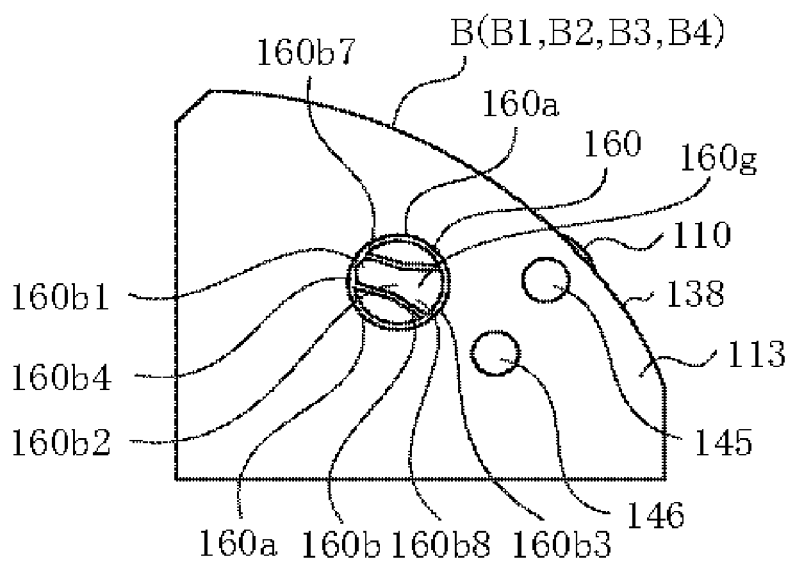
Figure 13A:
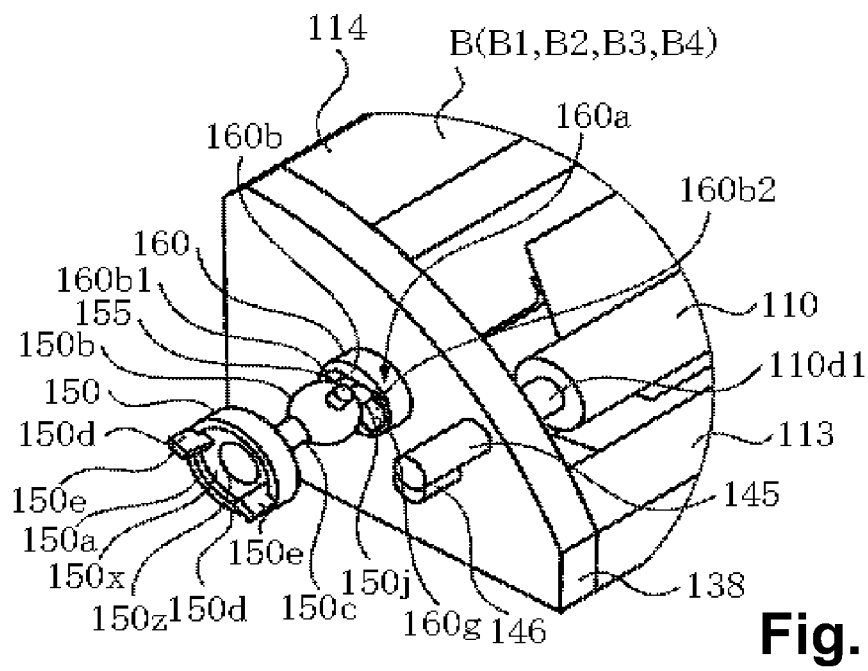
FIGS. 13A, 13B, 13C, 13D, 13E, 13F and 13G are perspective views illustrating a positional relation between the coupling, and the regulating portion according to an embodiment of the present invention.
Figure 13B:
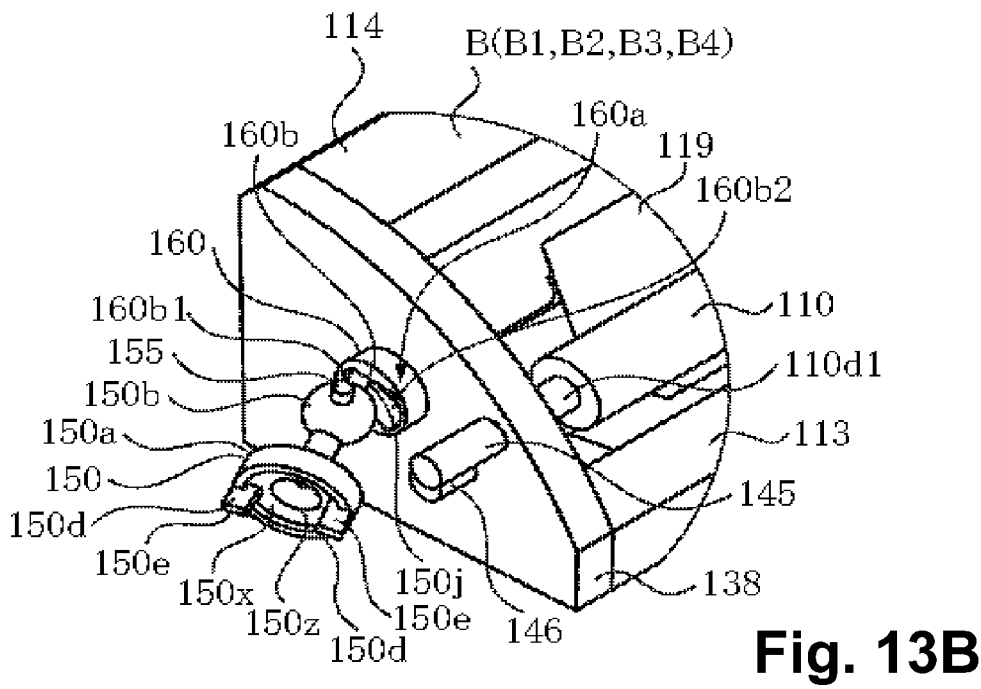
Figure 13C:
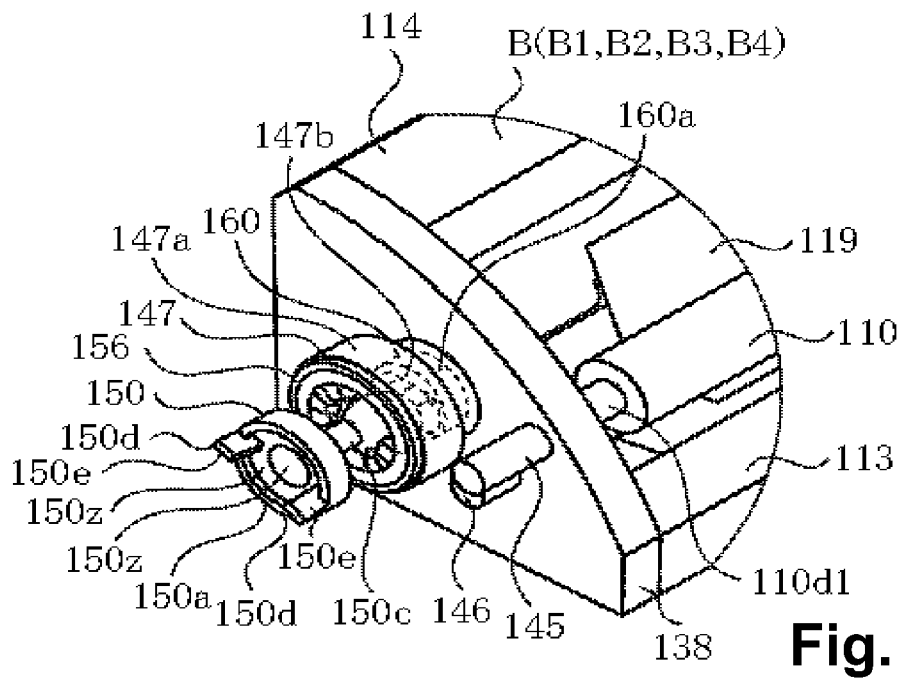
Figure 13D:
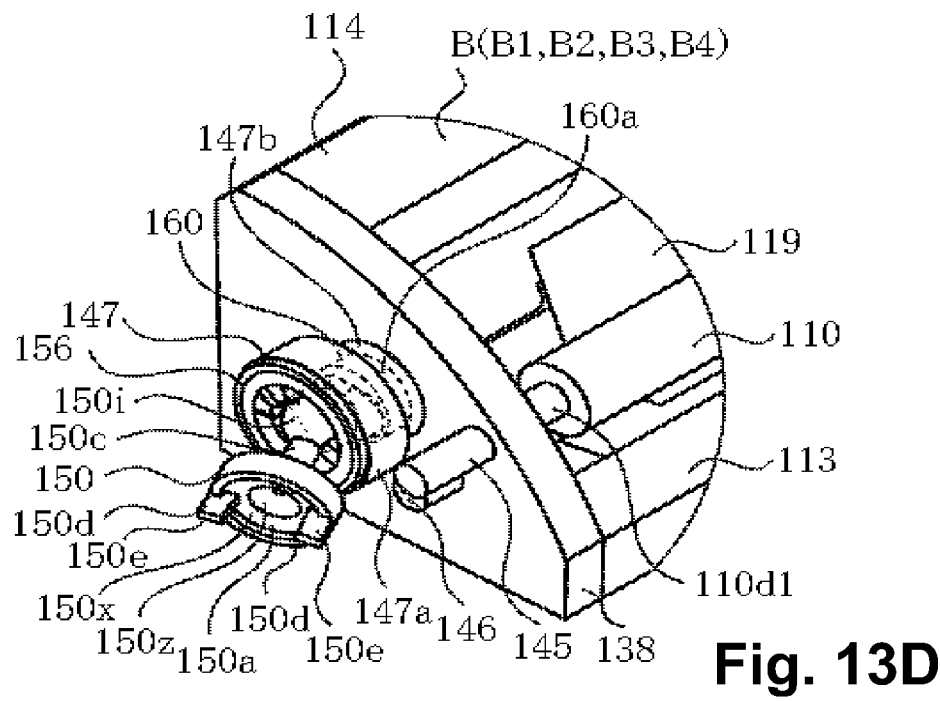
Figure 13E:
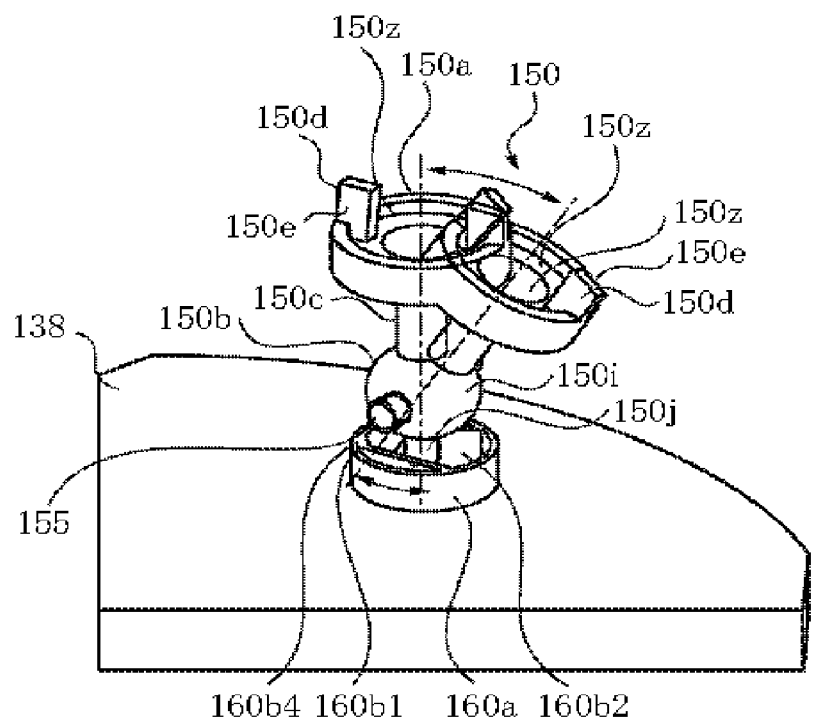
Figure 13F:
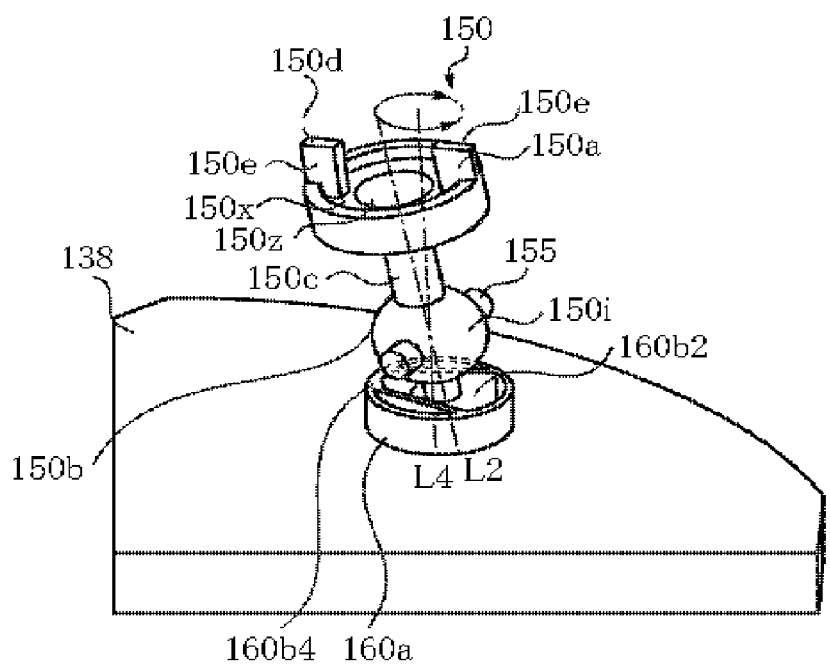
Figure 13G:
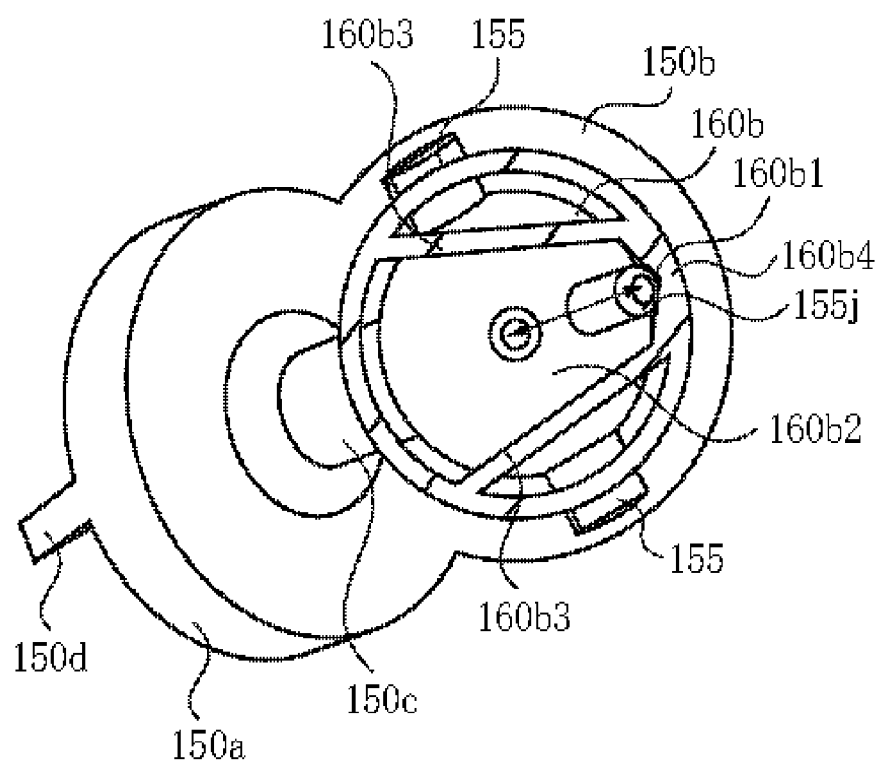

FIG. 12A is a perspective view of the regulating portion 160, as seen from the outside with respect to the longitudinal direction of the developing roller 110. FIG. 12B is a side view of the regulating portion 160, as seen from the outside. FIGS. 12C and 12D illustrates another embodiment of a configuration of the regulating portion 160. FIG. 13A is a perspective view illustrating the positional relation between the coupling 150, and the regulation member 160 in the state that the coupling 150 is in the rotational force transmitting angular position (as will be described hereinafter). FIG. 13B is a perspective view illustrating the positional relation between the coupling 150, and the regulating portion 160 in the state that the coupling 150 is in the pre-engagement angular position (as will be described hereinafter). In addition, FIGS. 13C and 13D illustrate the states of the gear 147, and the retaining member 156 in the state of FIG. 13A, and FIG. 13B. FIG. 13E is a perspective view illustrating the state that the portion-to-be-regulated-of-the-coupling 150j is positioned in a positioning portion (regulating portion) 160b1. FIG. 13F is a perspective view illustrating the state that the regulating portion 150j is positioned in the permitting portion 160b2. FIG. 13G is a perspective view of the coupling 150 engaged with the regulation member 160, as seen from the bottom. In FIG. 13G, the bottom of the regulation member 160 is not illustrated. Actually, the regulation member 160 is provided with the bottom, and therefore, the regulating portion 150j is not visible.

The regulation member 160 is provided with the circular bearing portion 160a and the regulating portion accommodating portion 160b. The regulation member 160 is provided with a groove 160g. An accommodating portion 160b is a groove. The bearing portion 160a surrounds the groove 160g. The accommodating portion 160b includes a positioning portion 160b1 and permitting portion 160b2. The regulation member 160 is integral with the bearing 138 described above. Therefore, the regulation member 160 is provided on an outside surface of the bearing 138.

The bearing portion 160a supports inner surface 147i (FIG. 8B) of the gear 147 rotatably. The inner surface 147i engages with an outer surface of the bearing portion 160a. By this, the gear 147 is mounted rotatably to the bearing portion 160a. The regulating portion 150j is accommodated in the accommodating portion 160b. In this state, the coupling 150 freely is movable within the range that the regulating portion 150j does not interfere with the wall 160b3 of an accommodating portion. The portion-to-be-regulated 150j has the cylindrical shape. The portion-to-be-regulated 150j projects away from the intermediate portion 150c co-axially with the axis L2 from the driving portion 150b. The portion-to-be-regulated 150j projects from the end of the coupling 150. More specifically, the portion-to-be-regulated 150j is co-axial with the retaining portion (spherical portion) 150i, and projects away from the intermediate portion 150c from the retaining portion 150i. With such a structure, the coupling mounting structure is compact. Before engaging with the drive shaft 180, the coupling 150 takes the pre-engagement angular position by elastic material (urging member) or the like as will be described hereinafter. At this time, the portion-to-be-regulated 150j contacts to the positioning portion (regulating portion) 160b1. More particularly, the inclining direction of the coupling 150 is regulated by abutting a part for a circular column portion of the portion-to-be-regulated (projection) 150j to a wall 160b4 of the V-shaped groove portion as the positioning portion 160b1. The portion-to-be-regulated (projection) 150j of the coupling 150 projects at a trailing end at the opposite side from the end which is provided with the rotational force reception surface (rotational force receiving portion) 150e. The portion-to-be-regulated 150j is regulated in the inclining direction by abutting to a narrow portion 160b7 of the V-shaped groove portion 160b4 as the positioning portion 160b1. The coupling 150 is regulated in the inclination angle by the abutment to the positioning portion 160b1 of the free end of the regulating portion 150j. Therefore, the coupling 150 is positioned at an optimal pre-engagement angular position for the engagement with the drive shaft 180. In this manner, the regulating portion 150j is regulated in the inclining direction by the positioning portion 160b1. By this, the coupling 150 is positioned to the pre-engagement angular position (in FIG. 13E, the inclinded coupling 150 is positioned at the pre-engagement angular position). This position will be described hereinafter. The positioning portion 160b1 functions as the positioning portion only in the case where the coupling 150 is in the pre-engagement angular position.

In the case where the coupling 150 is in the position other than the pre-engagement angular position, it is freely movable within the range in which the regulating portion 150j does not interfere with the wall 160b3 of the permitting portion 160b2. When in the case where the coupling 150 is in a position between the pre-engagement angular position, and the rotational force transmitting angular position, the rotational force transmitting angular position, a position between the rotational force transmitting angular position, and the disengaging angular position, or the disengaging angular position, in the range that the regulating portion 150j does not interfere with the wall 1603 of the permitting portion 160b2, it is freely movable. In other words, in the case where the portion-to-be-regulated 150j does not contact to the positioning portion (regulating portion) 160b1, the coupling 150 is revolvable (in FIG. 13F, and FIG. 13E, perpendicular coupling 150). By doing so, by, in the state that the coupling 150 is in engagement with the drive shaft 180, when it moves from the pre-engagement angular position to the rotational force transmitting angular position, or when it moves from a rotational force transmission position to the disengaging angular position, the coupling 150 can be moved with the drive shaft 180. Therefore, a stress imparted to the coupling 150 can be suppressed in the case where the rotary member C as will be described hereinafter moves radially, more particularly, in the case where the coupling 150 moves in the radial direction of the rotary member C. Therefore, the coupling 150 can be smoothly engaged with the drive shaft 180, and can be smoothly disengaged from the drive shaft 180. The permitting portion 160b2 is constituted by a wide portion 160b8.

In the case where the coupling 150 moves from the position other than the pre-engagement angular position to the pre-engagement angular position by the urging member, the portion-to-be-regulated 150j is guided by the wall 160b3 of the permitting portion 160b2, and is guided to the positioning portion 160b1. The coupling 150 inclines to the pre-engagement angular position.

As has been described hereinbefore, the regulation member 160 has the positioning portion (regulating portion) 160b1 for regulating the coupling 150 at the pre-engagement angular position before engaging with the drive shaft 180, and the permitting portion 160b2 for permitting the substantial revolution of the coupling 150 member.

As for the configuration of the portion-to-be-regulated accommodating portion 160b, the configuration as shown in FIG. 12C and FIG. 12D can be used, if the positioning portion 162a and the permitting portion 162b satisfy the functions described above. In the embodiment shown in 12C, the configuration of the positioning portion (regulating portion) 160b1 is an arc shape 160b6, and the configuration of the permitting portion 160b2 is a curved surface. In the embodiment shown in FIG. 12D, the configuration of the permitting portion 160b2 is curved.

As has been described hereinbefore, the regulation member 160 is provided with the groove 160g. The groove 160g includes a narrow portion 160b7 as the positioning portion 160b1 as the regulating portion, and a wide portion 160b8 as the permitting portion 160b2. The trailing end of the coupling 150 includes the portion-to-be-regulated 150j (projection) which is projected. In the state that the portion-to-be-regulated 150j is positioned in the narrow portion 160b7, the inclining direction of the coupling 150 is restricted to the pre-engagement angular position, and in the state that the portion-to-be-regulated 150j is positioned in the wide portion 160b8, the inclination of the coupling 150 to the rotational force transmitting angular position from the pre-engagement angular position is permitted. The portion-to-be-regulated 150j is regulated by contacting to the wall 160b4 of the narrow portion 160b7. In the case where the portion-to-be-regulated 150j is positioned in the permitting portion 160b2, the coupling 150 is revolvable. In other words the coupling 150 can be revolved relative to the axis L4. In the state that the coupling 150 is revolvable, the portion-to-be-regulated 150j is in the wide portion 160b8, and does not contact to the wall 160b3.

The peripheral surface of the groove 160g is surrounded by the circular bearing portion (circular portion) 160a. The bearing portion 160a engages rotatably with the gear 147 (rotatable member) which has the development gear portion (first gear portion) 147a, and the supplying roller gear portion (second gear portion) 147b. The coupling 150 is mounted to the inside of the gear 147, and in the case where the coupling 150 (portion-to-be-regulated 150j) is positioned in the permitting portion 160b2, the coupling 150 is revolvable substantially.

As has been described hereinbefore, in the regulation member 160 of the present embodiment, even if it is before the cartridge B is mounted to the rotary member C, the coupling 150 can be maintained in the pre-engagement angular position (second angular position). In other words even in the case where the cartridge B is in the free state, the coupling 150 can be maintained in the pre-engagement angular position (second angular position). Therefore, in transporting the cartridge B, for example, the inadvertent movement of the coupling 150 can be prevented.

Figure 14:
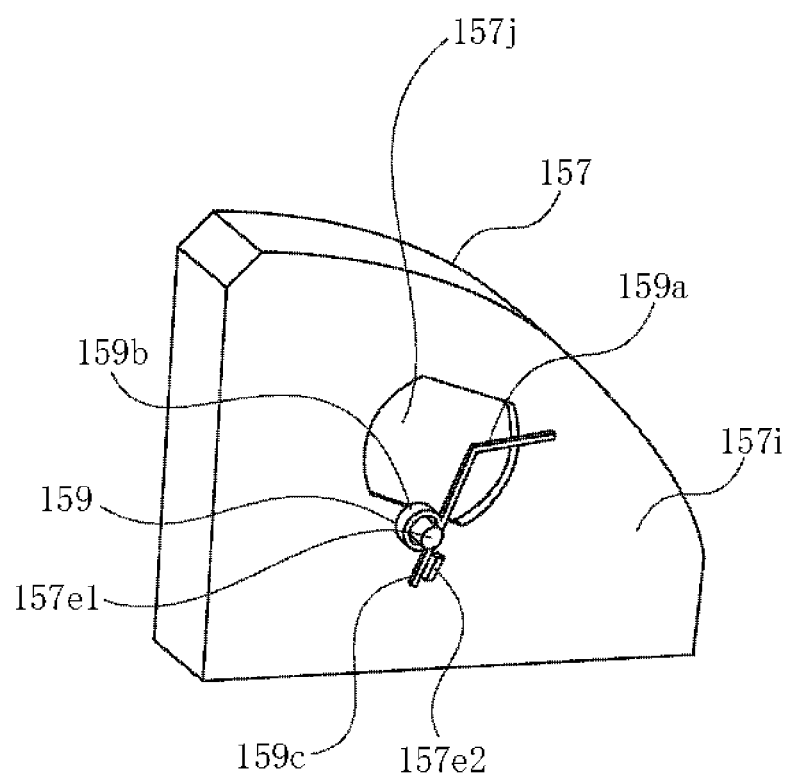
FIG. 14 is a perspective view of an elastic material (urging member), and a supporting member according to an embodiment of the present invention.
Figure 15:
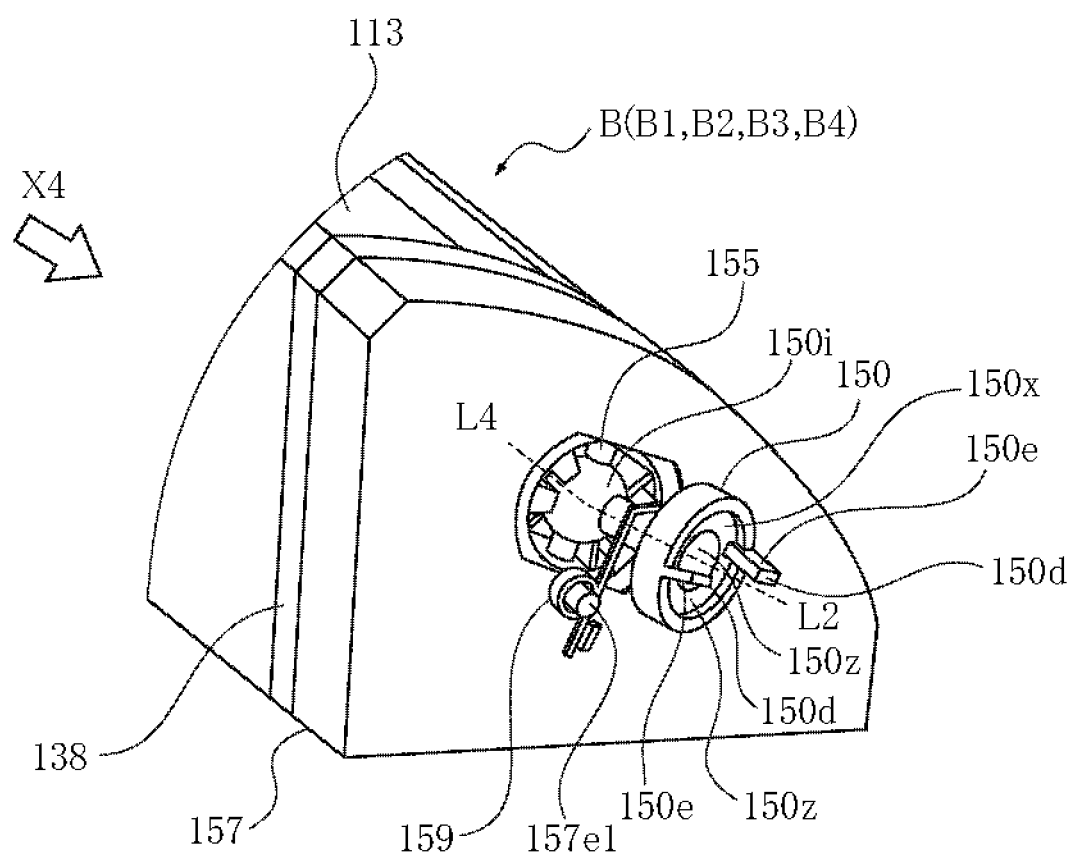
FIG. 15 is a perspective view of a cartridge drive portion according to an embodiment of the present invention.

Referring to FIGS. 14 and 15, the description will be made as to a coupling elastic material (urging member) for moving the coupling to the pre-engagement angular position. FIG. 14 is a perspective view illustrating the state that the elastic material 159 is mounted to the supporting member 157. FIG. 15 is a perspective view of the cartridge B in the state that the urging member 159 is mounted to the supporting member 157.

As shown in FIG. 14, a lateral surface 157*i* of the supporting member (mounting member) 157 is provided with a spring mounting portion 157*e*1 and a spring rotation-stopper 157*e*2. A coil part (end) 159*b* of a torsion coil spring (urging member and elastic material) 159 is fixed to the mounting portion 157*e*1. A rotation-stopper arm 159*c* for a spring 159 contacts to the spring rotation-stopper e2. As shown in FIG. 15, a contact portion 159*a* of the spring 159 contacts to the intermediate portion 150*c* of the coupling 150. In this state, the spring 159 is twisted to produce the elastic force. By this, the axis L2 of the coupling 150 inclines relative to the axis L4 (FIG. 15). In other words the coupling 150 inclines to the pre-engagement angular position. The a contact position of the spring 159 relative to the intermediate portion 150*c* is in the upstream side from the center of the driving portion 150*b* of the coupling 150 in the rotational direction X4. For this reason, the axis, l2 inclines relative to the axis L4, so that the driven portion (150*a*) side moves toward the downstream side with respect to the rotational direction X4. The rotational direction X4 shows the rotational direction of the rotary member C.

In this embodiment, although the torsion coil spring is used as the spring 159, this is not restrictive in the present invention. For example, it may be another elastic material (urging member), for example, leaf spring, rubber, sponge. However, a certain amount of stroke is required in order to incline the axis L2. For this reason, it preferably has a certain stroke. In order to make the coupling 150 be positioned in the pre-engagement angular position (first angular position), the spring (urging member and elastic material) 159 urges the coupling 150 by the elastic force thereof so that the coupling 150 is positioned in the regulating portion 160*b*1. By urging the coupling by the elastic force of the spring (urging member, and elastic material), the coupling 150 can be maintained in the pre-engagement angular position (first angular position) more assuredly. In other words by the spring (urging member, and elastic material) 159, the coupling 150 elastically urges to the positioning portion (regulating portion) 160*b*1.

When the rotary member C rotates, the coupling 150 contacts to the drive shaft 180 by the movement of the cartridge B. By this, the coupling 150 moves to the permitting portion 160*b*2 from the regulating portion 160*b*1 against the elastic force of the spring (elastic material) 159. With this movement, the coupling 150 moves from the pre-engagement angular position to the rotational force transmitting angular position. By this, the coupling 150 opposes to the drive shaft 180 to receive the rotational force from the drive shaft 180. When the rotary member C further rotates from the position in which the coupling 150 opposes to the drive shaft 180, the coupling 150 moves from the rotational force transmitting angular position to the disengaging angular position against the elastic force of the spring 159, in accordance with the movement of the cartridge B. By this, the coupling 150 disengages from the drive shaft 180.

(7) Assembly of Coupling to Cartridge Frame

Referring to FIGS. 16A-16E, the method of assembling the coupling 150 to the developing device frame (cartridge frame) will be described. FIG. 16A is a perspective view of the cartridge B before the gear 147 including the coupling 150 and the retaining member 156, the supporting member (rotatable member) 147, and the spring 159 are mounted. FIG. 16B is a perspective view of the cartridge B before mounting a mounting member 157, and spring 159. FIG. 16C is a perspective view of the cartridge B before mounting the spring 159. FIG. 16D is a perspective view of the cartridge B after the completion of the mounting. FIG. 16E is an exploded perspective view of the cartridge B in the longitudinal direction after the completion of the mounting with the positional relation in the direction perpendicular to the longitudinal direction unchanged.

The bearing 138 provided with the regulation member 160, the developing roller 110 and the developer supply roller 115 are mounted to the developing device frame 113 (cartridge frame). A developing roller gear 145 for transmitting the rotational force from the gear 147 to the developing roller 110 is mounted to the developing roller 110. A developer supply roller gear 146 for transmitting the rotational force from the gear 147 to the developer supply roller 115 is mounted to the developer supply roller 115.

The bearing 138 is mounted by a screw 138*a* to the one longitudinal end portion of the developing device frame 113 (FIGS. 16A and B).

First, drive unit U (the gear 147 which is provided with the coupling 150 and the retaining member 156) is mounted to the regulation member 160 (FIGS. 16A and 16B). At this time, the circular column portion as the portion-to-be-regulated (projection) 150*j* is accommodated by the groove as the accommodating portion 160*b* (FIG. 13B). The inner surface 147*i* engages with a circular outer surface of the bearing portion (circular portion) 160*a*. By this, the gear 147 is mounted rotatably to the bearing portion 160*a* (FIGS. 16A and 16B). In this state, the gear portion 147*a* of the gear 147 is engaged with the developing roller gear 145 to transmit the rotational force to the developing roller 110. A supplying roller gear portion 147*b* of the gear 147 engages with the developer supply roller gear 146, to transmit the rotational force to the roller 115. The coupling 150 is freely movable in the range in which the portion-to-be-regulated 150*j* does not interfere with the wall of the accommodating portion 160*b* in the regulation member 160. The bearing portion 160*a* as the circular portion surrounds the groove 160*g* (FIGS. 12A-12C).

Then, the supporting member 157 is mounted to the developing device frame 113 (FIG. 16D). In the case of the mounting, the coupling 150 passes through an opening 157*j* of the supporting member 157, and the bearing 138, and the supporting member 157 contact to each other. The supporting member 157 has a positioning portion (unshown) at a position, and a rotation stopper (unshown) at a position relative to the developing device frame 113. The supporting member 157 is positioned with respect to the widthwise direction of the developing device frame 113. The gear 147 is supported rotatably by the bearing portion 160*a* as a gear supporting portion. The disengagement of the retaining member (retention ring) 156 from the gear 147 is prevented by the retaining portion 157*k* 157*l*. The supporting member 157 is mounted to the developing device frame 113 by screws 157*a*, 157*b*. The method for the mounting of the bearing 138, and the supporting member 157 to the developing device frame 113 is properly selected by the person skilled in the art. Finally, the spring 159 is mounted to a spring supporting portion 157*e*1 of the supporting member 157 (FIG. 16D). At this time, the intermediate portion 150*c* of the coupling 150 is contacted to the urging direction downstream of the contact portion 159*a* of the spring 159. In this state, the coupling 150 inclines toward the downstream with respect to the rotational direction X4 of the rotary member C by the spring 159. In this state, the portion-to-be-regulated 150*j* contacts to the positioning portion 160*b*1. The positioning portion 160*b*1 has the shape of V, and the portion-to-be-regulated 150*j* is contacted to the V-shaped groove portion 160*b*4. In other words the coupling 150 is positioned at the pre-engagement angular position.

As for the mounting method described above, the order of the steps may be changed, for example, after mounting the gear 147 to the supporting member (rotatable member) 157, these are mounted to the developing device frame 113.

As has been described hereinbefore, the peripheral surface of the groove 160g is surrounded by the circular bearing portion (circular portion) 160a. The bearing portion 160a as the circular portion engages rotatably with the gear (rotatable member) 147 which is provided with the first gear portion 147a, and the second gear portion 147b. In the case that the coupling 150 is mounted to the inside of the gear 147, and the portion-to-be-regulated 150j is positioned in the permitting portion 160b2 the coupling 150 is revolvable substantially.

While the portion-to-be-regulated 150j is positioned in the permitting portion 160b2, in the coupling 150, a gap is provided between the pin (rotational force transmitting part) 155, and the rotational force reception surface (rotational force transmitted portion) 147h for receiving the rotational force from the pin 155 so that it is revolvable substantially. The pin 155 is movable relative to the receiving surface 147h. In the rotational direction of the coupling 150, the pin 155, and the receiving surface 147h contact with each other. The coupling 150 is provided at the end of the cartridge B.

More particularly, mp in the coupling 150, a gap is provided between the pin (rotational force transmitting part) 155, and the rotational force reception surface (rotational force transmitted portion) 147h so that it is revolvable substantially in the state that the portion-to-be-regulated 150j is positioned in the permitting portion 160b2. The pin (rotational force transmitting part) 155 is movable relative to the rotational force reception surface (rotational force transmitted portion) 147h. In the rotational direction in which the coupling 150 rotates, the pin 155, and a rotational force reception surface 147h contact to each other. The pin 155 transmits the rotational force received from the drive shaft 180 to the developing roller 110 through the rotational force reception surface (rotational force receiving portion) 150e. The pin 155 is provided on the coupling 150. The rotational force reception surface 147h is provided inside of the gear 147 as the rotatable member.

(8) Mounting and Demounting Method of Developing Cartridge Relative to Color Electrophotographic Image Forming Apparatus Main Assembly Referring to FIGS. 17-19, the mounting and dismounting operation of the cartridge B relative to the main assembly A will be described.

Figure 17:
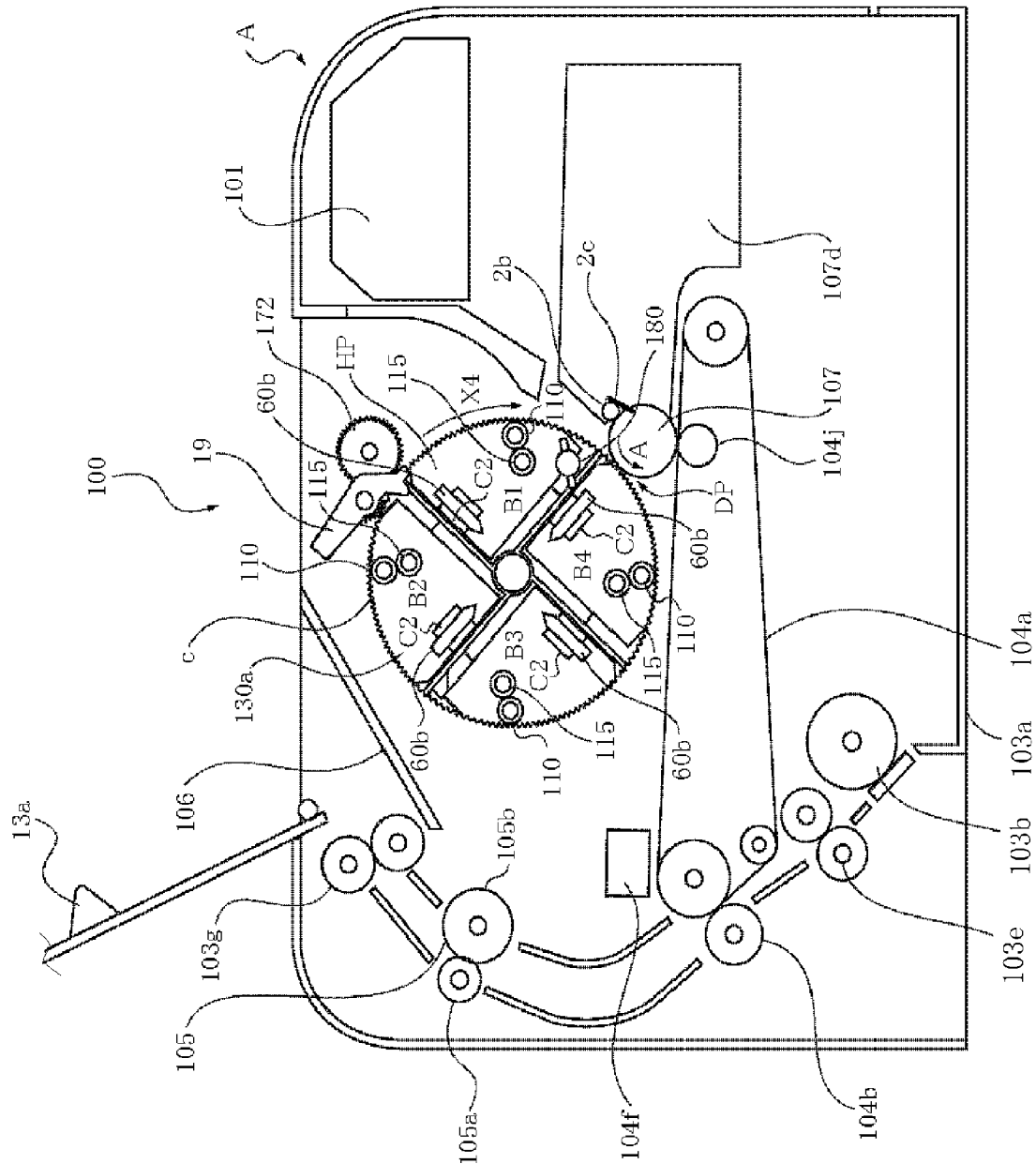
FIG. 17 is a longitudinal sectional view illustrating a main assembly of the electrophotographic image forming apparatus in a development stand-by position according to an embodiment of the present invention.

FIG. 17 is a sectional view illustrating a developing cartridge mounting and demounting waiting position (waiting position) HP that the rotary member C is shifted by a predetermined angle phase from a developing position DP. The rotary member C takes the waiting position HP (home position) except during the developing operation, and the mounting and dismounting operation of cartridge B (B1-B4) is also carried out in the position. In this embodiment, only a position About 45-degrees upstream of the developing position DP is the waiting position H.

The mounting and demounting operation of the cartridge B relative to the rotary member C is carried out by the user in the state that the rotary member C is rest at the waiting position H.

In the mounting and demounting of cartridge B (B1-B4) relative to the rotary member C, a cover 13 is first opened. By this, the user can mount and demount cartridge B (B1-B4) relative to the rotary member C. FIG. 17 is a sectional view illustrating the state that a yellow cartridge B1 among the four cartridge s B is positioned in the waiting position H. The cover 13 is opened. The cover 13 is operated interrelatedly with an interlocking SW (unshown). More particularly by releasing the cover 13, the interlocking SW is rendered into OFF state to stop the drive in the main assembly A. Designated by 19 is a cartridge releasing members (FIG. 4, FIG. 17). The releasing member 19 operates a locking member (unshown) for locking the cartridge B in the rotary member C. More particularly the locking member (unshown) engages by the releasing member 19 with a guide portion (portion-to-be-locked) 60b (FIG. 19), by which, the cartridge B is locked by the rotary member C. A guide portion 60b is provided in the cartridge B. By releasing the cover 13, the releasing member 19 moves the locking member (unshown) to the position which is not engaged with the guide portion 60b. By this, only in the cartridge B1 which is positioned in the waiting position HP, the engagement with the rotary member C is released. Therefore, the user can dismount the cartridge B1 from the rotary member C (FIG. 17, FIG. 18). As has been described hereinbefore, the cartridge B has the guide portion 60b for being guided in the direction perpendicular to the direction of the axis L1 of the developing roller 110 (longitudinal direction of developing roller 110).

As shown in FIG. 4, when the user shuts the cover 13, the projection 13a provided on the cover 13 rotates the releasing member 19 counterclockwise. By this, the releasing member 19 engages the locking member (unshown) with the guide portion 60b. Accordingly, when the cover 13 is shut, the cartridge B is locked to the rotary member C. When interlocking SW is in the ON state, all of the cartridges B (B1-B4) mounted to the rotary member C are locked. For this reason, the trouble that the driving mechanism of the main assembly A unintentionally starts can be avoided assuredly with cartridge B (B1-B4) unlocked.

The mounting of the cartridge B to the main assembly A will be described.

Figure 18:
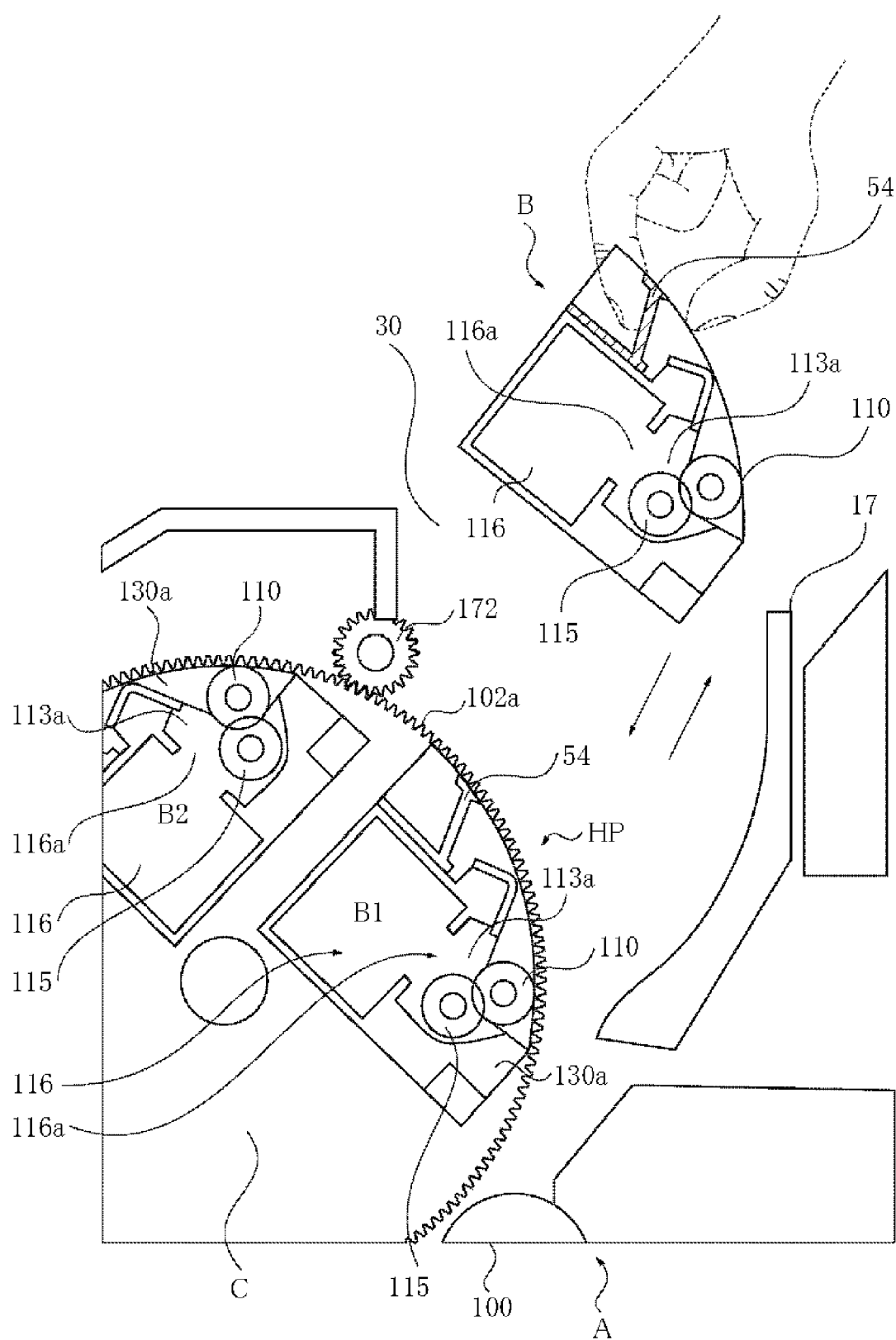
FIG. 18 is a longitudinal sectional view illustrating the developing cartridge mounted state of the electrophotographic image forming apparatus main assembly according to an embodiment of the present invention.

As shown in FIG. 18, when the user grips the handle 54, an orientation of the cartridge B is determined in general by a gravity center of the cartridge. This orientation is near to the orientation required when the cartridge B passes through the opening 30 provided in an upper portion of the main assembly A.

The cartridge, b is provided with an elongated cartridge side guide 60b, and a shaft portion 60a at the end with respect to the longitudinal direction of cartridge B (developing roller 110,) (FIG. 2). The cartridge B is provided with an elongated cartridge side guide 61b, and a shaft portion 61a at the other longitudinal end (FIG. 3). The shaft portions 60a, 61a are co-axial with the axis L1 of the developing roller 110. The shaft portions 60a and the guide 60b are provided on the outside surface of the supporting member 157. The shaft portion 61a and the guide 61b are provided on the outside surface of a side member 139.

The rotary member C is provided with a rotary member side guide C2 at the one longitudinal end portion, and the other end where the cartridge B is mounted.

The main assembly A is provided with the main assembly guide 17 (FIGS. 19, (a) and (b)). The main assembly guide 17 is omitted for the sake of simplicity in FIG. 4, and FIG. 17.

In mounting the cartridge B to the rotary member C, the shaft portion 60a fixed to the opposite ends of the cartridge B is guided on the regulation rib 17a of the main assembly guide 17, and the shaft portion 61a is guided on the regulation rib 17b of the main assembly guide 17 (FIG. 19(a)). As shown in FIG. 19(a), and, when the cartridge B moves into the rotary member C from a guide 17, the free ends of the guide 60b, 61b bring into engagement with the guide grooves C2 (FIG. 19(b)) of the rotary member C. In this state, when the user imparts the force in a mounting direction, the cartridge B is moved into the rotary member C. In this manner, the cartridge B is mounted to a mount position. In this case, the shaft portion 60a and the shaft portion 61a are positioned to the positioning portion (unshown) of the rotary member C. In other words the cartridge B is positioned to the main assembly A on the basis of the developing roller 110.

In the case where the cartridge B is dismounted from the main assembly A, the reverse operation is carried out.

By the structure described above, the cartridge B is mounted in the direction crossing with the longitudinal direction of the cartridge B to rotary member C (accommodating portion 130a). The drive shaft 180 is disposed at the longitudinal end of the rotary member C. Therefore, the drive shaft 180 and the coupling 150 engage and disengage the cartridge B mounted to rotary member C (accommodating portion 130a) relative to each other, and by moving in the direction substantially perpendicular to the direction of the axis L3 of the drive shaft 180 in response to the rotation of the rotary member C.

In addition, the rotation axis of the rotary member C of the present embodiment is swingable.

(9) Switching Structure of Developing Cartridge (Developing Device)

Then, referring to FIG. 20-FIG. 23, the structure of the rotary member C will be described.

Figure 21:
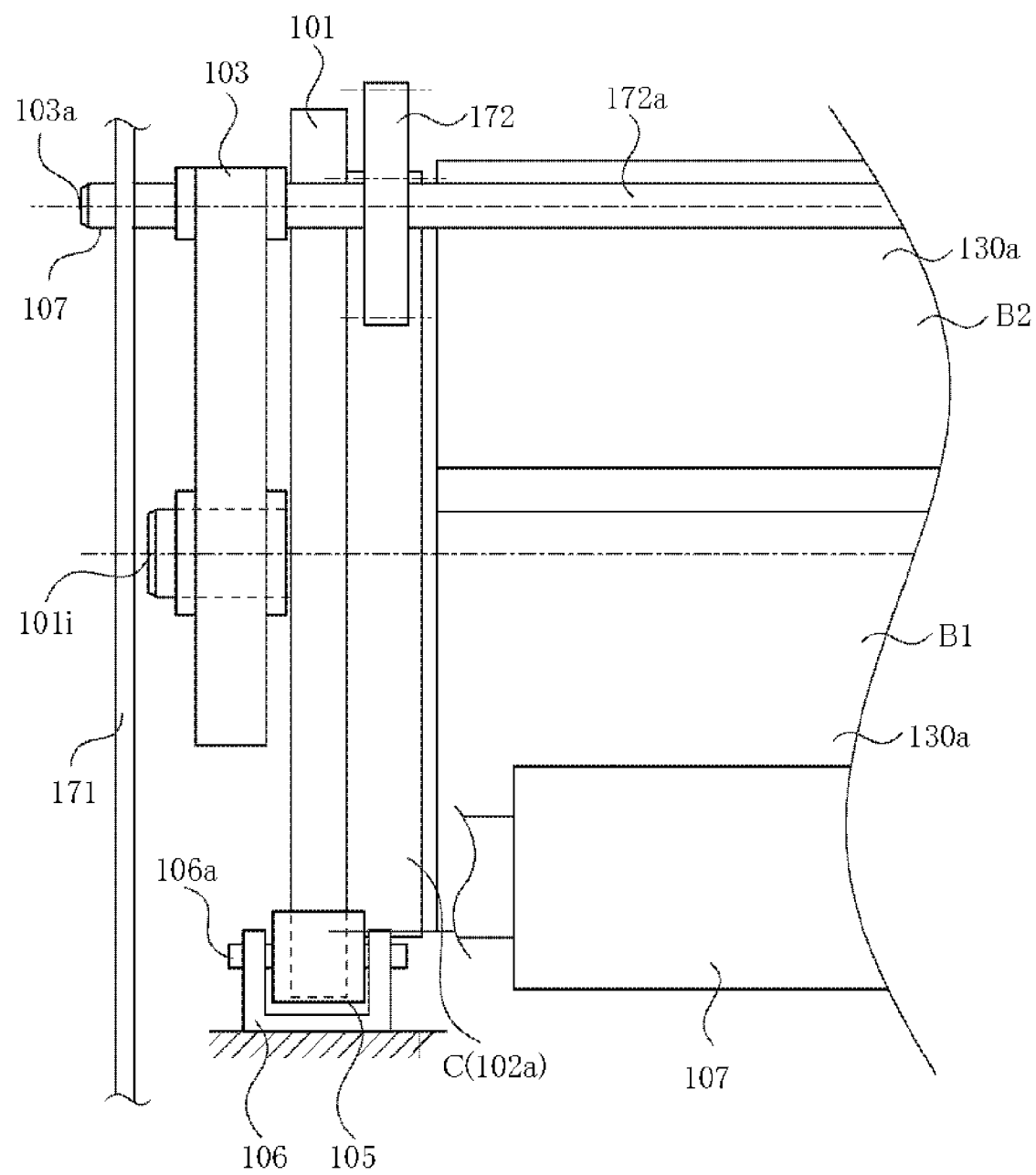
FIG. 21 is a longitudinal sectional view of the rotary member according to an embodiment of the present invention.
Figure 22:
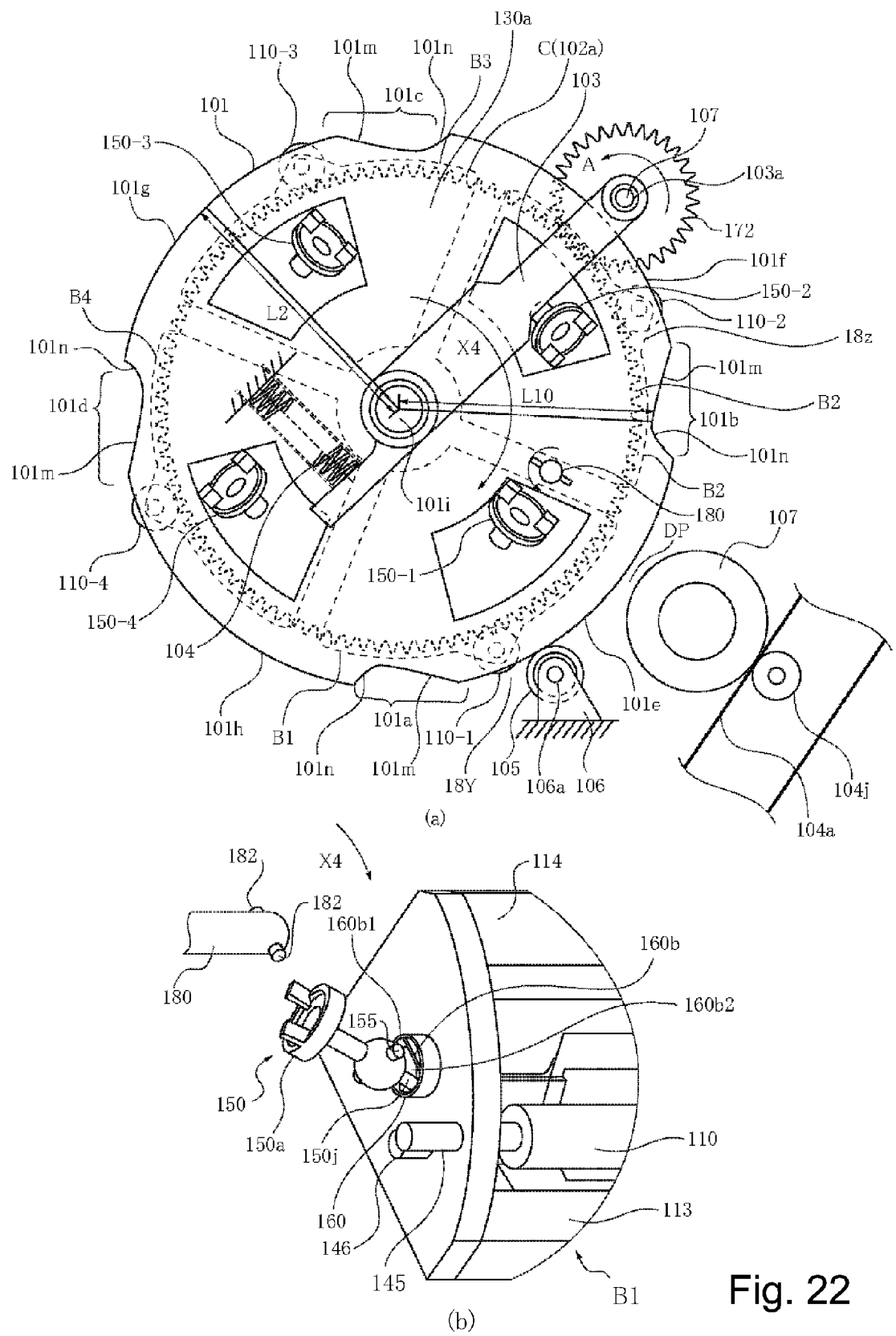
FIG. 22 is a longitudinal sectional view of the rotary member according to an embodiment of the present invention.
Figure 23:
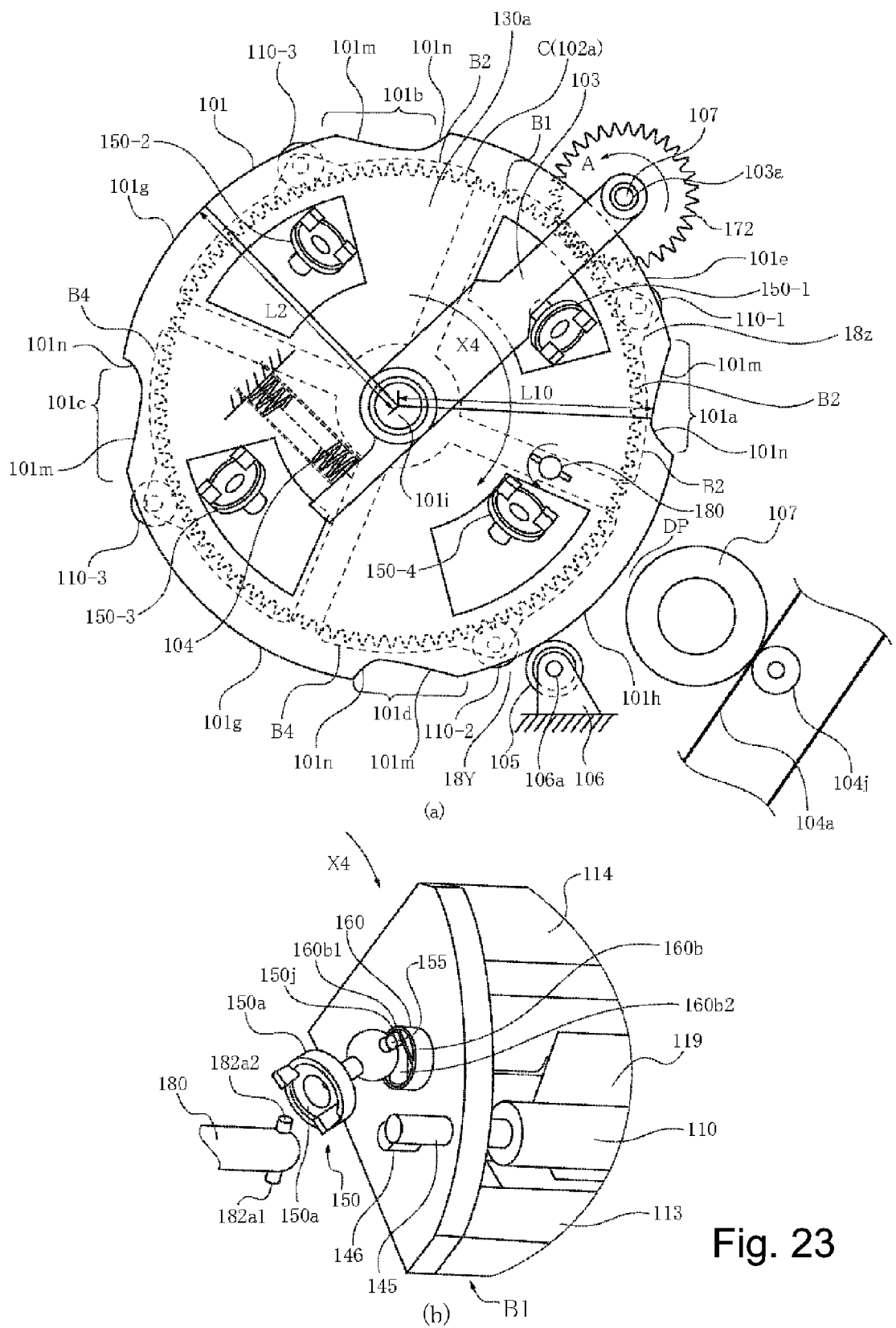
FIG. 23 is the longitudinal sectional view of the rotary member according to an embodiment of the present invention.

The FIG. 20, FIG. 22 and FIG. 23 are front views (a) of the drive transmission mechanism, as seen from the drive shaft (180) side. (a) of FIG. 20 illustrates the state that the developing roller 110-1 of the cartridge B1 is positioned in the developing position DP which opposes to the photosensitive drum 107. FIG. 21 is a right side view of the cartridge shown in (a) of FIG. 20. In (a) of FIG. 22 and (a) of FIG. 23, by the rotation of the rotary C in the direction X4 from the state shown in FIG. 20, the cartridge B1 is in a post-development retracted position 18Y, and a pre-development retracted position 18Z, respectively. The frame 171 shown in FIG. 21 is not illustrated in (a) of FIG. 20, (a) of FIG. 22, and (a) of FIG. 23. The transfer belt 104a, the transfer roller 104j, the coupling 150, and the drive shaft 180 shown in (a) of FIG. 20, (a) of FIG. 22, and (a) of FIG. 23 are not illustrated in FIG. 21.

(b) of FIG. 20, (b) of FIG. 22, and (b) of FIG. 23 are perspective views, as seen from the drive shaft (180) side in the states of (a) of FIG. 20, (a) of FIG. 22, and (a) of FIG. 23, respectively. In these views, the relation among the coupling 150, the regulating portion 160, and the drive shaft 180 is shown.

The drive transmission mechanism shown in FIG. 20-FIG. 23 sequentially moves the each of four cartridges B1-B4 supported on the rotary member C to the developing position DP which opposes to a photosensitive drum 2 by rotating the rotary member C. The structure of the drive transmission mechanism will be described.

A driving gear 172 is supported on a shaft 107 supported rotatably by the main assembly A rotatably. A gear 172 receives the rotational force from motor M (driving source) to rotate.

The a rotational-driving-force-transmitting mechanism M1 for transmitting the rotational force to the gear 172 from the motor M is a gear train, for example, a belt with the gear tooth, but any structure that can transmit the rotational force is usable.

An arm 103 is a swingable member swingably supported by the main assembly A. More particularly the one-end portion of the arm 103 is supported rotatably by the shaft 107 provided on the body frame 171. The one-end portion of an arm spring (compression spring, for example), and (elastic material) 104 is mounted to the free end of the other end portion of the arm 103 which supports the rotary member C rotatably, and the other end portion of the arm spring 104 is fixed to the main assembly A. By this, the arm 103 receives an urging force (elastic force, and rotational force) about the axis of the shaft 107 by the elastic force of an arm spring 104 in the direction (FIG. 20, FIG. 22, FIG. 23) of the arrow A.

As has been stated in the foregoing, the rotary member C supports four cartridges B (B1-B4), and is supported rotatably on the arm 103. In this manner, the cartridge B is mounted to the rotary member C. The coupling 150 (150-1-150-4) of the cartridge B (B1-B4) which the rotary member C supports projects from the rotary member C (FIG. 20, FIG. 22, FIG. 23). By this, the rotational force is transmitted from the drive shaft 180 unintegral with the rotary member C to the coupling 150 (150-1-150-4). More particularly, the transmission of the rotational force is possible from the drive shaft 180 to cartridge B (B1-B4). The cartridge B1 is provided with a coupling 150-1. The cartridge B-2 is provided with a coupling 150-2, a cartridge B3 is provided with a coupling 150-3, and a cartridge B4 is provided with a coupling 150-4. The couplings have the structures similar to the coupling 150 described above.

The rotary member C is provided with a gear portion (rotatable supporting member gear) 102a, which is extended along the circumferential direction which is the rotary member C. The gear portion 102a engages with the driving gear 172. In other words, the rotary member C is rotated in the direction of the arrow X4 by the rotation, in the direction (FIG. 20, FIG. 22, and FIG. 23) of the arrow A, of the driving gear 172. And, the rotary member C is stopped by the stoppage of the rotation of the gear 172.

A regulation roller 105 is supported rotatably by a roller holder 106 provided on the main assembly A. The regulation roller 105 is a regulation member for regulating the swinging motion of the rotary member C. The noise reduction, and the assured rotation because of a high friction coefficient can be accomplished if the surface layer of the regulation roller 105 is a rubber layer which has elasticity.

A roller 105 has an elasticity, and is supported rotatably by a shaft 106a securely fixed in the main assembly A. The shaft 106a supporting the roller 105 is extended in parallel with the rotation axis of the rotary member C. When the rotary member C rotates, the roller 105 is contacted to a contact portion 101e-101h of the cam 101 as will be described hereinafter to be rotated.

A cam (rotatable member) 101 is rotated integrally with the rotary member C (guiding member). The cam 101 includes the contact portion 101e-101h contactable to the roller 105, and the spacing portion (contact releasing portion) 101a-101d which is not contacted to the roller 105. The spacing portion 101a-101d is a recess which has the substantially same configuration as an outer configuration of the roller 105. The contact portion 101e-101h, and the spacing portion (recess) 101a-101d are alternately disposed along the outer surface of the cam 101 at the substantially regular angle intervals as seen from a rotation axis 101i of the cam 101. The cam 101 is provided at the end with respect to the longitudinal direction of the cartridge B1-B4 supported on the rotary member C, and it is integral with the rotary member C.

The spacing portion 101a-101d is provided as a recess in each of two or more positions along the rotational direction X4 (FIG. 20, FIG. 22, FIG. 23) of the cam 101. The recess is provided with an inclined surface 101m which ascends toward an upstream side from a downstream side, in the upstream side with respect to the rotational direction X4. By providing the inclined surface 101m (FIG. 20, FIG. 22, FIG. 23), when the cartridge B1-B4 separates in the direction crossing with the rotational direction in accordance with the rotation of the rotary member C, the operation is carried out smoothly. More particularly, in response to the rotation of the rotary member C, when the cartridge B1-B4 separates in the radial direction (radial direction) of the rotary member C from the developing position DP, the smooth movement is carried out.

Similarly, the recess is provided with an inclined surface 101*n* (FIG. 20, FIG. 22, FIG. 23) lowered toward the upstream side from the downstream side, in the downstream side with respect to the rotational direction X4. By providing the inclined surface 101*n*, when the cartridge B1-B4 moves in the direction crossing with the rotational direction X4 toward the developing position DP in accordance with the rotation of the rotary member C, it can be moved smoothly. In other words when the cartridge B1-B4 moves in the radial direction (radial direction) of the rotary member C toward the developing position DP in accordance with the rotation of the rotary member C, the smooth movement is carried out.

The cam 101 is rotated integrally with the rotary member C. By the contact portion 101*e* contacting to a regulation roller (regulation member) 105, the developing roller 110-1 of the cartridge B1 is spaced from the photosensitive drum 107. When another contact portion 101*f*-101*h* contacts to the regulation roller 105, it separates from the developing roller (110-1-110-4) of the cartridge (B1-B4) photosensitive drum 107 (FIG. 22, FIG. 23).

As shown in FIG. 21, the cam (rotatable member) 101 rotary member (rotatable supporting member) C, the arm (swingable member) 103, and the regulation roller (regulation member) 105 are disposed at each of the one longitudinal end portion, and the other longitudinal end portion of the cartridge B1.

The states shown in FIGS. 22 and 23 are the states in which the rotary member C rotates as will be described hereinafter. However, in addition, the states shown in FIGS. 22 and 23 are the state that the rotation of the rotary member C is at rest is in † retracted position. Here, the retracted position is the position in which none of the cartridges B1-B4 carries out the developing operation. As shown in FIGS. 22 and 23, in this state, any of developing rollers 110-1-110-4 do not contact to the photosensitive drum 107. For example, in FIG. 22, the developing roller 110-1 is in the retracted position 18Y at the downstream side of the roller 105. Similarly, in FIG. 23, the developing roller 110-1 is in the retracted position 18Z at the upstream side of the roller 105. In the retracted position, the roller 105 supports the lower portion of the rotary member C in the one-end portion. In addition, the roller 105 supports the lower portion of the rotary member C in the other end portion. By this, the rotary member C which supports the cartridges B1-B4 is restricted in the swinging motion by the roller 105. The retracted position 18Z is the position which is the same as the waiting position HP described above.

As shown in FIG. 20, on the other hand, and the roller 105 opposes in the state that it separates from the bottom surface of the recess (spacing portion) 101*a* in the state that the developing roller 110-1 contacts to the photosensitive drum 107. This state is the state that the cartridge B1 is positioned in the developing position DP. In this state, a developing roller 110-2 contacts to the photosensitive drum 107, and the roller 105 separates from the bottom surface of a recess 101*b*. Similarly, the roller 105 separates from the bottom surface of a recess 101*c* in this state. In addition, the roller 105 separates from the bottom surface of a recess 101*d* in this state. In other words the cam 101 spaces from the regulation roller 105.

FIGS. 20 and 21 illustrate the state during development, wherein the roller 105 is positioned adjacent to a recess 101*a* (-101*d*). And, the recess 101*a* (-101*d*) is positioned so that the roller 105, and the cam 101 do not contact with each other. Accordingly, the arm 103 urged by the elastic force of the spring 104 urges the rotary member C. And, this urging force (elastic force) provides a contact pressure between each of the developing rollers (110-1-110-4) and the photosensitive drum 107.

The driving gear 172 receives the rotational force from the motor M to rotate in the direction of the arrow A. Then, as has been described hereinbefore, the rotary member C is rotated in the direction of the arrow X4. The cam 101 provided on the rotary member C is also rotated in the direction of the arrow X4 integrally with the rotary member C. FIGS. 22 and 23 show the state in which the rotary member C rotates by receiving the rotational force of the driving gear 172. In FIG. 22, the developing operation finishes in the cartridge B1, the cartridge B1 retracts from the developing position DP to the post-development retracted position 18Y, and the cartridge B-2 moves toward the developing position DP from the pre-development retracted position 18Z. Similarly, in FIG. 23, the development finishes in the cartridge B4, the cartridge B4 retracts from the developing position DP to the post-development retracted position 18Y, and the cartridge B1 moves toward the developing position DP from the pre-development retracted position 18Z.

In addition, the rotary member C is provided with the gear portion (rotatable supporting member gear) 102*a* on the outer periphery. A driving gear (swingable member gear) 172 is provided co-axially with the rotation axis 103*a* of the arm 103. By this, the gear 172, and the gear portion 102*a* are engaged with each other. Therefore, even while the arm 103 swings, the gear 172, and the gear portion 102*a* are always in the engaging state with each other.

The rotation axis 103*a* is the axis of a shaft 172*a* which supports the gear 172 rotatably. The shaft 172*a* is securely fixed to the body frame 171. The end of the arm 103 is mounted rotatably to the shaft 172*a*.

As has been described in the foregoing with FIGS. 20, 22 and 23, the elastic force (urging force) of the spring 104 press-contacts the developing roller 110-1 to the photosensitive drum 107. By the rotary member C rotating from this state, a press-contact state between the developing roller 110-1, and the photosensitive drum 107 is released. And, when the press-contact state is released, the urging force of the spring 104 press-contacts the cam 101 to the roller 105. By this, the cam 101 can be assuredly contacted to the roller 105.

The outer surface other than the spacing portion (recess) 101*a*-101*d* 101 is the contact portion 101*e*-101*h* contacted by the roller 105 as described above. In the state that the contact portion 101*e*-101*h* contacts to the roller 105, the cartridge B1-B4 does not contact to the photosensitive drum 107. Accordingly, the cartridge B1-B4 can sequentially be moved, without the influence to the photosensitive drum 107, to the developing position. The contact portion 101*e*-101*h*, and the spacing portion 101*a*-101*d* are alternately disposed along the rotational direction of the cam 101 (rotary member C). A distance L10 between the spacing portion 101*a*-101*d*, and the rotation axis 101*i* of the cam 101 is shorter than a distance L2 between the contact portion 101*e*-101*h*, and the rotation axis 101*i* of the cam 101 (FIG. 22, FIG. 23). When the cartridge (B1-B4) is moved to the developing position DP, a controller (unshown) blocks the rotational force of the driving gear 172 so that the rotary member C stops the rotation. The cartridge B1 reaches the developing position DP. The developing roller 110-1 (-110-4), and the photosensitive drum 107 press-contact to each other in this developing position DP. As shown in FIG. 20, in this state, the roller 105 opposes in the state of being away from the spacing portion (recess) 101*b* (-101*d*) of the cam (101). In other words the spacing portion 101*b* (-101*d*), and the roller 105 are spaced. While repeating such an operation, the cartridges B1-B4 sequentially move to the developing position DP. In this embodiment, a gap G (FIG. 2) between the roller 105 and the bottom surface of the recess 101b as the spacing portion is approx. 1.5 mm.

In this manner, in this embodiment, the rotary member C is provided with the cam 101 which has the contact portion 101e-101h, and the spacing portion 101a-101d integrally, and the main assembly A is provided with the roller 105. By this, only by rotating the rotary member C, cartridge B1-B4 (developing roller 110-1-110-4) can be contacted, and spaced relative to the photosensitive drum 107 while carrying out the planet movement of the cartridge B1-B4.

Here, referring to FIGS. 20, 22 and 23, the description will be made as to the operation of the coupling 150.

In the case where the cartridge B is in the pre-development retracted position 18Z (FIG. 23), the coupling 150 is in the pre-engagement angular position by the elastic force of the spring 159 described above (FIG. 23). As shown in (b) of FIG. 23, at this time, the portion-to-be-regulated 150j contacts to the positioning portion 160b1 of the accommodating portion 160b so that the angular position of the coupling 150 is restricted. In other words the coupling 150 is restricted to the pre-engagement angular position. In this manner, the intermediate portion 150c of the coupling 150 is urged by the elastic force of the spring 159. In this manner, the coupling 150 is urged so that the portion-to-be-regulated 150j contacts to the positioning portion 160b1 by the elastic force of the spring 159. And, the inclining direction of the coupling 150 is restricted toward the pre-engagement angular position in the state that the portion-to-be-regulated 150j is positioned by the positioning portion 160b1. Therefore, the coupling 150 inclines to the pre-engagement angular position by the elastic force (FIG. 23).

In this state, the rotary member C rotates in the direction X4, and the cartridge B1 in the process in which it moves from the pre-development retracted position 18Z (FIG. 23) to developing position DP (FIG. 20), the coupling 150 is brought into engagement with the drive shaft 180. And, the coupling 150 is moved from the pre-engagement angular position (FIG. 23) to the rotational force transmitting angular position (FIG. 20).

In the case where the cartridge B1 is positioned in the developing position DP (FIG. 20), the coupling 150 is in the rotational force transmitting angular position, and is in engagement with the drive shaft 180. The coupling 150 receives the rotational force from the drive shaft 180. As shown in FIG. 20(b), at this time, the portion-to-be-regulated 150j is in the permitting portion 160b2 of the accommodating portion 160b without contacting to the wall 163b3. And, the position of the coupling 150 is determined by the engagement with the drive shaft 180.

With the operation of engaging with the drive shaft 180 while the rotary member C rotates in the direction X4, the coupling 150 is moved from the pre-engagement angular position to the rotational force transmitting angular position. With this, the portion-to-be-regulated 150j is moved in the permitting portion 160b2 from the position of contacting to the positioning portion 160b1 against the elastic force of the spring 159. The portion-to-be-regulated 150j is not contacted to the wall 163b3 of the permitting portion 160b2.

By this, the coupling 150 becomes in the state revolvable substantially from the state of being in the pre-engagement angular position.

The rotary member C is stopped in the state that the coupling 150 is in engagement with the drive shaft 180. In other words the drive shaft 180 is provided, so that it engages with the coupling 150 at the stop position of the rotary member C in the developing position DP.

In the state shown in FIG. 20, the rotary member C rotates in the direction X4. In the process in which the cartridge B moves from developing position DP (FIG. 20) to the post-development retracted position 18Y (FIG. 22), the coupling 150 is moved from the rotational force transmitting angular position ((b) of FIG. 20) to the disengaging angular position ((b) of FIG. 22). With this, the engagement between the coupling 150 and the drive shaft 180 is released, and the transmission of the rotational force to the coupling 150 from the drive shaft 180 is released. By this, the coupling 150 is disengaged from the drive shaft 180.

Immediately after the coupling 150 disengaged from the drive shaft 180, the coupling is in the disengaging angular position (FIG. 22). As shown in FIG. 22(b), at this time, the portion-to-be-regulated 150j is in the permitting portion 160b2 of the accommodating portion 160b without contacting to the inner wall 163b3. And, the coupling 150 is in the disengaging angular position (FIG. 22(b)) for disengaging from the drive shaft 180.

When the position that the coupling 150 which is in the disengaging angular position does not interfere with the drive shaft 180 is reached, it is moved toward a pre-engagement angular position by the functions of the regulation member 160, and the spring 159. In other words the coupling 150 inclines to the pre-engagement angular position. As shown in FIG. 23(b), and, the portion-to-be-regulated 150j contacts to the positioning portion 160b1, so that the angular position of the coupling 150 becomes the pre-engagement angular position. This has been described hereinbefore.

With the rotation in the X4 direction, the rotary member C is moved also in the direction perpendicular to X4, i.e., the radial direction of the rotary member C, by the functions of the cam 101, and the roller 105 described above. Therefore, the cartridge B is moved not only in the rotational direction X4 of the rotary member C, but also in the radial direction o the rotary member C, in the case where the cartridge B moves to the rotational force transmitting angular position from the pre-engagement angular position, and in the case where it moves from the rotational force transmitting angular position to the disengaging angular position. The movement of the cartridge B to the rotational force transmitting angular position from the pre-engagement angular position is the movement of the cartridge B to developing position DP (FIG. 20) from the pre-development retracted position 18Z (FIG. 23). The movement of the cartridge B to the disengaging angular position from the rotational force transmitting angular position is the movement of the cartridge B to the post-development retracted position 18Y (FIG. 22) from developing position DP (FIG. 20).

Here, the driving portion 150b of the coupling 150 is moved along a locus provided by the combination of the movement in a circumferential direction X4 of the rotary member C, and the movement in the radial direction of the rotary member C perpendicular thereto, similarly to the cartridge B. On the other hand, and the driven portion 150a of the coupling 150 is moved following the drive shaft 180. Therefore, a pivoting locus of the coupling 150 differs from the mere interrelation between the driving portion 150b which is the pivoting fulcrum thereof, and the driven portion 150a which is the end of the pivoting. More particularly, the driving portion 150b which is the pivoting fulcrum thereof, and the driven portion 150a which is the end of the pivoting do not operate interrelatedly with each other in the pivoting locus (movement locus) of the coupling 150. At this time, the portion-to-be-regulated 150j for regulating a pivoting direction of the coupling 150 is in the permitting portion 160*b*2. Therefore, the portion-to-be-regulated 150*j* can freely move without interference with the wall 160*b*3 thereof. In other words the coupling 150 is revolvable substantially. More particularly, the configuration of the accommodating portion 160*b* is, such that in the case where the coupling 150 is in the position other than the pre-engagement angular position, the pivoting is not prevented, and only in the case where the coupling 150 is in the pre-engagement angular position, the inclining direction of the coupling 150 is regulated. By this, the stress imparted on the portion-to-be-regulated 150*j* can be minimized.

In other words, in the case where the coupling 150 is in the pre-engagement angular position, the pre-engagement angular position is determined by the regulating portion 150*j* and the positioning portion 160*b*1. By this, the inclining direction of the coupling 150 is determined. In the case where the coupling 150 carries out the engagement and disengagement operation relative to the drive shaft 180, the portion-to-be-regulated 150*j* is in the permitting portion 160*b*2, and the operation thereof is not regulated. In this manner, the coupling 150 is revolvable substantially in the case where the portion-to-be-regulated 150*j* is positioned in the permitting portion 160*b*2. Therefore, the coupling 150 can be engaged and disengaged relative to the drive shaft 180 without imparting large stress to the coupling 150.

As has been described hereinbefore, the rotation axis 101*i* of the rotary member C of the present embodiment is swingable. Also in such a rotary member C, the cartridge B of the present embodiment is assured in the engagement between the drive shaft 180 and the coupling 150. In addition, the disengagement between the drive shaft 180 and the coupling 150 is also assured.

This is one of the remarkable effects of the present embodiment.

As has been described hereinbefore, the coupling 150 is revolvable (swingable) over the full-circumference thereof substantially relative to the axis L4. More particularly, the coupling 150 is pivotable substantially in all directions relative to the axis L4.

Here, a revolution of the coupling is that a coupling itself does not rotate about the axis L2 of the coupling, and the axis L2 which inclined rotates about the axis L4 (the state of the revolution is shown in FIG. 13F). However, it does not exclude the case in which the coupling itself rotates about the axis L2 in the range of play or a gap provided positively.

In addition, it has been described hereinbefore that the axis L2 is inclinable in any directions relative to the axis L1. However, the coupling 150 is not necessarily inclinable linearly to the predetermined angle in any of the direction in 360 degrees.

In addition, as has been described hereinbefore, the coupling is revolvable substantially. More particularly, as for the coupling, the cotton is pivotable in all directions substantially. The coupling is revolvable substantially, and therefore, when a user mounts the cartridge B to the main assembly A, the coupling can move (pivot) to the rotational force transmitting angular position irrespective of the stoppage phase of the drive shaft which has the rotational force applying portion.

In addition, when the user dismounts the cartridge from the main assembly A, the coupling can move (pivot) to the disengaging angular position irrespective of the stoppage phase of the drive shaft.

In addition, the gap is provided between the pin (rotational force transmitting part) 155, and the rotational force reception surface (rotational force transmitted portion) 147*h* in the coupling 150 (FIG. 8C) so that it is inclinable in all directions substantially relative to the axis L4. In this manner, the coupling 150 is mounted to the longitudinal end portion of the cartridge B. Therefore, the coupling 150 is inclinable in all directions substantially relative to the axis L4.

In addition, in this embodiment, as has been described heretofore, the engaging operation between the drive shaft 180 and the coupling 150 is completed while the rotary member C rotates or immediately after the rotary member C stops. And, the rotation of the developing roller 110 is enabled.

More particularly, before the coupling 150 starts the engagement with the drive shaft 180, the coupling 150 starts the rotation simultaneously with the engagement with the drive shaft 180. By this, the developing roller 110 begins the rotation. In addition, in the case where the drive shaft 180 is at rest, the coupling 150 is at rest, without rotating even after the completion of the engagement between the coupling 150, and the drive shaft 180. And, when the drive shaft 180 begins the rotation, the coupling 150 begins the rotation. Furthermore, the developing roller 110 also begins the rotation.

In any case, according to this embodiment, it is not necessary to make the member for transmitting the rotational force of the main assembly side (main assembly side coupling, for example) advance, and retract in the axial direction thereof. Therefore, the time required for an image forming operation (development) can be shortened. In this embodiment, before the engaging operation, with the drive shaft 180, of the coupling 150 starts, the drive shaft 180 is rotated. Therefore, the image forming operation can be started promptly. Accordingly, as compared with the case where the drive shaft 180 is at rest, the time required for the image formation can further be shortened.

In this embodiment, in the state that the drive shaft 180 rotates, the coupling 150 can be disengaged from the drive shaft 180.

Therefore, according to the present embodiment, the developing roller 110 can be contacted to the photosensitive drum 107 while rotating the developing roller 110, even in the case where the movement, in the direction perpendicular to the rotation axis thereof, of the drive shaft 180 is prohibited. In addition, even in the case where the drive shaft 180 is fixed to the main assembly in this manner, the developing roller 110 can be disengaged from the photosensitive drum 107 while rotating the developing roller 110. This is because the coupling 150 receives the drive from the drive shaft 180 within the predetermined angle range (angle range in which the rotational force transmission is possible) toward the both sides from the rotational force transmitting angular position (the angular position which the developing roller 110, and the photosensitive drum 107 contact to each other). By this, the load imparted to the photosensitive drum 107 can be reduced at the time of the contact, and spacing of the developing roller 110.

In this embodiment, the stoppage of the drive shaft 180 may not be carried out in order to engage the coupling 150 with the drive shaft 180 or in order to disengage it from the drive shaft 180.

More particularly, according to the coupling 150 of the present embodiment, the engagement with the drive shaft 180 or the disengagement from the drive shaft 180 is possible while the drive shaft 180 rotates.

This is one of the remarkable effects of the present embodiment.

In this embodiment, the rotary member C is operated through the following step. The rotary member C swings toward a photosensitive drum 107 in the radial direction thereof; a yellow image forming operation is carried out; the rotary member C swings in the direction away from the photosensitive drum 107 in the radial direction; and a rotation of the developing roller 110 stops. The swinging of the rotary member C toward the direction of the photosensitive drum 107 in the radial direction is the swinging in the direction of contacting the developing roller 110 to the photosensitive drum 107. In addition, the swinging of the rotary member C away from the direction of the photosensitive drum 107 in the radial direction is the swinging in the direction of separating the developing roller 110 from the photosensitive drum 107. Simultaneously with the start of the rotation of the rotary member C, the coupling 150 is disengaged from the drive shaft 180, and the developing operation for a second color is prepared.

In this embodiment, the operations of the engagement and disengagement of the coupling relative to the drive shaft 180 are operated interrelatedly with the rotation of the rotary member C 150. Therefore, the time required between the development for the first color, and development for the second color Development can be shortened. Similarly, reduction can be accomplished between the development for the second color, and the development for a third color, between the development for the third color, and the development for a fourth color, between the home position and the development for the first color, and between the development for the fourth color and the home position. Therefore, the time required to produce the one color image can be shortened.

This is one of the remarkable effects of the present embodiment.

The present embodiment is applicable also to the case where the rotary member C rotates in the opposite direction from the rotational direction X4.

In the case where the rotary member C rotates in the opposite direction from the rotational direction X4 in the state shown in FIG. 20, the engagement and disengagement between the coupling 150, and the drive shaft 180 are possible in the process that the cartridge B1 moves from developing position DP (FIG. 20) to the pre-development retracted position 18Z (FIG. 23). More particularly, the coupling 150 can disengage from the drive shaft 180 by an inverse rotation of the rotary member C. In this case, the coupling 150 is moved from a drive transmission angular position to the pre-engagement angular position in the process of disengaging from the drive shaft 180. By rotating thereafter the rotary member C in a direction of the rotational direction X4, the coupling 150 becomes engageable with the drive shaft 180.

(10) Engaging Operation, Rotational Force Transmitting Operation, and Disengaging Operation of Coupling As has been described in the foregoing, the coupling 150 engages with the drive shaft 180 (from FIG. 23 to FIG. 20) immediately before the cartridge B stops at the predetermined position of the main assembly A or substantially simultaneously with the stoppage at the predetermined position. After the rotation of the coupling 150 for predetermined time, the coupling 150 is disengaged from the drive shaft 180 (from FIG. 20 to FIG. 22) when the cartridge B moves from the predetermined position in the main assembly A.

Referring to FIG. 24-FIG. 28, the description will be made as to the engaging operation of the coupling with the drive shaft 180, the rotational force transmitting operation, and the disengaging operation.

Figure 24:
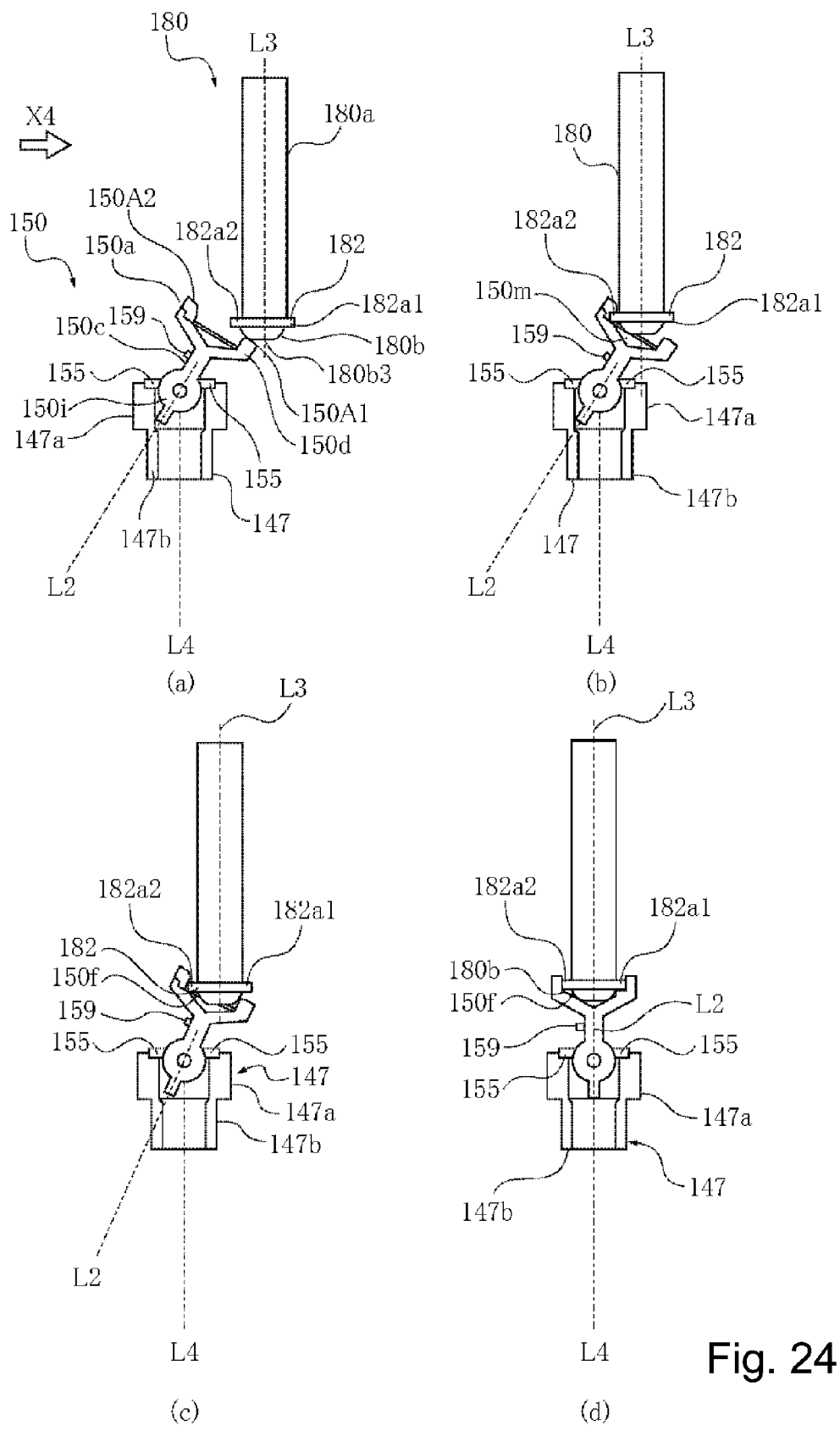
FIG. 24 is a longitudinal sectional view illustrating an engaged state between the drive shaft, and the coupling according to an embodiment of the present invention.
Figure 25:
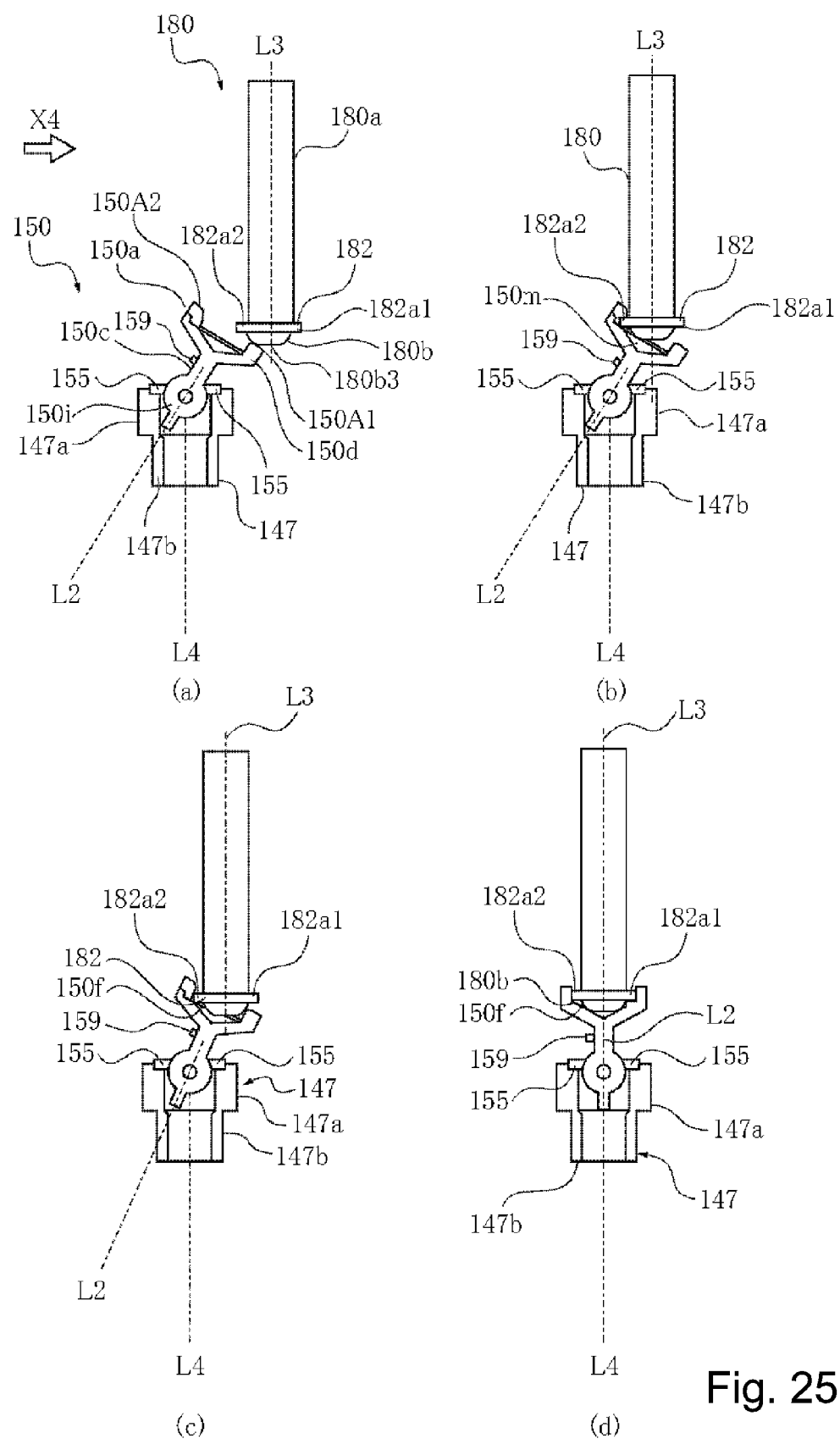
FIG. 25 is a longitudinal sectional view illustrating the engaged state between the drive shaft, and the coupling according to an embodiment of the present invention.
Figure 27:
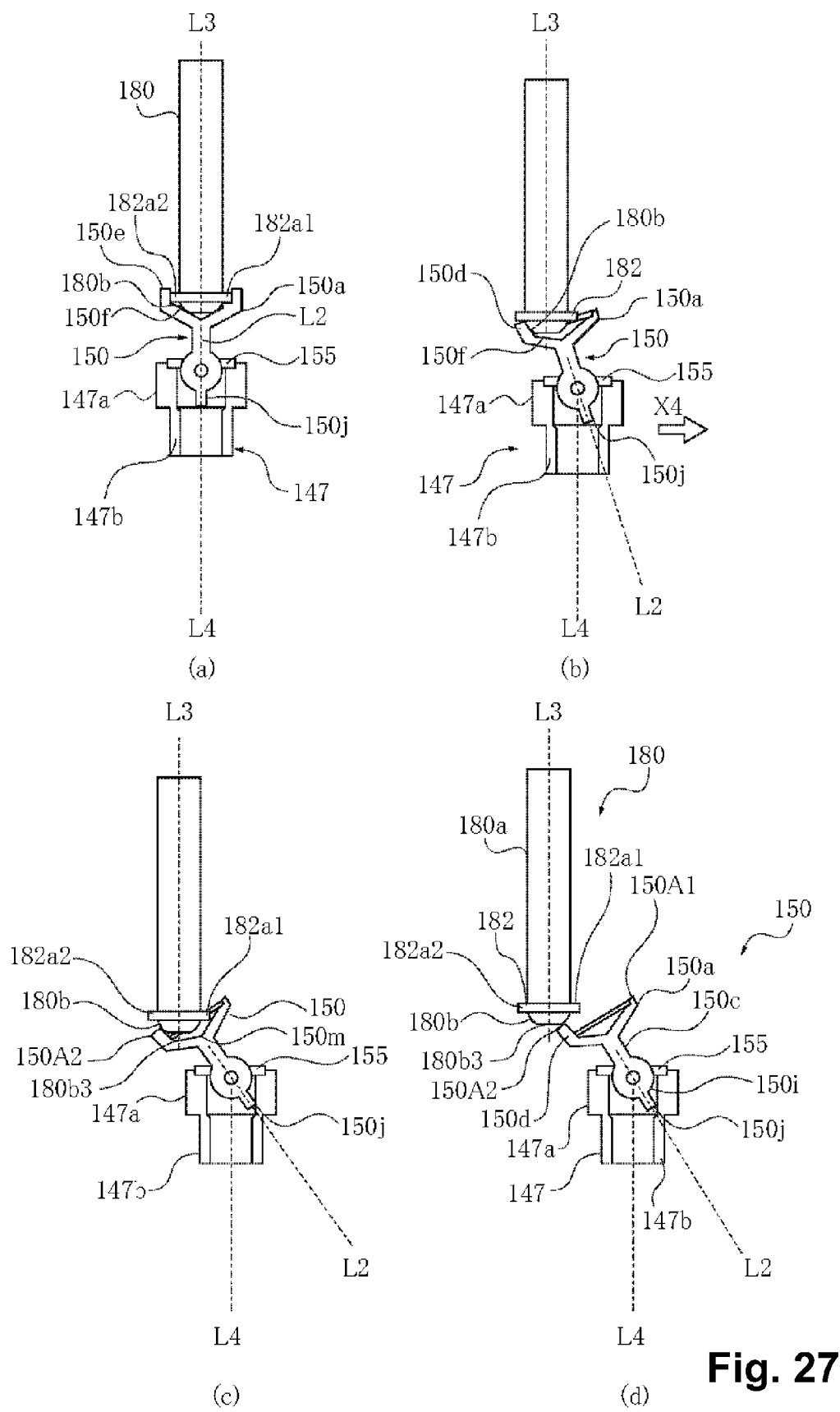
FIG. 27 is a longitudinal sectional view illustrating the process in which the drive shaft, and the coupling disengage from each other according to an embodiment of the present invention.

FIG. 24 is a longitudinal sectional view illustrating the drive shaft 180, the coupling 150, and the gear 147. FIG. 25 is a longitudinal sectional view illustrating a phase difference among the drive shaft 180, the coupling 150, and the gear 147. FIG. 27 is a longitudinal sectional view illustrating the drive shaft 180, the coupling 150, and the gear 147. (a) of FIG. 28 is a front view of the coupling 150, the developing roller 110 and a RS roller 115 in the case where the coupling 150 is in the pre-engagement angular position, as seen from the drive shaft (180) side. (b) of FIG. 28 is a front view of the coupling 150, the cartridge B, and the rotary member C in the case of the coupling 150 being in the pre-engagement angular position, as seen from the drive shaft (180) side.

In the process that the cartridge B moves to the developing position DP by the rotation of the rotary member C, the coupling 150 is in the pre-engagement angular position. More particularly, the coupling 150 is inclined by the spring (urging member, and elastic member) 159, so that the driven portion 150a is positioned in the downstream side with respect to the rotational direction X4, relative to the axis L4, of the gear 147. More particularly, in the pre-engagement angular position, the driven portion 150a is positioned in the downstream side, with respect to the rotational direction X4, of the driving portion 150b. In this embodiment, in the case where the coupling 150 is in the pre-engagement angular position, the axis L2 of the coupling 150 is positioned between the line L5, and the line L6 as seen from the drive shaft (180) side, (FIG. 28(a)). Here, the line L5 is a line through the center (axis L4) of the gear 147, and the center of the developing roller 110 (axis L1). The line L6 is a line through the center of the gear 147, and the center of the supplying roller 115. Therefore, the axis L2 is positioned between the developing roller 110, and the developer supply roller 115 ((a) of FIG. 28). And, the axis, l2 is in the downstream side with respect to the rotational direction X4 of the rotary member C relative to a tangent line L5 of a circle C3 which is concentric with the rotary member C, and which passes along the center of the driving portion 150b, and faces the outside with respect to the radial direction of the rotary member C, (FIG. 28(b)). By an inclination of the coupling 150, the a downstream free end position 150A1 with respect to the rotational direction X4 of the rotary member C is nearer than the free end 180b3 of the drive shaft to the gear 147 in a direction of the axis L4. In addition, the upstream free end position 150A2 with respect to the direction X4 is nearer than the free end 180b3 of the drive shaft to the pin 182 in the direction of the axis L1, ((a) and (b) of FIG. 24). Here, the free end position is remotest from the axis, l2 in the nearest side to the drive shaft with respect to the direction of the axis L2 in the driven portion 150a, shown in (a), and FIG. 7C. In other words, it is either an edge line of the driven portion 150a or an edge line of the driven projection 150d (in FIG. 7A and FIG. 7C, 150A) depending on the rotational phase of the coupling 150.

First, in the rotational direction (X4) of the rotary member C, the downstream free end position 150A1 passes an end 180b3 of an axis. And, after the coupling 150 passes the drive shaft 180, the conical receiving surface 150f or the projection 150d of the coupling 150 is brought into contact to the free end portion 180 or the pin 182 of the drive shaft 180.

In response to the rotation of the rotary member C, it is inclined (FIG. 24(c)) so that the axis L2 is parallel to the axis L4. Here, the rotary member C stops the rotation temporarily in the state of FIG. 24(c). At this time, the coupling 150 is between the pre-engagement angular position, and the drive transmission angular position. And, the coupling 150 is in the angular position where the rotational force can be transmitted if the two projections 150d and pins 182 contact to each other. When the rotary member C is at rest, the drive shaft 180 is rotated, and the gap between the pin 182 which is positioned in the entrance portion 150k and the projection 150d is reduced. Depending on a rotational phase difference between the coupling 150, and the drive shaft 180, the transmission of the rotational force to the coupling 150 from the drive shaft 180 is started during the temporary stop. And, the transmission of the rotational force is started from the drive shaft 180 to the coupling 150 by the time of reaching the stop position (FIG. 24(*c*)) of the rotary member C as will be described below.

And, finally the position of the cartridge B is determined relative to the main assembly A. In other words the rotary member C stops the rotation. At this time, the drive shaft 180, and the gear 147 are substantially co-axial with each other. More particularly, the coupling 150 is moved pivoted, swung, revolved from the pre-engagement angular position to the rotational force transmitting angular position so as to permit the free end position 150A1 to circumvent the drive shaft 180. And, the coupling 150 inclines toward the rotational force transmitting angular position from the pre-engagement angular position where the axis L2 is substantially co-axial with the axis L1. And, the coupling 150, and the drive shaft 180 are engaged with each other (FIG. 24(*c*)). In other words, a part of the driven portion 150*a* moves to a position behind the drive shaft 180 as seen along the movement direction. More particularly, the recess 150*z* covers the free end portion 180*b*. By this, the stabilized rotational force is transmitted from the drive shaft 180 to the coupling 150. At this time, the pin 155 is positioned in an opening 147*g*. The pin 182 is positioned in the entrance portion 150*k*.

In this embodiment, the drive shaft 180 is already rotated at the time when the coupling 150 starts the engagement relative to the drive shaft 180. For this reason, the coupling 150 begins the rotation immediately.

As has been described in the foregoing, according to this embodiment, the coupling 150 is inclinable relative to the axis L4. In the case where the portion-to-be-regulated 150*j* is positioned in the permitting portion 160*b*2, the coupling 150 is revolvable substantially relative to the axis L4. Therefore, in accordance with the rotation of the rotary member C, the coupling 150 can be engaged relative to the drive shaft 180 without interfering with the drive shaft 180 by the coupling 150 itself inclining.

Furthermore, in this embodiment, as has been described hereinbefore, the drive shaft 180 always rotates. For this reason, at the time of an engaging operation, the rotational phase of the drive shaft 180 is always changing, and the phase relation between the drive shaft 180 and the coupling 150 is not constant. Even in such a case, the engaging operation of the coupling 150 described above is possible irrespective of the phase difference between the drive shaft 180 and the coupling 150. Referring to FIG. 25, the description will be made as to this engagement. FIG. 25 is a view illustrating the phases of the coupling 150 and the drive shaft 180. (a) of FIG. 25 is a view in the state where the pin 182, and the driving shaft receiving surface 150*f* opposes to each other in the upstream side with respect to the rotational direction X4, of the rotary member C. The pin 182 and the projection 150*d* of the coupling 150 face to each other in (b) of FIG. 25. (c) of FIG. 25 is a view in the state where the free end portion 180*b* of the drive shaft and the projection 150*d* of the coupling 150 oppose to each other. (c) of FIG. 25 is a view in the state where the free end portion 180*b* and the receiving surface 150*f* opposes to each other. As shown in FIG. 10A1-A5, 10B1-B5, the coupling 150 is inclinable in all directions relative to the gear 147. More particularly, the coupling 150 is revolvable substantially. As shown in FIG. 25, for this reason, the coupling 150 can incline in a mounting direction X4 irrespective of the phase of the gear 147 relative to the rotational direction X4. Independently from the phases of the drive shaft 180, and the coupling 150, the downstream free end position 150A1 with respect to the rotational direction X4 of the rotary member C is nearer than the free end 180*b*3 of the drive shaft to a cartridge B, and it is in the downstream side with respect to the rotational direction X4, of the rotary member C. The upstream free end position 150A2 with respect to the rotational direction X4 is near than the free end 180*b*3 of the drive shaft to the pin 182, by setting the inclination angle of the coupling 150. With such a setting, in response to a rotating operation of the rotary member, c, the downstream free end position 150A1 with respect to the rotational direction X4, passes by the free end 180*b*3, of the drive shaft. And, in the case of (a) of FIG. 25, the driving shaft receiving surface 150*f* contacts to the pin 182. In the case shown in (b) of FIG. 25, the projection 150*d* contacts to the pin 182. In the case shown in (c) of FIG. 25, the projection 150*d* contacts to the free end portion 180*b*. In the case shown in (c) of FIG. 25, the receiving surface 150*f* contacts to the free end portion 180*b*. By a contact force (urging force) produced when the rotary member C rotates, the axis L2 approaches to the position in parallel with the axis L4, and they engage with each other. Therefore, they can be engaged with each other, irrespective of the phase difference between the drive shaft 180 and the coupling 150 or the phase difference between the coupling 150 and the gear 147.

Figure 26:
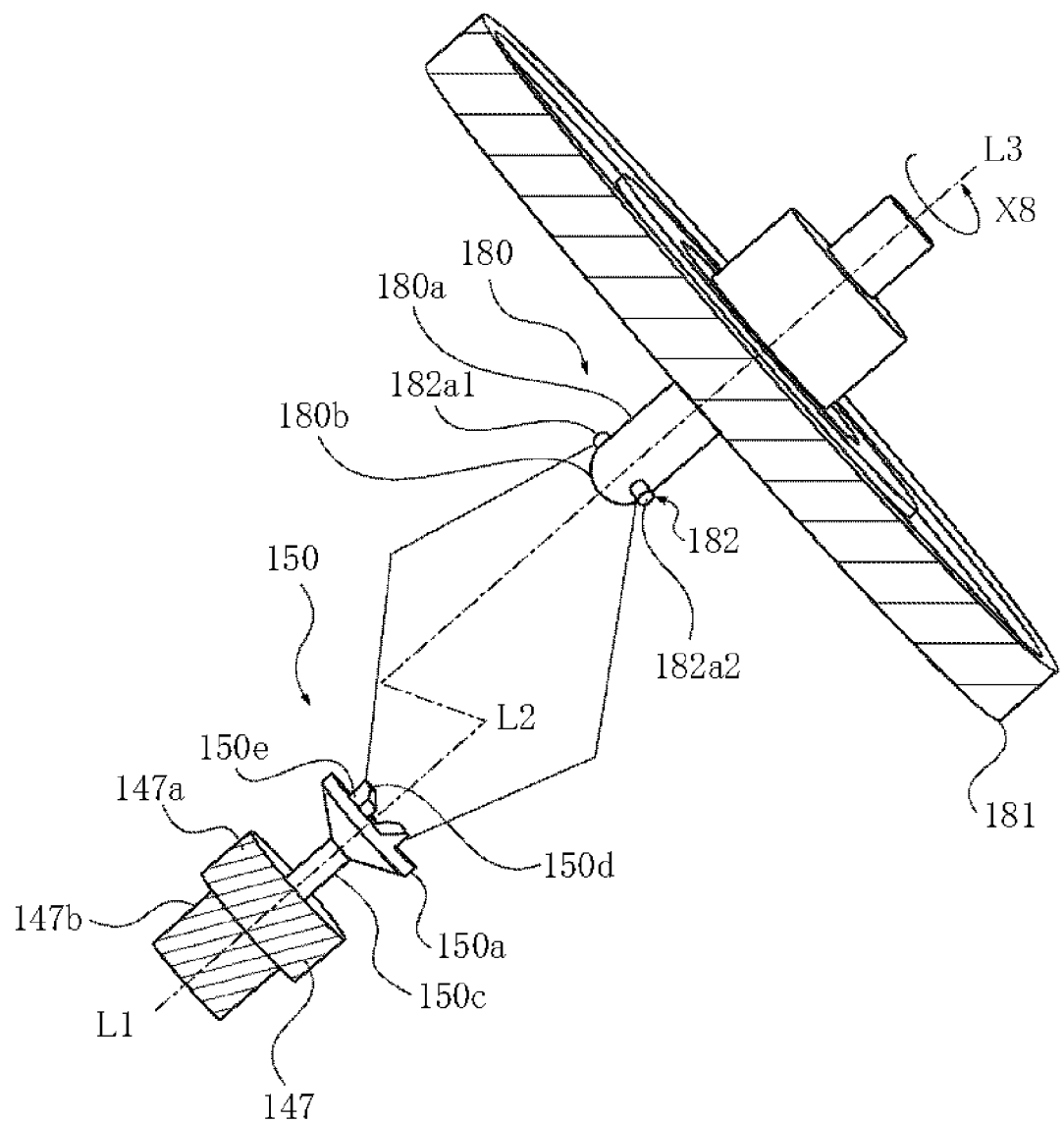
FIG. 26 is a perspective view between the drive shaft, and the coupling according to an embodiment of the present invention.

Referring to FIG. 26, the rotational force transmitting operation at the time of rotating the developing roller 110 will be described.

By the rotational force received from the motor (unshown) the drive shaft 180 is rotated with the gear (helical gear) 181 in the X8 direction in the Figure. And, the pin 182 integral with the drive shaft 180 contacts to a rotational force reception surface 150*e*1, 150*e*2 of the coupling 150 to rotate the coupling 150. As has been described hereinbefore, the coupling 150 can transmit the rotational force to the developing roller 110 through the gear 147. For this reason, by the rotation of the coupling 150, the rotational force is transmitted to the gear 145 mounted to a shaft 110*b* of the developing roller 110 through the gear 147. By this, the developing roller 110 is rotated.

Because the coupling 150 inclines slightly, the coupling can be rotated without applying a large load to the developing roller 110 or the drive shaft 180.

This is one of the remarkable effects of the embodiment.

Referring to FIG. 27, the description will be made as to the disengaging operation from the drive shaft 180 of the coupling 150 in accordance with the movement from the predetermined position (developing position DP) of the cartridge B by the unidirectional rotation of the rotary member C.

First, the position of the rotational force transmitting pin at the time of the cartridge B moving from the predetermined position will be described. When the image formation finishes, as will be apparent from the foregoing description, the pins 182 are positioned in the entrance portions 150*k*1, 150*k*2. And, the pins 155 are positioned in the opening 150*g* 1 or 150*g*2.

The disengaging operation of the coupling 150 from the drive shaft 180 will be described in interrelation with the operation (FIG. 20-FIG. 22) for changing to the next developing cartridge B, after the cartridge B finishes an image forming operation.

In the state in which the image forming operation has finished, the coupling 150 is in the rotational force transmitting angular position where the axis L2, and the axis are substantially co-axial ((a) of FIG. 27). The gear 147 moves in the rotational direction X4 with the cartridge B. The upstream receiving surface 150*f* or projection 150*d* contacts to the free end portion 180*b* of the drive shaft 180, or the pin 182 in the rotational direction X4. And, the axis, l2 starts the inclination toward the upstream side with respect to the rotational direction X4, (FIG. 27(b)). The inclining direction at this time is opposite, with respect to the gear 147, to the engaging direction with the drive shaft 180. In other words the inclining direction is away from the pre-engagement angular position beyond the axis L4. By the rotating operation of the rotary member, c, the upstream side free end portion 150A2 moves with respect to the rotational direction X4 while contacting to the free end portion 180b, of the drive shaft 180. And, the axis L2 inclines to the disengaging angular position (FIG. 27(c)), such that the upstream side free end portion 150A2 reaches the free end 180b3. In this state, while contacting to the free end 180b3, the coupling 150 passes by the free end 180b3 (FIG. 27(c)). More particularly, the coupling 150 is moved from the rotational force transmitting angular position to the disengaging angular position, so that the a part of coupling 150 (upstream free end position 150A2) which is in the upstream side of the drive shaft 180 with respect to the rotational direction X4, circumvents the drive shaft 180. In other words, a part of driven portion 150a behind the drive shaft 180 as seen in the direction opposite the rotational direction x4 retracts from behind the drive shaft 180, and moves to the downstream side of the drive shaft 180 in the rotational direction X4. Thereafter, the cartridge B moves in accordance with the rotation of the rotary member C so that the state becomes as shown in FIG. 22.

Furthermore, by the time the rotary member, c carries out one full turn, the coupling 150 is inclined by the urging member 159 described above, so that the axis L2 thereof inclines toward the downstream side with respect to the rotational direction X4. In other words, the coupling 150 is moved from the disengaging angular position to the pre-engagement angular position. By doing so, after the rotary member C carries out the one full turn, the coupling 150 is engageable again with the drive shaft 180.

As will be apparent from the foregoing description, the angle, at the pre-engagement angular position, of the coupling 150 relative to the axis L4 is larger than the angle at the disengaging angular position. This is because, the pre-engagement angular position is set beforehand, such that at the time of an engagement of the coupling, the distance between the upstream free end position 150A1, and the free end portion 180b3 of the drive shaft is relatively large with respect to the rotational direction X4 ((b) of FIG. 24). By this, dimensional tolerances of the parts are provided. On the contrary, at the time of a coupling disengagement, the axis L2 inclines in interrelation with the rotation of the rotary member C in the disengaging angular position. For this reason, the free end portion 180b3 of the drive shaft is substantially the same as the downstream free end position 150A2 with respect to the rotational direction X4, in the direction of the axis L1, ((c) of FIG. 27).

Also when the coupling 150 disengages from the drive shaft 180, the coupling 150 can be disengaged from the drive shaft 180, irrespective of the phase difference between the coupling 150 and the pin 182.

The rotational force transmitting angular position of the coupling 150 is such an angular position of the coupling 150 relative to the gear axis L4 that the cartridge B is in the predetermined position, and can be rotated by the coupling 150 receiving the rotational force from the drive shaft 180. Here, the predetermined position is the position (developing position DP) which opposes to the photosensitive drum. More particularly, the rotational force transmitting angular position is such an angular position relative to the axis L4 that the coupling 150 can be rotated by receiving the rotational force from the drive shaft 180. The pre-engagement angular position of the coupling 150 is such an angular position of the coupling 150 relative to the axis L4 that immediately before the coupling 150 engages with the drive shaft 180 in the process that the cartridge B moves to the predetermined position in accordance with the rotation of the rotary member C. More particularly, the pre-engagement angular position is an angular position relative to the axis L4 immediately before the coupling 150 engages with the drive shaft 180. The disengaging angular position of the coupling 150 is such a angular position of the coupling 150 relative to the axis L4 that when the coupling 150 disengages from the drive shaft 180 in the process that the cartridge B moves from the predetermined position in response to the rotation of the rotary member C. More particularly, the disengaging angular position is an angular position relative to the axis L4 in the case the coupling 150 disengages from the drive shaft 180.

In the engagement angular position, and the disengaging angular position, the angles $\beta 2$, $\beta 3$ (FIG. 24, FIG. 27) between the axis L2 and the axis L4 is larger than the angle between the axis L2 and the axis 11 $\beta 1$ in the rotational force transmitting angular position. The angle $\beta 1$ is preferably 0 degree. The angles $\beta 2$ and $\beta 3$ are preferably 20 degrees-60 degrees. The angle range in which the rotational force transmission is possible described above $\beta 4$ is approx. 20 degrees-40 degrees toward the both sides of the rotational force transmitting angular position.

In this embodiment, the pre-engagement angular position is between the rotation axis of the developing roller 110, and the rotation axis of the supplying roller 115. More particularly, in this embodiment, the inclining direction of the coupling 150 which is in the pre-engagement angular position is between the rotation axis of the developing roller 110, and the rotation axis of the supplying roller 115.

By this, according to this embodiment, the coupling 150 can be assuredly engaged with the drive shaft 180 also in the rotary member having the swinging rotation axis 101i.

According to the embodiment described above, the drive shaft 180 and the coupling 150 are engaged and disengaged relative to each other in the cartridge B mounted to the rotary member C by moving in the direction substantially perpendicular to the direction of the axis L3 by the rotation of the rotary member C. The cartridge B is mounted to the accommodating portion 130a provided in the rotary member C.

The substantial perpendicularity will be described here.

Between the cartridge B and the rotary member C, a small gap is provided in order to mount and demount the cartridge B smoothly. More specifically, the small gap is provided, for example, between the guide 60b, and the guide C2, and between the guide 61b and the guide C2 with respect to the longitudinal direction. Therefore, when the cartridge B is mounted to the rotary member C, the whole cartridge B may slightly be slanting within the limits of the gaps. In addition, when the rotary member C rotates, a small positional deviation may happen. Therefore, the engagement and disengagement between the drive shaft 180, and the coupling 150 may not be carried out by the movement of the cartridge B in the strictly orthogonal direction. However, even in such a case, the present invention properly works as has been described hereinbefore. Therefore, also in the case where the cartridge B is slightly inclined, the state is substantial perpendicularity.

(12) Coupling Engaging Operation and Rotational Force Transmission

As has been described in the foregoing, the coupling 150 of the cartridge B is brought into engagement with the drive shaft 180 immediately before positioning to the predetermined position of the main assembly A or substantially simultaneously with the positioning to the predetermined position. More particularly, the coupling 150 is in the rotational force transmitting angular position. Here, in the state that the cartridge B is positioned in the predetermined position, the coupling 150 engages with the drive shaft 180.

As has been described hereinbefore, when the rotary member C rotates the coupling 150 is contacted to the drive shaft 180 in response to the movement of the cartridge B. By this, the portion-to-be-regulated 150j is moved to the permitting portion 160b2 from the regulating portion 160b1, in other words, the coupling 150 is moved to the rotational force transmitting angular position from the pre-engagement angular position. And, in the state that the coupling 150 is in the rotational force transmitting angular position, the coupling 150 transmits the rotational force received from the drive shaft 180 to the developing roller 110. By this, the developing roller 110 rotates.

When the rotary member C rotates furthermore, the coupling 150 is moved from the rotational force transmitting angular position to the disengaging angular position in accordance with the movement of the cartridge B. By this, the coupling 150 disengages from the drive shaft 180.

As has been described hereinbefore, the coupling 150 is mounted for inclining motion relative to the axis L4 of the gear, and it is inclined, without interfering with the drive shaft 180 in responses to the rotating operation of the rotary member C. By this, the coupling 150 can be disengaged from the drive shaft 180.

Another embodiment will be described.

Referring to FIG. 29 and FIG. 30, another embodiment will be described.

In this embodiment, the other mounting structure of the elastic material (urging member) 159 will be described. According to this embodiment, the coupling 150 can be further assuredly inclined in the direction of the pre-engagement angular position.

(a) of FIG. 29 and (b) of FIG. 29 are perspective views illustrating the state of mounting the elastic material (urging member) 159 to the supporting member 157. (a) of FIG. 30 is a perspective view of a cartridge drive portion. (b) of FIG. 30 illustrates the example of the supporting member 157 which has another configuration. In addition, in the examples shown in (a) of FIG. 29, (b) of FIG. 29 and (a) of FIG. 30, the lateral surface 157i of the supporting member 157 is provided with a projection 157n in addition to the structure of the embodiment described above. Furthermore, the projection 157n is provided with a recess 157n1 constituted by a surface 157n2, a surface 157n3, a surface 157n4 and a surface 157n5 (four surfaces). And, the free end portion (other end) 159a1 of the contact portion 159a of the spring 159 is accommodated in the recess 157n1, and is restricted in the movement toward the axis L4 by the surface 157n2 and the surface 157n4. More particularly, the free end portion (other end) 159a1 enters in the recess 157n1, and is movable along the recess 157n1. The free end portion (other end) 159a1 is in engagement movably with the recess 157n1. In addition, the lateral surface 157i of the supporting member 157 is provided with a projection 157o. In the case where the coupling 150 is in the pre-engagement angular position, the driven portion 150a of the coupling 150 contacts to the projection 157o. By this, the inclination angle position of the coupling 150 is determined. Here, the configuration of the recess 157n1 is as follows. More particularly, the recess 157n1 is extended along the locus of a free end portion 159a1 when the contact portion 159a moves in the direction perpendicular to the axis L4, with the movement between the pre-engagement angular position and the disengaging angular position of the coupling 150.

The recess 157n1 does not prevent the movement of the free end portion 159a1 in the direction perpendicular to the axis L4. However, the movement of the free end portion 159a1 in the direction of the axis L4 is restricted by the surface 157n2 and the surface 157n4.

When the coupling 150 is in the pre-engagement angular position, and the spring 159 elastically urges the coupling 150 by the contact portion 159a, the contact portion 159a receives a reaction force F including a force F1 in the direction of the axis L4 from the coupling 150. (a) of FIG. 30 shows this state. However, the free end portion 159a1 is restricted in the movement in the direction of the axis L4 by the surface 157n4 of the recess 157n1. By this, the contact portion 159a does not tilt in the direction of the axis L4 by the force F1. Similarly, in the case where the coupling 150 is in the angular position other than the pre-engagement angular position, even if the contact portion 159a receives the force in the direction of the axis L4, the tilting of the contact portion 159a in the direction of the axis L4 can be prevented by the surface 157n2 of the recess 157n1 or the surface 157n4.

By the above-described structure, when the coupling 150 takes various angular positions, the contact portion 159a receives the force in the direction of the axis L4. However, the free end portion 159a1 is regulated in the movement of the in the direction of the axis L4 by the surfaces 157n2 and 157n4 of the recess 157n1. By this, the tilting of the contact portion 159a in the direction of the axis L4 can be prevented. By this, the contact portion 159a can be assuredly contacted to the intermediate portion 150c of the coupling 150. Therefore, the spring 159 can elastically be assuredly urged toward the pre-engagement angular position (first angular position) in the coupling 150.

As has been described hereinbefore, the coil part (end) 159b at the end of the spring (elastic material) 159 is fixed to the mounting portion 157e1. More particularly, the coil part (end) 159b is fixed to the supporting member 157. This is because the mounting portion 157e1 is securedly fixed to the supporting member 157. The free end portion (other end) 159a1 of the spring 159 is movably engaged with the recess 157n1 for restricting the movement in the axial direction of the drive shaft 180. More particularly, the other end 159a1 is movably engaged with the recess 157n1 provided in the supporting member 157.

The configurations of the projection 157n and the recess 157n1 are not limited to the above described ones if the surface 157n2 and the surface 157n4 satisfy the functions described above. For example, the configuration shown in (b) of FIG. 30 can be employed. More particularly, in the embodiment shown in (b) of FIG. 30, the configurations of the projection 157n and the recess 157n1 are linear.

In the examples shown in FIG. 29 and FIG. 30, the recess 157n1 is a hole penetrating in the direction crossing with the longitudinal direction of the coupling 150 which is in the rotational force transmitting angular position. In this embodiment, the recess 157n1 is a through-hole, and therefore, the resin molding is made easy. However, it is not limited to the through-hole, but a suitable recess recessed in the direction crossing with the direction can be used. Therefore, the recess includes a through-hole, a groove, and so on. Here, the longitudinal direction of the coupling 150 is the direction toward the free end of the projection 150d from the free end of the portion-to-be-regulated 150j. In this embodiment, the through-hole as the recess 157n1 extends in the direction perpendicular to the longitudinal direction of the coupling 150 which is in the rotational force transmitting angular position. By this, the effects described above are provided further assuredly. However, the present invention is not limited to this.

In this embodiment, the structure shown in FIG. 29 is made of the resin material except for the spring 159.

The longitudinal direction of the coupling 150 which is in the rotational force transmitting angular position is the same as the longitudinal direction of developing cartridge B (developing roller 110).

According to the embodiment shown in FIG. 29 and FIG. 30, the coupling 150 can be assuredly inclined toward the pre-engagement angular position.

As has been described hereinbefore, the embodiments described above are as follows.

Even in the structure in which the cartridge B moves in the direction substantially perpendicular to the direction of the axis L3 of the drive shaft 180, the coupling 150 can engage with the drive shaft 180, and can disengage from the drive shaft 180. In addition, the cartridge B is moved in the direction substantially perpendicular to the direction of the axis L3 of the drive shaft 180 in accordance with the rotation of the rotary member C. This is because as described above, the coupling 150 can take the rotational force transmitting angular position (first angular position), the pre-engagement angular position (second angular position), and the disengaging angular position (third angular position). The rotational force transmitting angular position is the angular position for transmitting the rotational force from the main assembly A to the developing roller 110. The pre-engagement angular position is the angular position inclined from the rotational force transmitting angular position before the coupling 150 engages with the drive shaft 180. The rotational force transmitting angular position to the pre-engagement angular position of the disengaging angular position is the angular position inclined toward the opposite side in order to disengage the coupling 150 from the drive shaft 180.

As has been described hereinbefore, the rotational force transmitting angular position (first angular position) is the angular position of the coupling 150 for transmitting the rotational force for rotating the developing roller 110 to the developing roller 110.

The pre-engagement angular position (second angular position) is the angular position of the coupling 150 inclined from the rotational force transmitting angular position before the coupling 150 engages with the drive shaft.

In addition, the disengaging angular position (third angular position) is the angular position of the coupling 150 inclined toward the side opposite from the pre-engagement angular position from the rotational force transmitting angular position in order to disengage the coupling 150 from the drive shaft 180.

According to the embodiment described in the foregoing, a developing device (developing cartridge) is provided which is usable even with the main assembly which is not provided with the mechanism for moving the main assembly side coupling member in the axial direction thereof by solenoid or the like. More particularly, by moving the developing device (developing cartridge) in the direction substantially perpendicular to the axial direction of the drive shaft, the coupling member provided on the developing device (developing cartridge) is engageable with the drive shaft. And, a rotational force transmitting part usable for the developing device (developing cartridge) is provided. In addition, an electrophotographic image forming apparatus usable with the developing device (developing cartridge) is provided.

According to the embodiment described in the foregoing, a developing device (developing cartridge) can be provided which can be engaged with the drive shaft in the direction substantially perpendicular to the axial direction of the drive shaft provided in the main assembly of the electrophotographic image forming apparatus. And, a rotational force transmission article usable for the developing device (developing cartridge) can be provided. In addition, an electrophotographic image forming apparatus usable with the developing device (developing cartridge) can be provided.

According to the embodiment described in the foregoing, a developing device (developing cartridge) can be provided, wherein the developing roller can be rotated smoothly as compared with the case where the operative connection between the main assembly and the developing device (developing cartridge) is effected by the gear-to-gear. And, a rotational force transmission article usable with the developing device (developing cartridge) can be provided. In addition, an electrophotographic image forming apparatus usable with the developing device (developing cartridge) can be provided.

According to the embodiment described in the foregoing, a developing device (developing cartridge) can be provided, wherein it can engage with the drive shaft in the direction substantially perpendicular to the direction of the axis of the drive shaft provided in the main assembly, and the developing roller can be rotated smoothly. And, a rotational force transmitting part usable with the developing device (developing cartridge) can be provided. In addition, an electrophotographic image forming apparatus usable with the developing device (developing cartridge) can be provided.

According to the embodiment described in the foregoing, a developing device (developing cartridge) can be provided which can be engaged, and disengaged in the direction substantially perpendicular to the axial direction relative to the drive shaft provided in the main assembly of the electrophotographic image forming apparatus by the movement (rotation) of the movable member (rotary member). And, a rotational force transmitting part usable with the developing device (developing cartridge) can be provided. In addition, an electrophotographic image forming apparatus usable with the developing device (developing cartridge) can be provided.

According to the embodiment described in the foregoing, a developing device (developing cartridge) can be provided which can be engaged and disengaged in the direction substantially perpendicular to the direction of the axis of the drive shaft relative to the device side drive shaft by the movement (rotation) of the movable member (rotary member), and which can rotate the developing roller smoothly. The rotational force transmitting part usable for the developing device (developing cartridge) can be provided. In addition, an electrophotographic image forming apparatus usable with the developing device (developing cartridge) can be provided.

According to the embodiment described in the foregoing, a developing device (developing cartridge) can be provided which is usable with the movable member (developing rotary member) which has the rotation axis which swings, wherein the developing device (developing cartridge) moves in the direction perpendicular to the axial direction of the drive shaft in response to the rotation of the movable member (developing rotary member). More particularly, according to the embodiment described above, even in the above described case, the developing device (developing cartridge) is assuredly engaged and disengaged relative to the main assembly side drive shaft, and the developing roller is rotated smoothly. And, a rotational force transmitting part usable with the developing device (developing cartridge) can be provided. In addition, an electrophotographic image forming apparatus usable with the developing device (developing cartridge) can be provided.

As has been described hereinbefore, according to the embodiment described above, the coupling member can take the state that it is revolvable substantially, and in addition the state of regulating the inclining direction of the coupling member is in the predetermined direction. By this, according to the embodiment described above, the state that the coupling member is kept stable in the pre-engagement angular position can be maintained. As has been described hereinbefore, according to the regulation member 160 of the present embodiment, even before the developing cartridge is mounted to the rotary member, the coupling member can be maintained at the pre-engagement engagement angular position (second angular position). More particularly, the coupling member can be maintained at the pre-engagement angular position (second angular position) even in the free state of the developing cartridge. Therefore, in the case of the transportation of the cartridge B, for example, the unintended movement of the coupling member can be prevented. The present invention can be applied to a developing device, a developing cartridge, a rotational force transmitting part, and an electrophotographic image forming apparatus.

While the invention has been described with reference to the structures disclosed herein, it is not confined to the details set forth, and this application is intended to cover such modification or changes as may come within the purposes of the improvements or the scope of the following claims.

This application claims priority from Japanese Patent Applications Nos. 218465/2008 and 191189/2009 filed Aug. 27, 2008 and Aug. 20, 2009, respectively, which are hereby incorporated by reference.

What is claimed is:

1. A developing device usable with an electrophotographic image forming apparatus, said apparatus including a driving shaft rotatable by a motor and having a rotating force applying portion, and a movable member, said developing device being mountable to the movable member, and said developing device being movable in a direction substantially perpendicular to an axial direction of the driving shaft in response to movement of the movable member in one direction with said developing device mounted to the movable member, wherein said driving shaft is not movable in a direction perpendicular to an axis thereof, said developing device comprising:
   i) a frame
   ii) a developing roller, provided in said frame, for developing an electrostatic latent image formed on an electrophotographic photosensitive drum, said developing roller being rotatable about an axis, wherein said developing roller is contacted to and separated from said electrophotographic photosensitive member drum in response to movement of the movable member; and
   iii) a coupling member for transmitting a rotating force to said developing roller, said coupling member including a rotating force receiving portion engageable with the rotating force applying portion to receive a rotating force from the driving shaft, and a rotating force transmitting portion for transmitting the rotating force received through said rotating force receiving portion to said developing roller,
   iv) a cylindrical member movably supporting one end portion of said coupling member inside of said cylindrical member so that said coupling member is capable of taking (a) a rotational force transmitting angular position for transmitting the rotational force for rotating said developing roller to said developing roller, (b) a pre-engagement angular position which is taken before said coupling member is engaged with the rotating force applying portion and in which said coupling member is inclined away from the rotational force transmitting angular position, and (c) a disengaging angular position which is taken for said coupling member to disengage from the driving shaft and in which said coupling member is inclined away from the rotational force transmitting angular position in a direction opposite to the pre-engagement angular position, said cylindrical member being configured to transmit the rotational force from said coupling member to said developing roller, wherein said frame includes (i) a supporting portion configured to support said cylindrical member rotatably and (ii) a regulation portion capable of regulating said coupling member at a pre-engagement angular position, wherein said supporting portion encompasses said regulating portion as seen along a rotational axis of said cylindrical member, wherein in response to a movement of said developing device when the movable member moves in the one direction, said coupling member moves from the pre-engagement angular position to the rotational force transmitting angular position, and when the movable member makes a further movement in the one direction, in response to the further movement said coupling member is moved from the rotational force transmitting angular position to the disengaging angular position to disengage said coupling member from the driving shaft, and wherein, when said coupling member moves from the pre-engagement angular position to the rotational force transmitting angular position in response to the movement of said developing device, said developing roller is contacted to said electrophotographic photosensitive member in a state that said developing roller is rotated through engagement between said coupling member and the rotating force applying portion.

2. A device according to claim 1, wherein said coupling member moves from the rotational force transmitting angular position to the disengaging angular position by the movement of the movable member in the one direction so that part of said coupling member circumvents the driving shaft in response to movement of said developing device in the direction substantially perpendicular to the axis of said developing roller.

3. A device according to claim 1, wherein said coupling member has a recess in which a rotational axis of said coupling member extends, and said recess is moved over a free end of the driving shaft by movement of said coupling member from the pre-engagement angular position to the rotational force transmitting angular position.

4. A device according to claim 1, wherein when said coupling member is in the rotational force transmitting angular position, said rotating force receiving portion is engaged, in a direction of rotation of said coupling member, with the rotating force applying portion that is projected in a direction perpendicular to the axial direction of the driving shaft, by which said coupling member receives a rotating force from the driving shaft to rotate.

5. A device according to claim 4, wherein said coupling member moves from the rotational force transmitting angular position to the disengaging angular position to disengage from the driving shaft by the further movement of the movable member in the one direction so that part of said coupling member circumvents the driving shaft in response to movement of said developing device in the direction substantially perpendicular to the axis of said developing roller.

6. A device according to claim 1, wherein a plurality of such rotational force receiving portions are provided on a phantom circle having a center on the rotational axis of said coupling member at positions substantially diametrically opposite to each other.

7. A device according to claim 1, wherein said rotational force receiving portion includes a first rotational force receiving portion and a second rotational force receiving portion, said first and second rotational force receiving portions being projected at each of two positions of an edge portion of a flat portion interposing a central portion of said rotational force receiving portion, wherein the rotational force applying portion includes a first rotational force applying portion and a second rotational force applying portion, the first and second rotational force applying portions being projected in a direction perpendicular to the axis of the driving shaft at each of two positions opposite to each other, and wherein said coupling member receives a rotational force from the driving shaft to rotate by said first rotational force receiving portion engaging to the first rotational force applying portion and by said second rotational force receiving portion engaging to the second rotational force applying portion, said first rotational force receiving portion is opposed to said second rotational force receiving portion, and the first rotational force applying portion is opposed to the second rotational force applying portion.

8. A device according to claim 1, wherein said coupling member has a circular flat portion at a free end thereof, and a recess is disposed at a central portion of said circular flat portion, said recess including an expanding portion expanding toward a free end thereof.

9. A device according to claim 8, further comprising an elastic member for elastically urging said coupling member with such an elastic force so as to permit said coupling member to move from the pre-engagement angular position to the rotational force transmitting angular position to maintain said coupling member at the pre-engagement angular position, and so as to permit said coupling member to move from the rotational force transmitting angular position to the disengaging angular position.

10. A device according to claim 1, wherein said coupling member is provided in a position away from the axis of said developing roller with respect to a direction perpendicular to the axis of said developing roller.

11. A device according to claim 9, wherein said rotating force transmitting portion is disposed in a side opposite from said rotating force receiving portion, and wherein the rotating force received by said rotating force transmitting portion is transmitted to said rotating force transmitting portion through said rotating force receiving portion and the driving shaft.

12. A device according to claim 1, wherein said developing device contains a yellow color developer, a magenta color developer, a cyan color developer or a black color developer, and is a developing cartridge detachably mountable to the movable member in the form of a developing rotary.

13. An electrophotographic image forming apparatus for forming an image on a recording material, said electrophotographic image forming apparatus comprising:

i) a driving shaft rotatable by a motor and having a rotating force applying portion, wherein said driving shaft is not movable in a direction perpendicular to an axis thereof;

ii) a movable member;

iii) a developing device which is movable in a direction substantially perpendicular to an axial direction of said driving shaft in response to movement of said movable member in a state that said developing device is mounted to said movable member, in response to the moment of said movable member, said developing device including:

a frame, a developing roller, provided in said frame, for developing an electrostatic latent image formed on an electrophotographic photosensitive drum, said developing roller being rotatable about an axis, wherein said developing roller is contacted to and separated from said electrophotographic photosensitive member drum in response to movement of said movable member, and a coupling member for transmitting a rotating force to said developing roller, said coupling member including a rotating force receiving portion engageable with said rotating force applying portion to receive a rotating force from said driving shaft, and a rotating force transmitting portion for transmitting the rotating force received through said rotating force receiving portion to said developing roller, iv) a cylindrical member movably supporting one end portion of said coupling member inside of the cylindrical member so that said coupling member is capable of taking (a) a rotational force transmitting angular position for transmitting the rotational force for rotating said developing roller to said developing roller, (b) a pre-engagement angular position which is taken before said coupling member is engaged with said rotating force applying portion and in which said coupling member is inclined away from the rotational force transmitting angular position, and (c) a disengaging angular position which is taken for said coupling member to disengage from said driving shaft and in which said coupling member is inclined away from the rotational force transmitting angular position in a direction opposite to the pre-engagement angular position to disengage from said driving shaft said cylindrical member being configured to transmit the rotational force from said coupling member to said developing roller, wherein said frame includes (i) a supporting portion configured to support said cylindrical member rotatably and (ii) a regulating portion capable of regulating said coupling member at the pre-engagement angular position, wherein said supporting portion encompasses said regulating portion as seen along a rotational axis of cylindrical member; and wherein in response to a movement of said developing device when said movable member moves in the one direction, said coupling member moves from the pre-engagement angular position to the rotational force transmitting angular position, and wherein when said movable member makes a further movement in said the direction, in response to the further movement, said coupling member is moved from the rotational force transmitting angular position to the disengaging angular position to disengage said coupling member from said driving shaft, and wherein, when said coupling member moves from the pre-engagement angular position to the rotational force transmitting angular position in response to the movement of said developing device, said developing roller is contacted to said electrophotographic photosensitive member in a state that said developing roller is rotated through engagement between said coupling member and said rotating force applying portion.

14. An apparatus according to claim 13, wherein said coupling member moves from the rotational force transmitting angular position to the disengaging angular position by the movement of said movable member in the one direction so that part of said coupling member circumvents said driving shaft in response to movement of said developing device in the direction substantially perpendicular to the axis of said developing roller.

15. An apparatus according to claim 13, wherein said coupling member has a recess in which a rotational axis of said coupling member extends, and said recess is moved over a free end of said driving shaft by movement of said coupling member from the pre-engagement angular position to the rotational force transmitting angular position.

16. An apparatus according to claim 13, wherein when said coupling member is in the rotational force transmitting angular position, said rotating force receiving portion is engaged, in a direction of rotation of said coupling member, with said rotating force applying portion which is projected in a direction perpendicular to the axial direction of said driving shaft, by which said coupling member receives a rotating force from said driving shaft to rotate.

17. An apparatus according to claim 16, wherein said coupling member moves from the rotational force transmitting angular position to the disengaging angular position to disengage from said driving shaft by the further movement of said movable member in the one direction so that part of said coupling member circumvents said driving shaft in response to movement of said developing device in the direction substantially perpendicular to the axis of said developing roller.

18. An apparatus according to claim 13, wherein a plurality of such rotational force receiving portions are provided on a phantom circle having a center on the rotational axis of said coupling member at positions substantially diametrically opposite to each other.

19. An apparatus according to claim 13, wherein said rotational force receiving portion includes a first rotational force receiving portion and a second rotational force receiving portion, said first and second rotational force receiving portions being projected at each of two positions of an edge portion of a flat portion interposing a central portion of said rotational force receiving portion, wherein said rotational force applying portion includes a first rotational force applying portion and a second rotational force applying portion, said first and second rotational force applying portions being projected in a direction perpendicular to the axis of said driving shaft at each of two positions opposite to each other, and wherein said coupling member receives a rotational force from said driving shaft to rotate by said first rotational force receiving portion engaging to said first rotational force applying portion and by said second rotational force receiving portion engaging to said second rotational force applying portion, said first rotational force receiving portion is opposed to said second rotational force receiving portion, and said first rotational force applying portion is opposed to said second rotational force applying portion.

20. An apparatus according to claim 13, wherein said coupling member has a circular flat portion at a free end thereof, and a recess is disposed at a central portion of said circular flat portion, said recess including an expanding portion expanding toward a free end thereof.

21. An apparatus according to claim 20, further comprising an elastic member for elastically urging said coupling member with such an elastic force so as to permit said coupling member to move from the pre-engagement angular position to the rotational force transmitting angular position to maintain said coupling member at the pre-engagement angular position, and so as to permit said coupling member to move from the rotational force transmitting angular position to the disengaging angular position.

22. An apparatus according to claim 13, wherein said coupling member is provided in a position away from the axis of said developing roller with respect to a direction perpendicular to the axis of said developing roller.

23. An apparatus according to claim 21, wherein said rotating force transmitting portion is disposed in a side opposite from said rotating force receiving portion, and wherein the rotating force received by said rotating force transmitting portion is transmitted to said rotating force transmitting portion through said rotating force receiving portion and said driving shaft.

24. An apparatus according to claim 13, wherein said developing device contains a yellow color developer, a magenta color developer, a cyan color developer or a black color developer, and is a developing cartridge detachably mountable to said movable member in the form of a developing rotary.

* * * * *